Dec. 19, 1961  E. F. KLEINSCHMIDT ET AL  3,014,095
PRINTER AND PERFORATOR
Filed Nov. 30, 1954  24 Sheets-Sheet 2
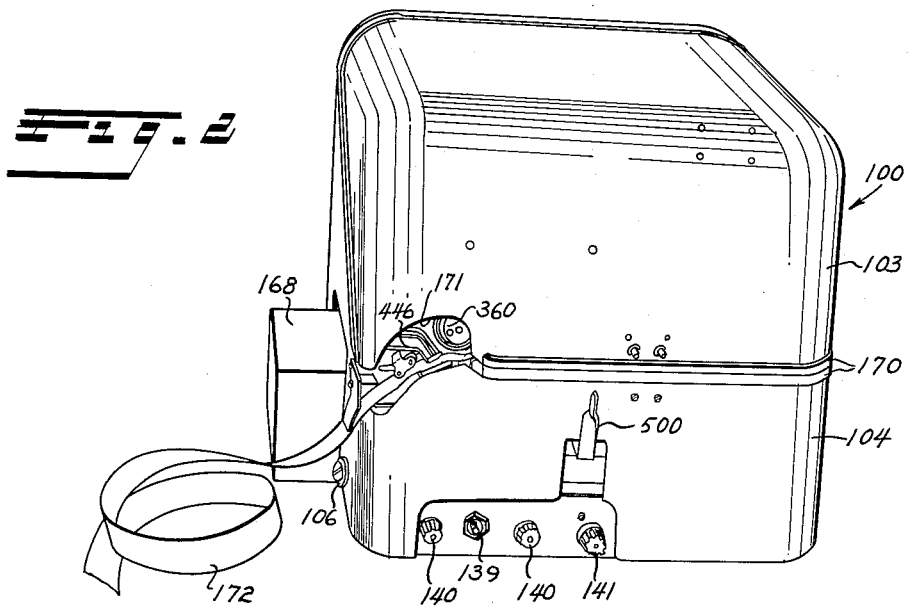
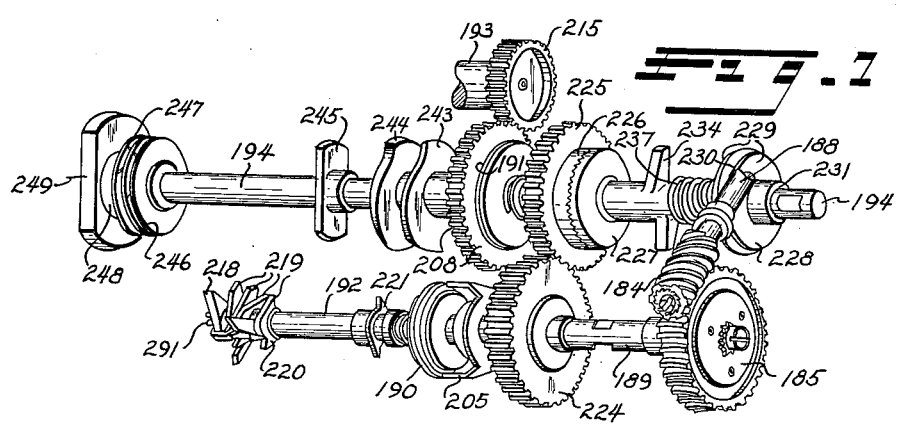
INVENTORS
EDWARD F. KLEINSCHMIDT
JOSEPH A. MANKAWICH
BY Strauch, Nolan & Diggins
ATTORNEYS

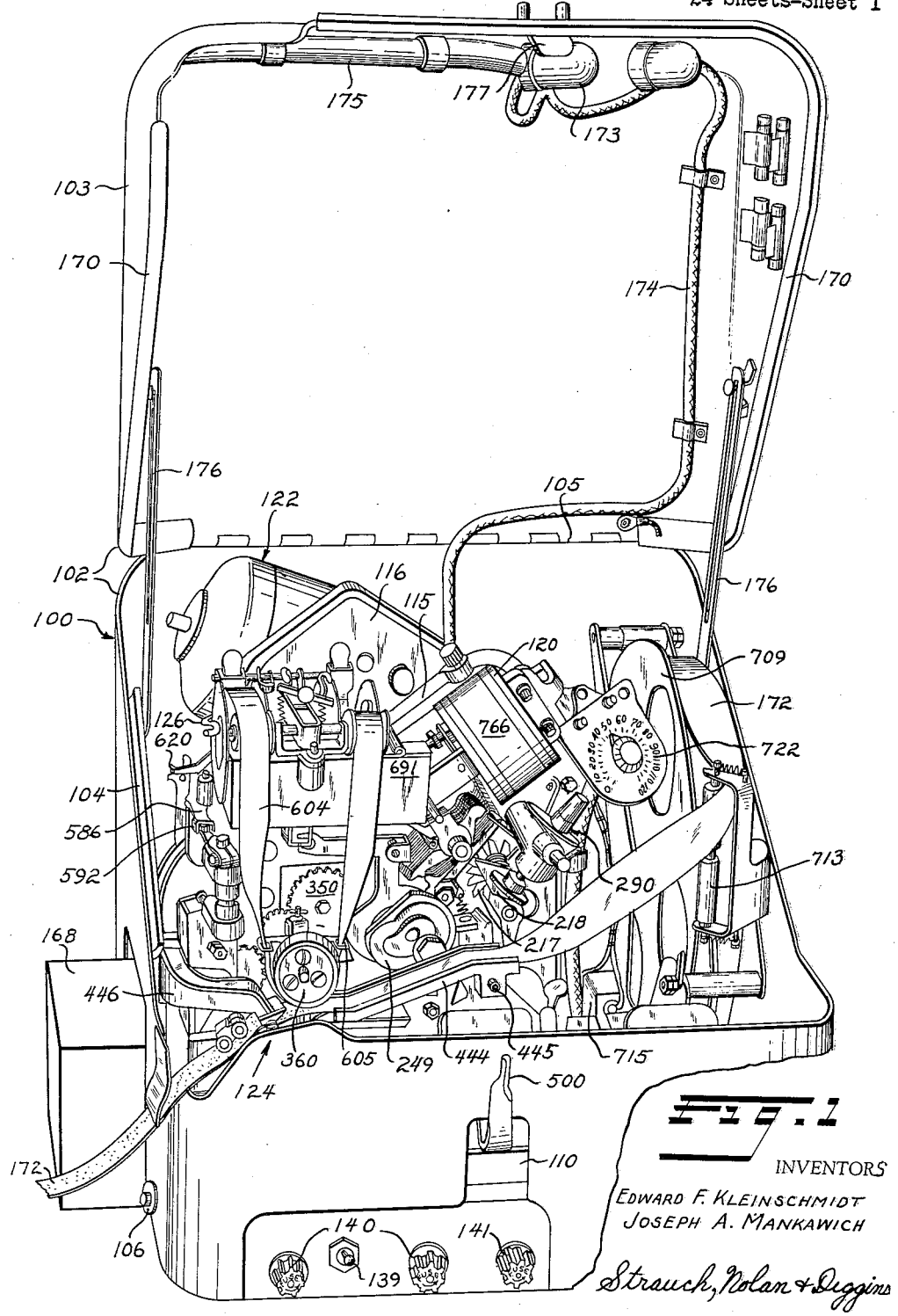

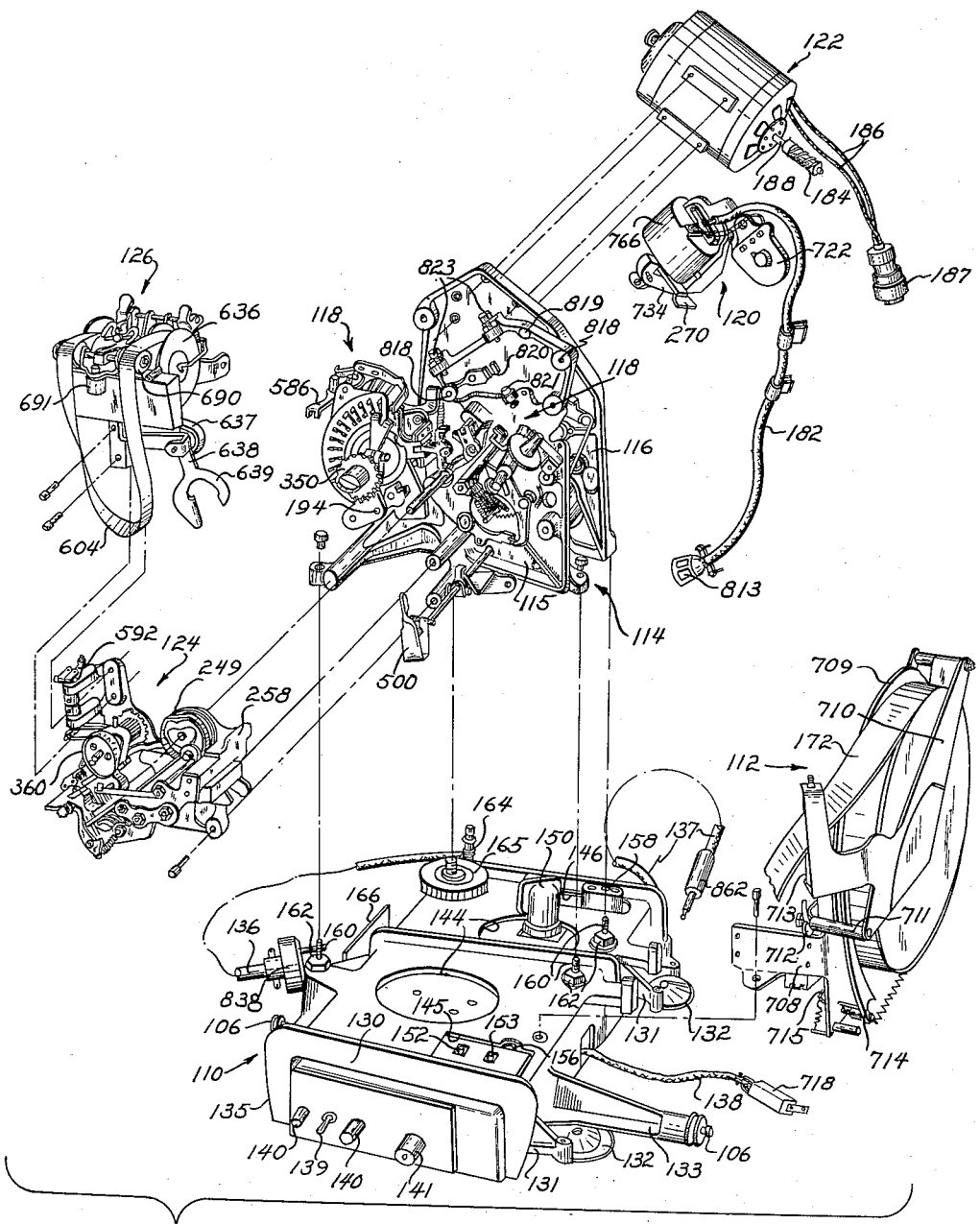

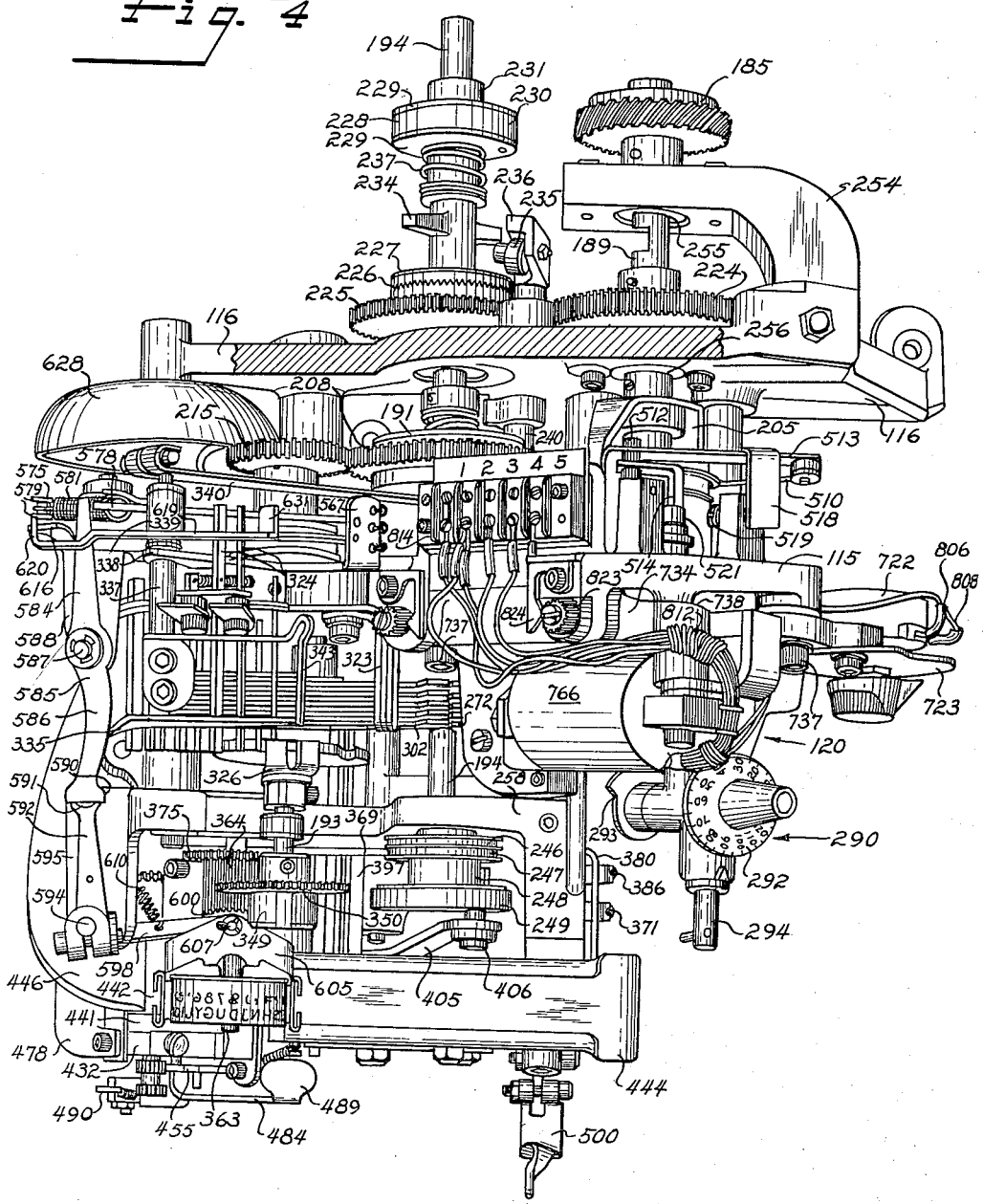

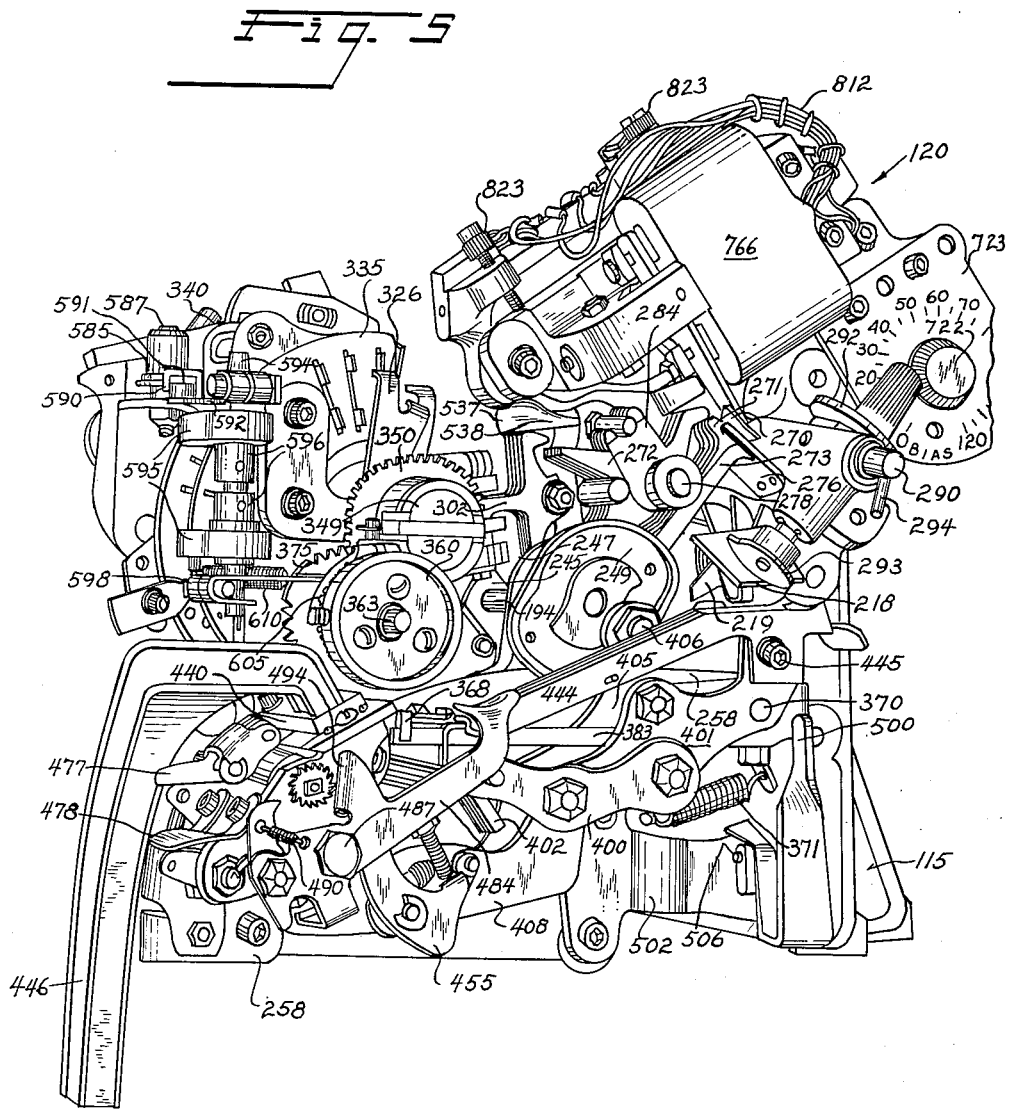

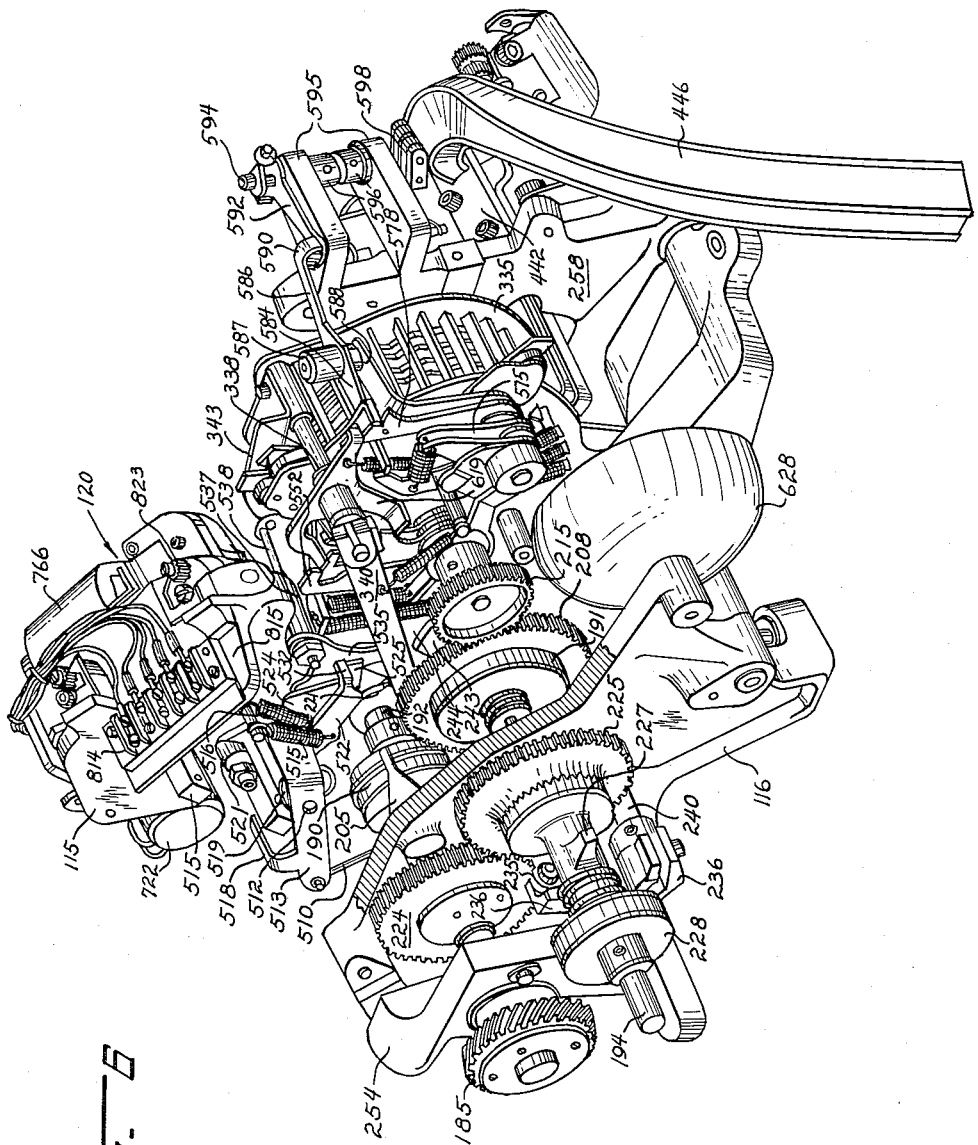

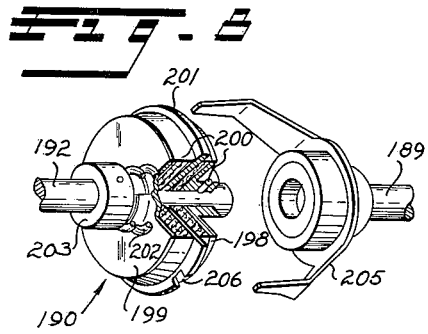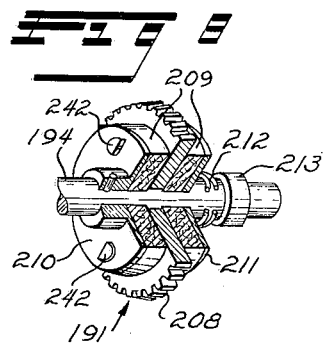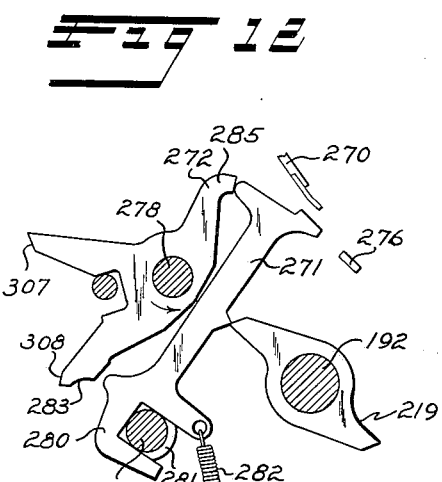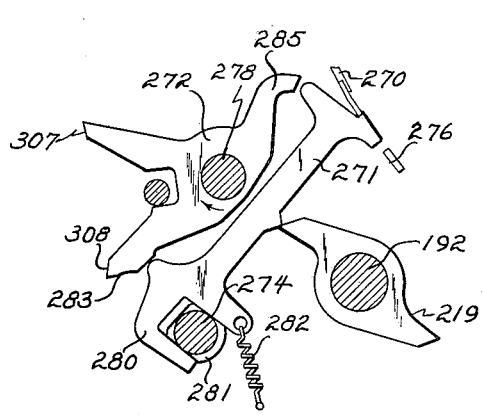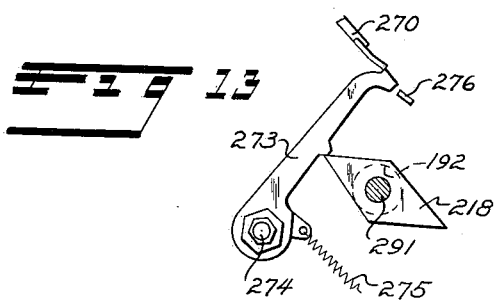

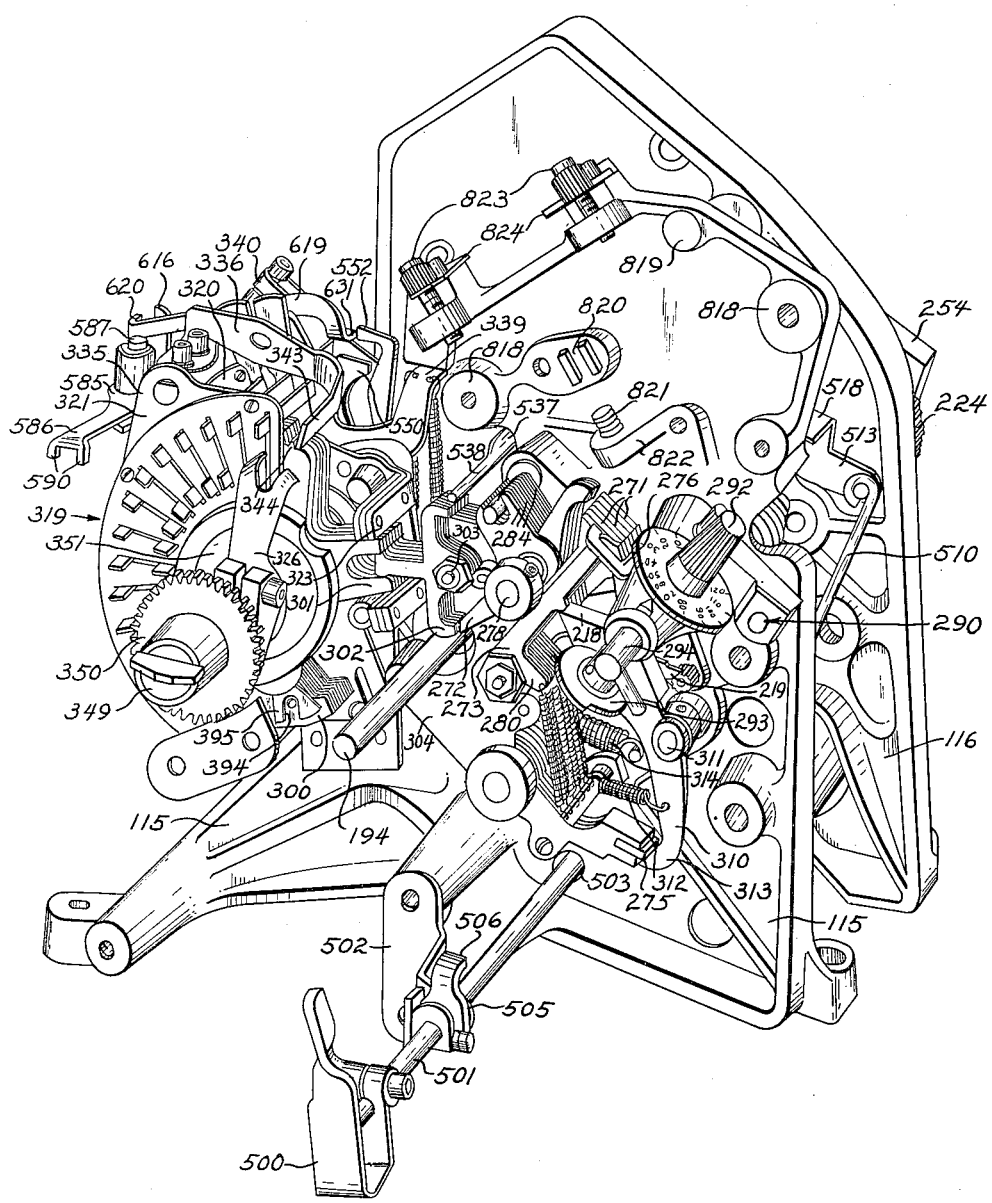

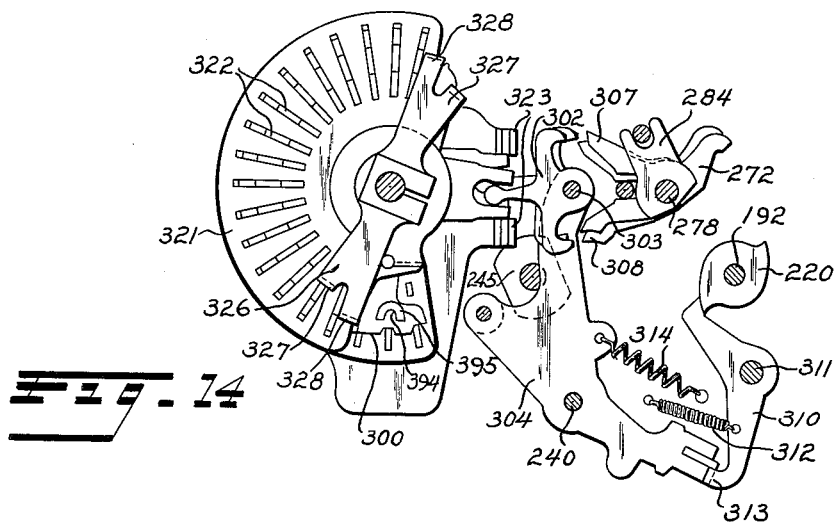
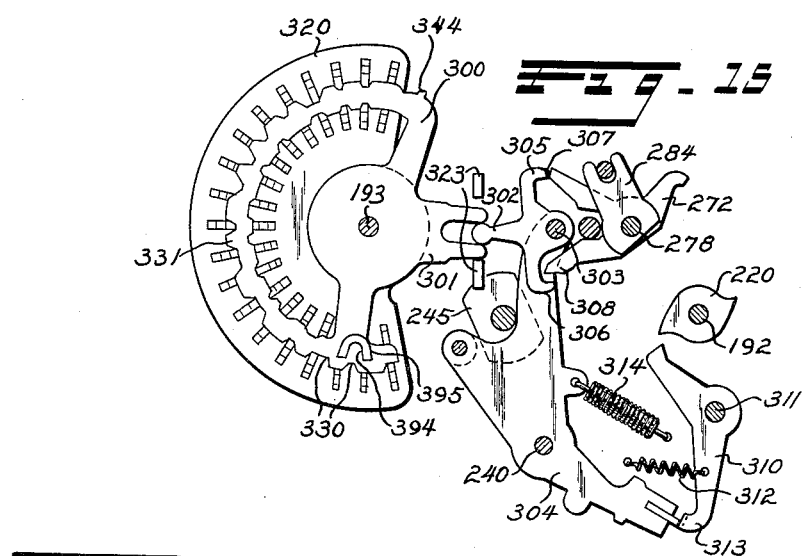
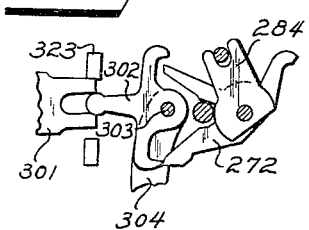

Dec. 19, 1961  E. F. KLEINSCHMIDT ET AL  3,014,095
PRINTER AND PERFORATOR
Filed Nov. 30, 1954                    24 Sheets-Sheet 10
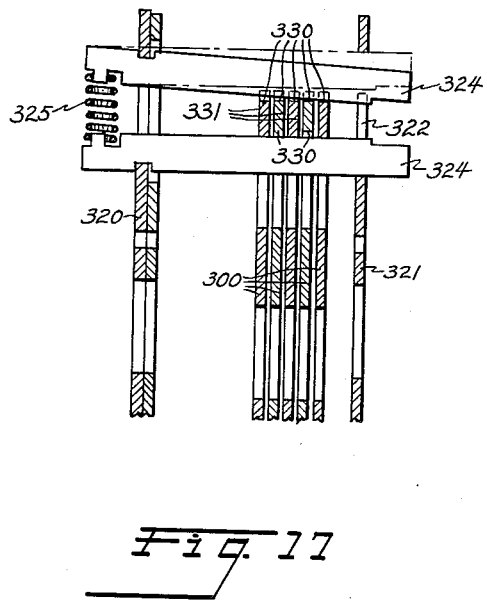
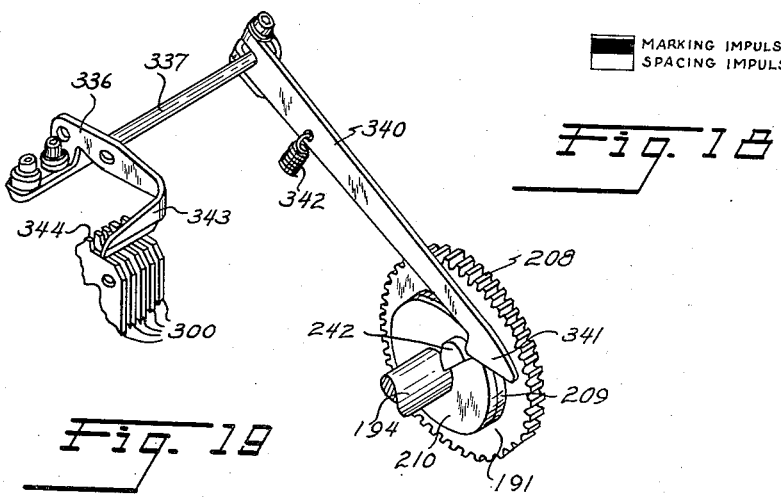
INVENTOR
EDWARD F. KLEINSCHMIDT
JOSEPH A. MANKAWICH
BY Strauch, Nolan + Diggins
ATTORNEYS

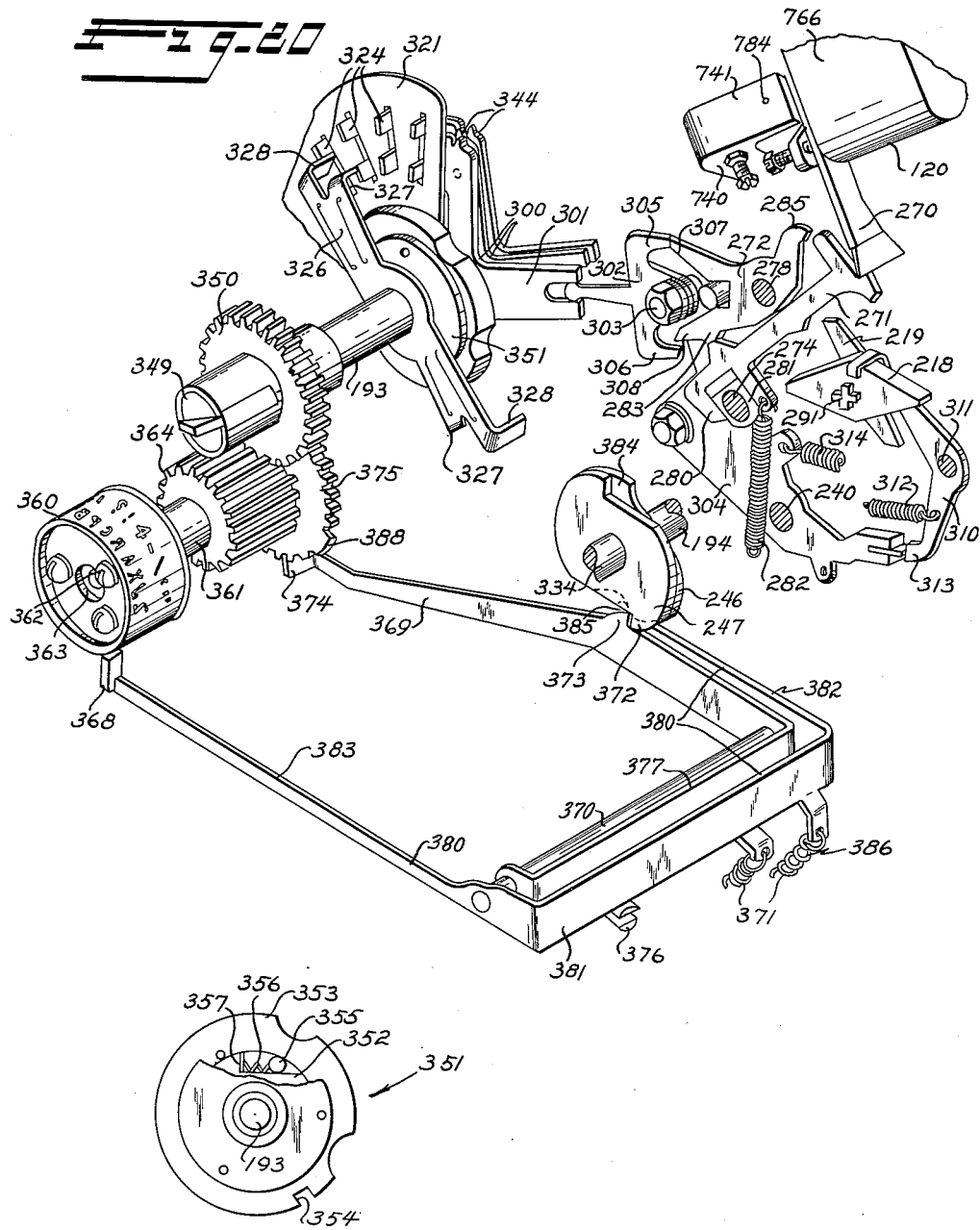

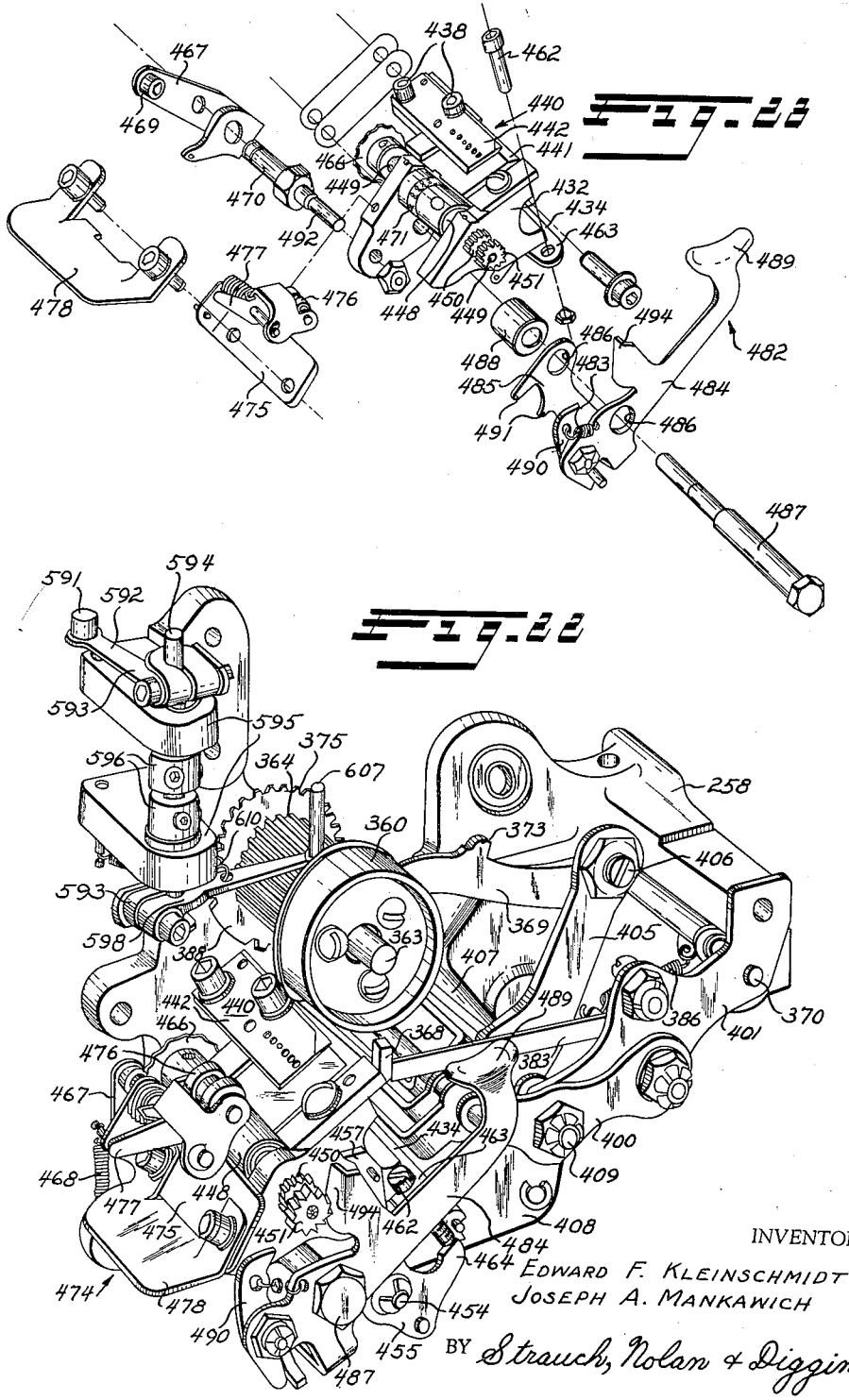

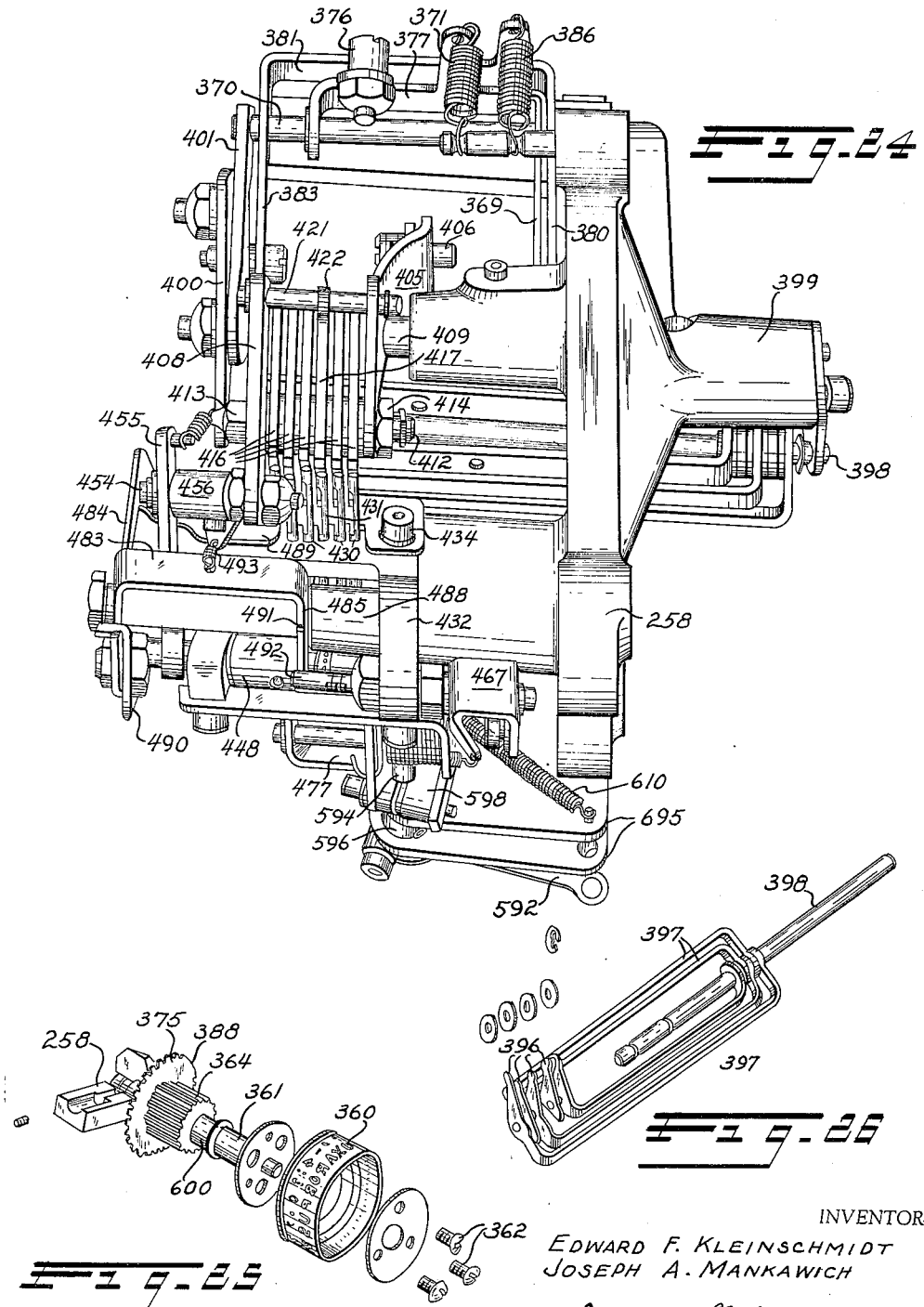

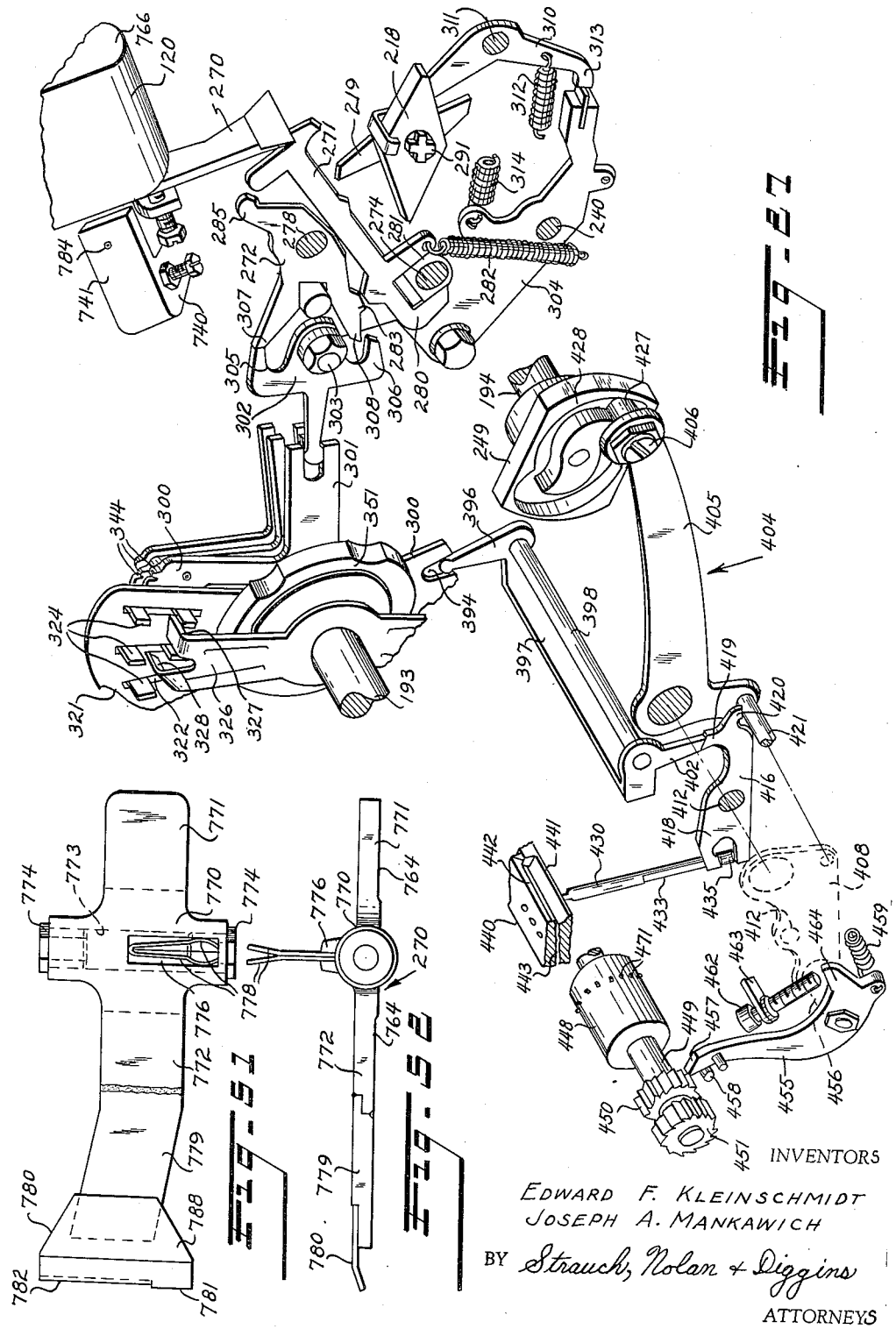

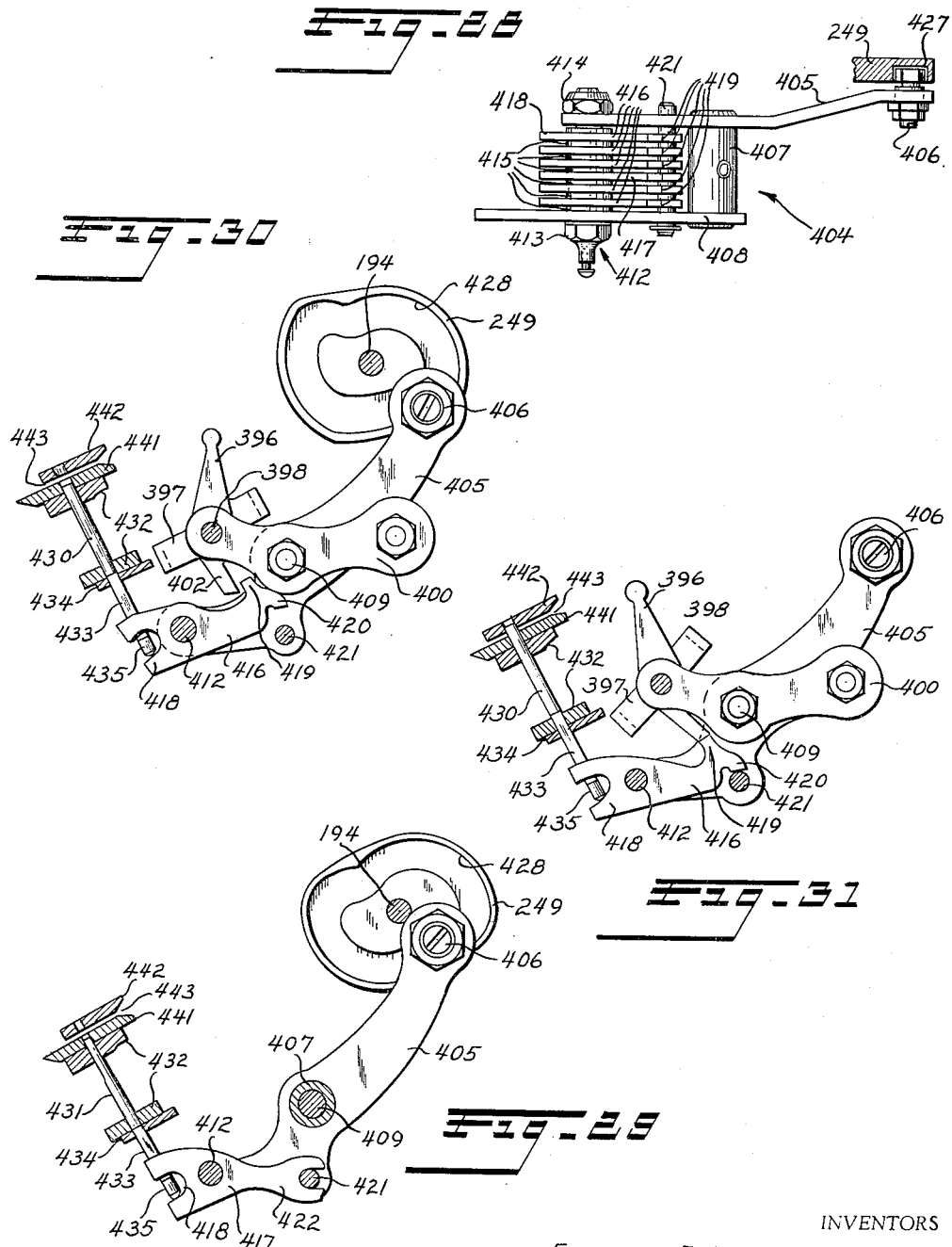

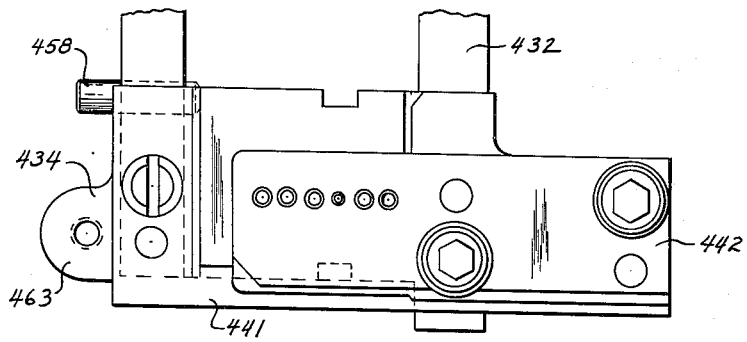
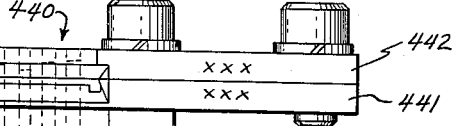
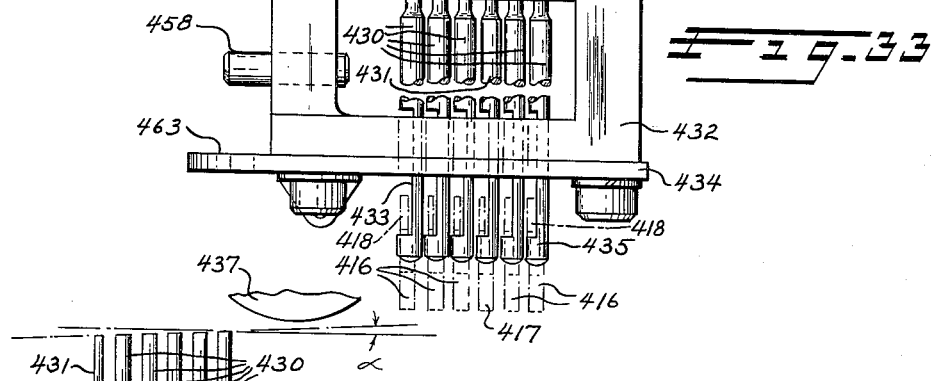
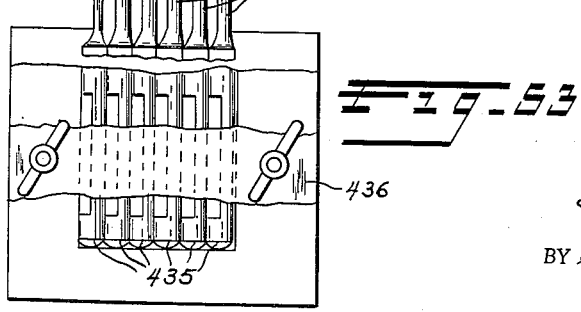

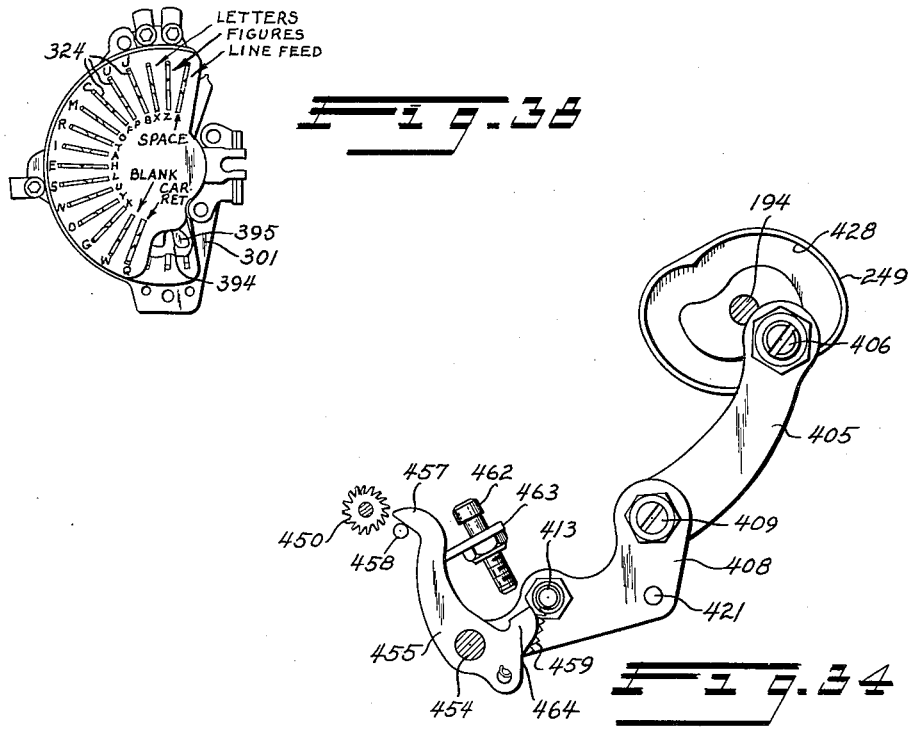

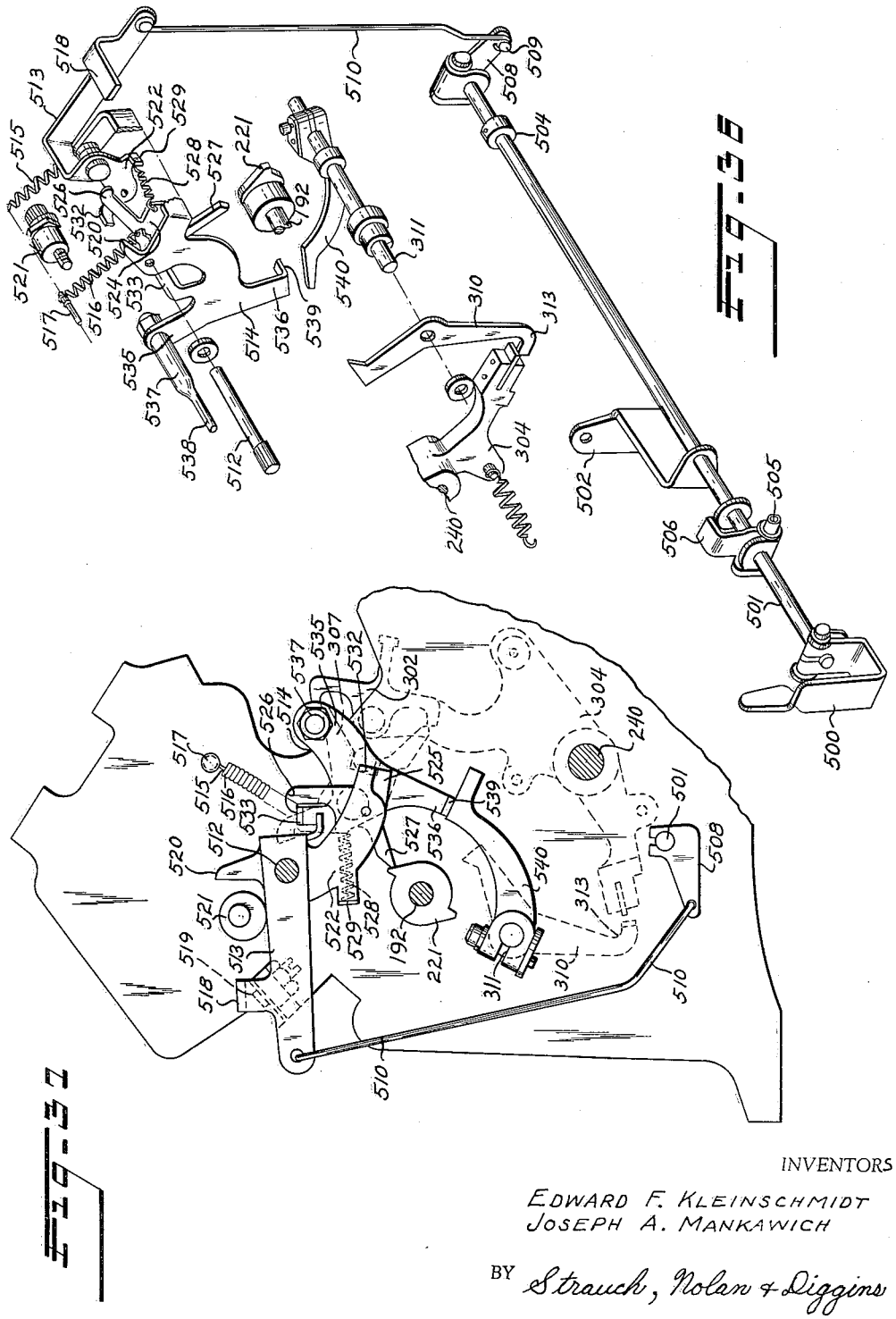

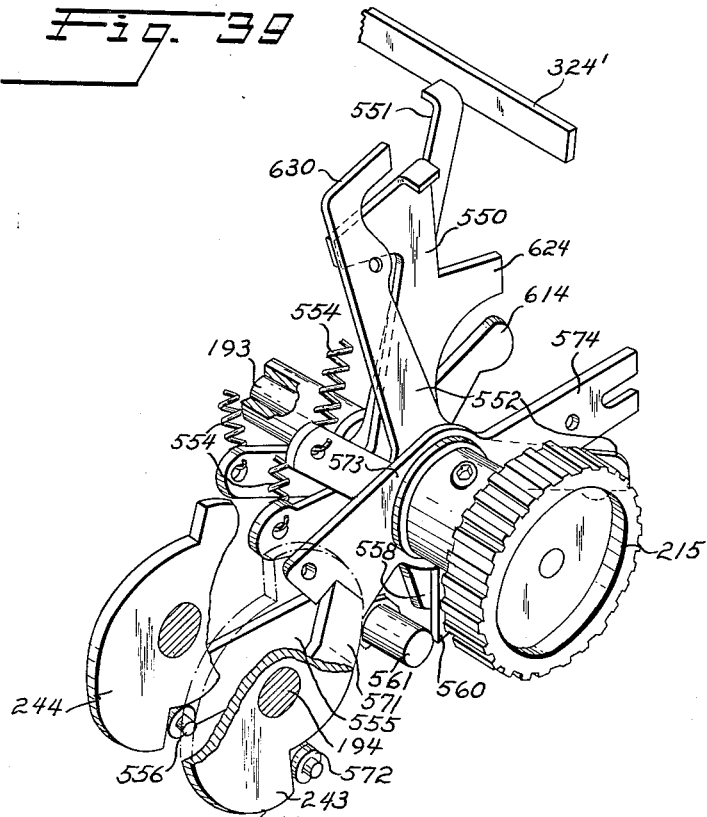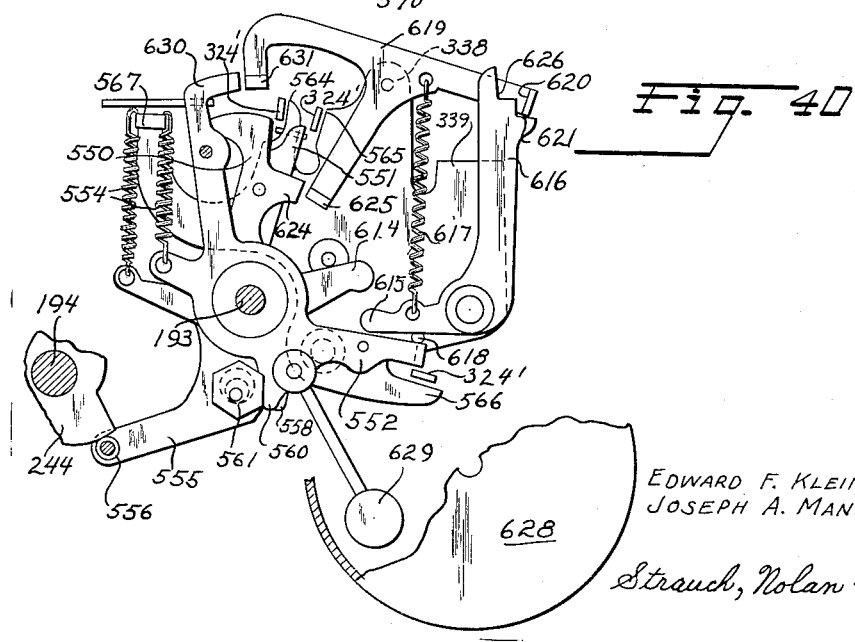

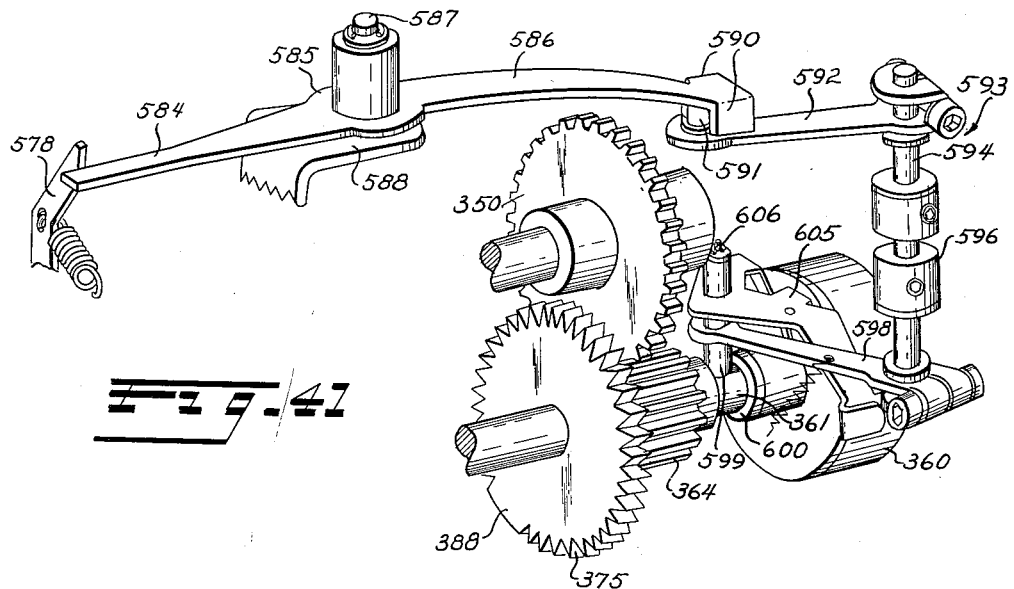
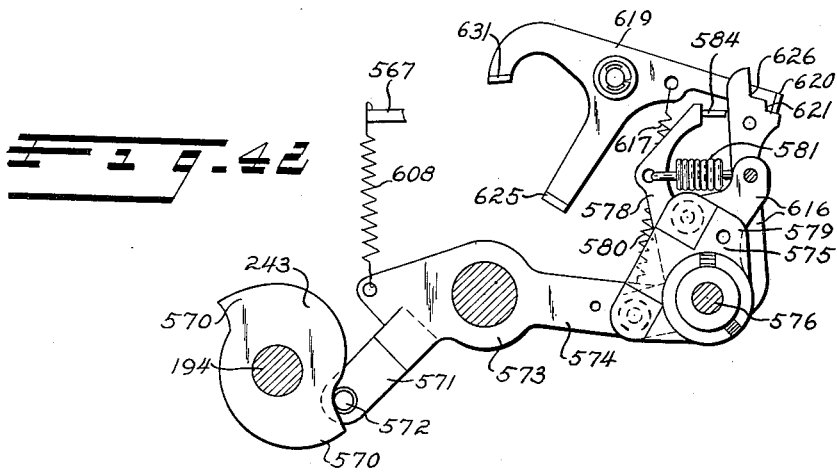

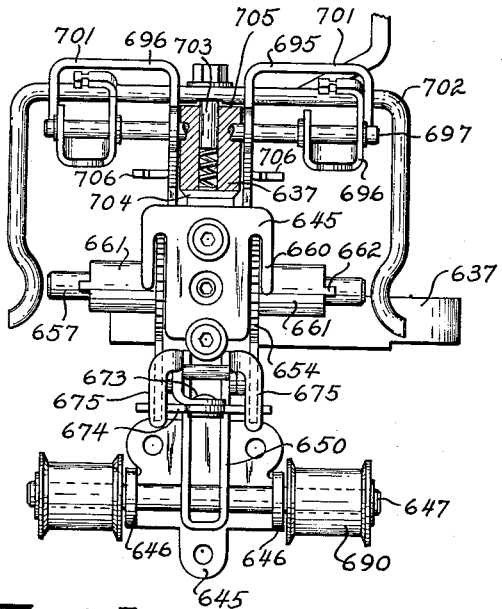
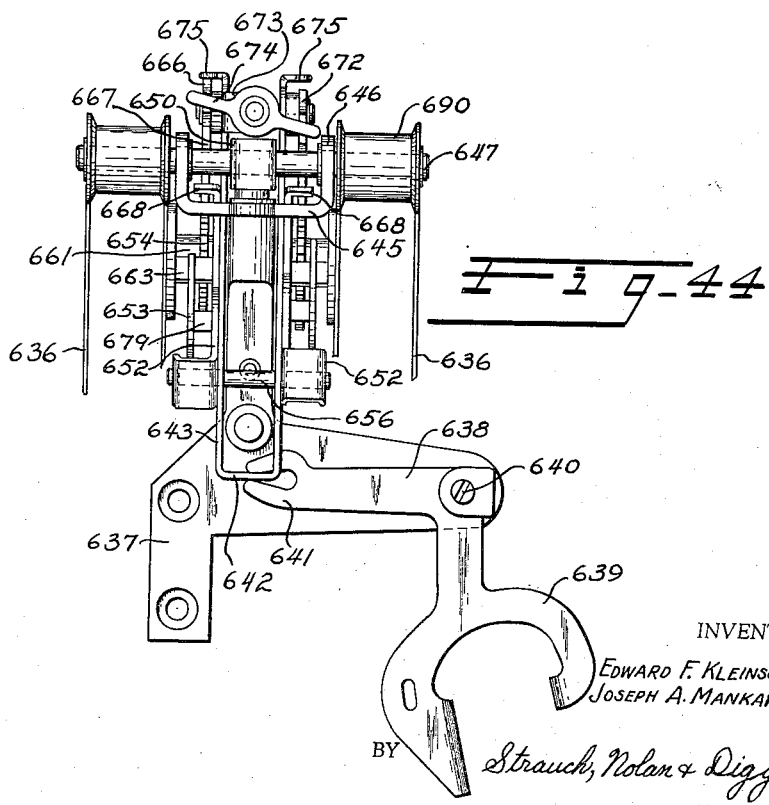

Dec. 19, 1961  E. F. KLEINSCHMIDT ET AL  3,014,095
PRINTER AND PERFORATOR
Filed Nov. 30, 1954  24 Sheets-Sheet 22
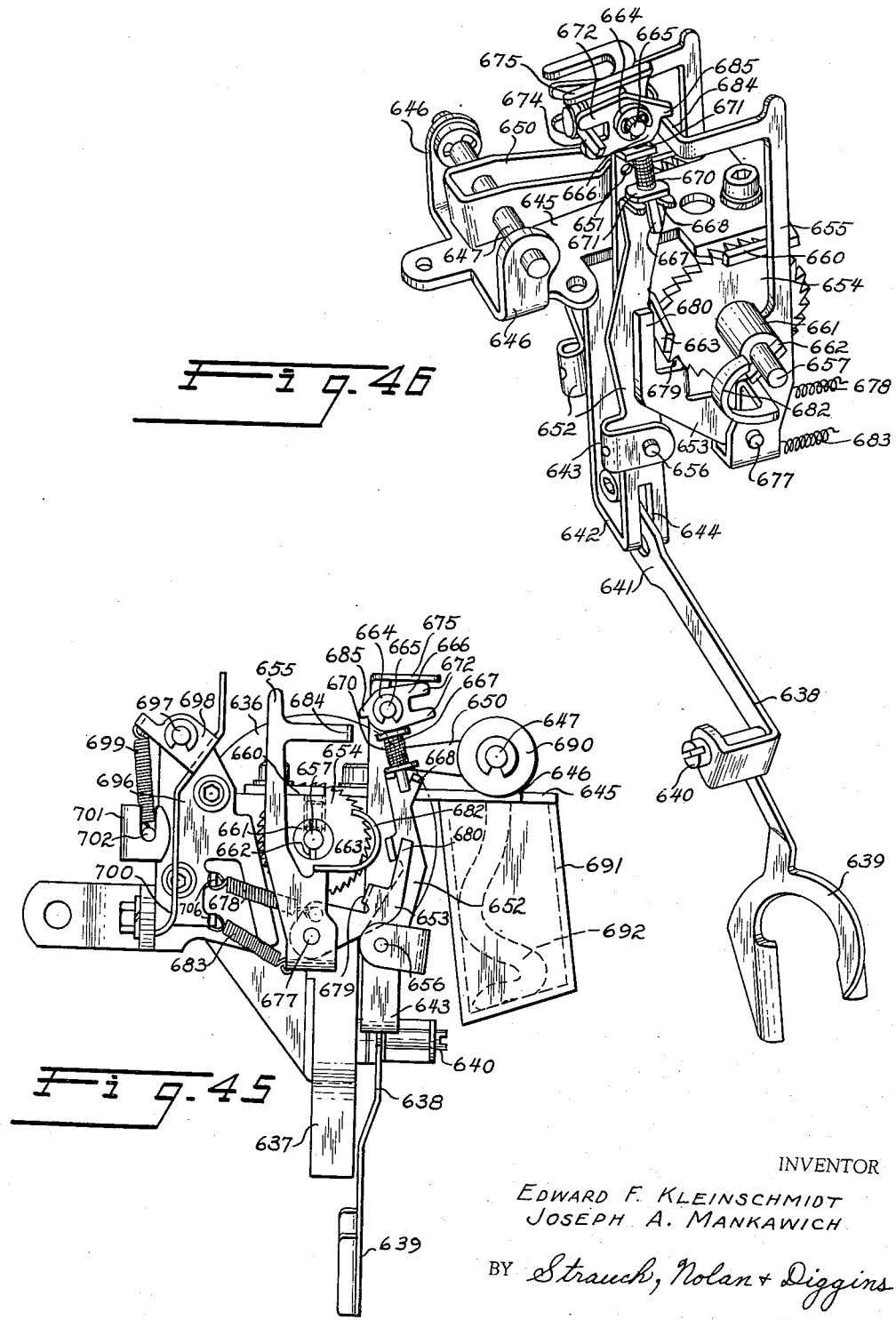
INVENTOR
EDWARD F. KLEINSCHMIDT
JOSEPH A. MANKAWICH
BY Strauch, Nolan & Diggins
ATTORNEYS

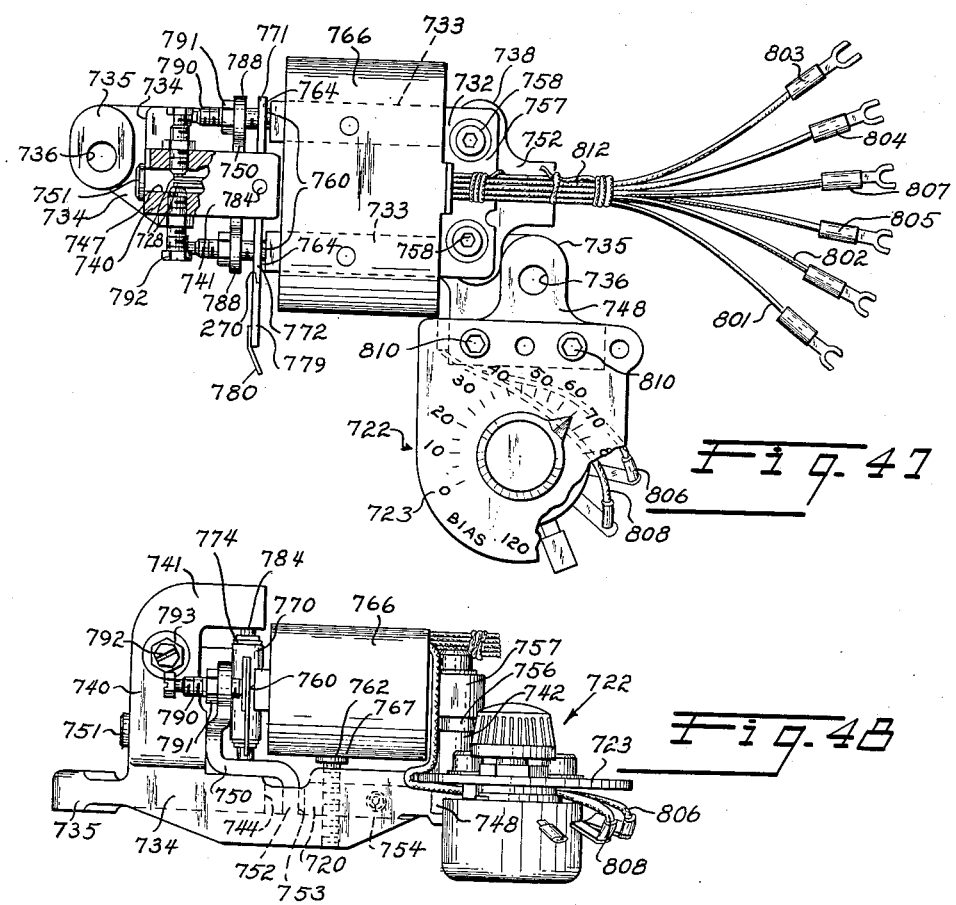
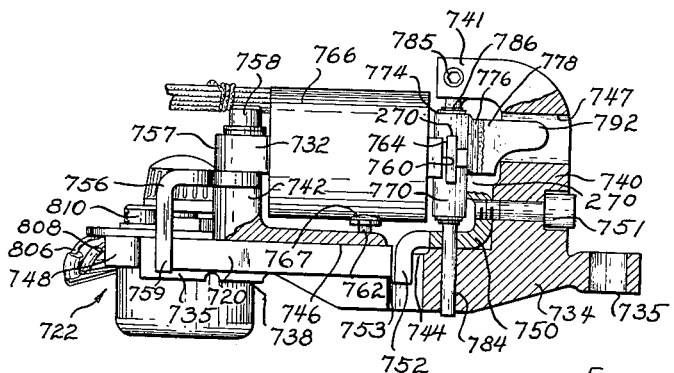

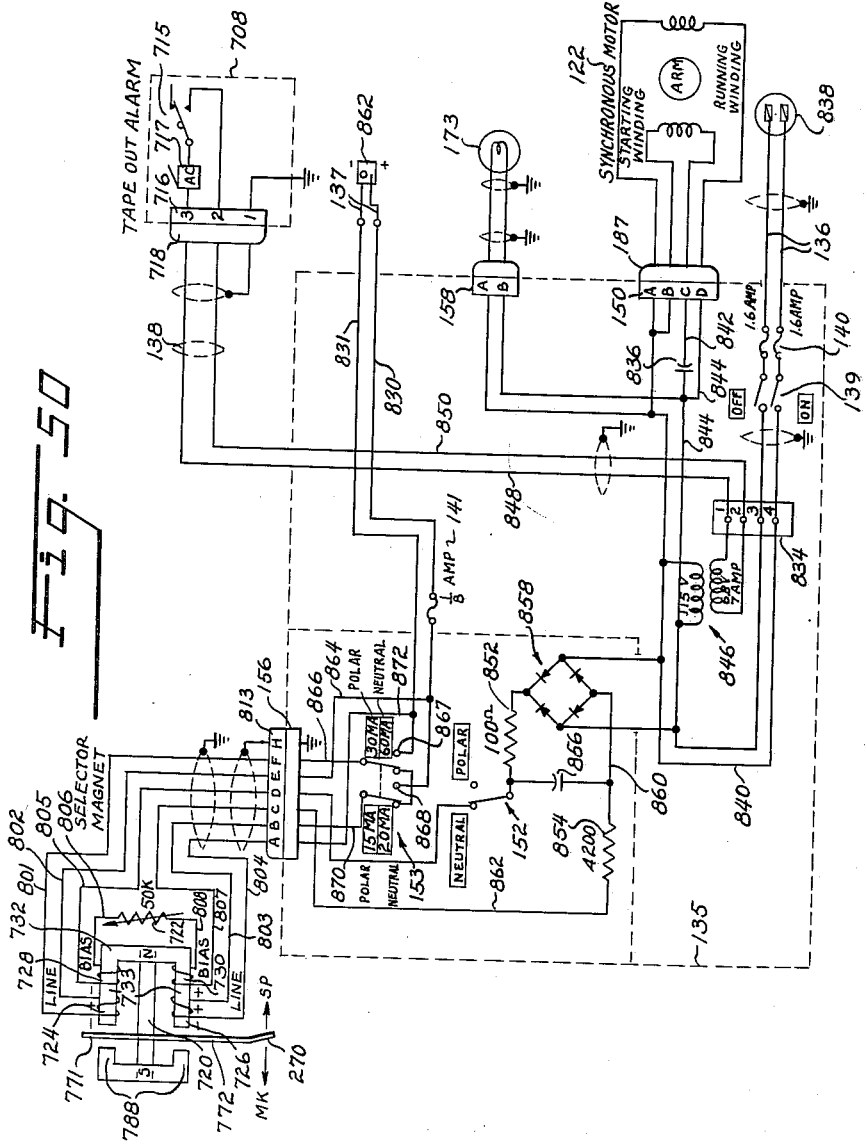

United States Patent Office 3,014,095
Patented Dec. 19, 1961

3,014,095
PRINTER AND PERFORATOR
Edward F. Kleinschmidt, Wilmette, and Joseph A. Mankawich, Mundelein, Ill., assignors to Smith-Corona Marchant Inc., a corporation of New York
Filed Nov. 30, 1954, Ser. No. 472,076
30 Claims. (Cl. 178—92)

This invention relates to a recording printing and perforating mechanism and more particularly to a combined mechanism for receiving coded signalling conditions and converting them into printed character and perforated code manifestations on a single message medium, such as tape, which is useful in printing telegraph, computing, data storage systems and the like.

Prior art perforators used for such purposes are well exemplified by the mechanisms disclosed in U.S. Patents Nos. 1,884,743, 2,174,731, 2,255,794 and 2,490,608. Each of the mechanisms disclose the widely accepted punch selection and operation by what are known as punch interponent levers. In such prior devices, permutation code selecting mechanisms operated by a receiver or a keyboard, are utilized to selectively position interponent levers under or into engagement with the shank ends of the selected punches. All interponent levers are then actuated to engage the selected punches and force them through a message medium. Such prior mechanisms utilize springs to return the actuated punches to their retracted position.

In our preferred embodiment of perforating unit the punch actuation differs from that of the known prior art in that no interponent levers are utilized, and no springs are used to return the punches to retracted position. Instead the punches are at all times positively interconnected to a punch operating lever assembly by novel individual punch levers which are blocked or unblocked by selected interference members. This novel structure eliminates breakage of punches that, although infrequent, can occur when using shiftable interponent levers. Punch actuation and retraction by this novel structure is always under positive control of the machine power system, hence punch springs which occasionally break and result in broken punches and torn tape, are eliminated. The novel manner of selecting the interference levers by direct connection to high speed selector code devices eliminates the multiplicity of interconnecting links required in all perforating systems using punch interponent levers. This reduces size, wear, number of moving parts, weight and cost of manufacture and upkeep.

Electrical code groups used in transmitting signals from printing telegraph, computing and data storage systems are either of two types, neutral or polar. Prior recorder receiving components in such systems utilize a magnet or magnets to convert the electrical signals to mechanical positions. The receiving magnet used in such prior art receivers can receive one of the two types of signals and not the other. It has accordingly been the practice to utilize magnet circuits to receive either one or the other of neutral or polarized signals depending upon the line circuit.

To provide versatility of the machine and eliminate the use of two machines or costly shutdown of a machine while changing prior selector magnets, a single polar magnet, with associated novel circuits and electric components, capable of receiving polar or neutral signals is incorporated into our improved receiving-selecting mechanism. The changeover between neutral and polar signalling conditions is accomplished through the novel circuits controls.

As primary purposes of a tape printing and perforating unit are storage and retransmission of received signalling combinations, certain features are desirable, namely immediate visual monitoring of the message and a means to initiate feed-out of the message tape independently of received messages to obtain proper retransmission of a received message without breaking the tape. Prior art tape perforating and printing recorders print character representations on or near the rear of a tape, the typewheel if one is used remains over the printed line, and the entire width of the tape passes under a portion of the code die assembly. Thus the printed message is obstructed until the tape leaves the die assembly. A prior art tape perforating receiver with auxiliary tape feed-out is disclosed in U.S. Patent No. 2,143,828 and uses a plurality of contact switches in a specific receiver system to initiate feed-out and automatically disable the auxiliary feed-out. The automatic disabling of the feed-out is accomplished by a special unit in response to a predetermined quantity of feed-out steps and/or receipt of some line signals but not all line signals.

Our present invention provides continuous instantaneous view of the printed message by the novel combination of a reciprocating typewheel and ink ribbon action, a cantilever die plate and printing of characters on the front edge of a message tape closest to the operator. Reciprocation of the typewheel is so rapid it does not interfere with the line of vision of the operator. To accomplish auxiliary tape feed-out we provide a novel manual mechanical tape feed-out structure to pre-set the selector mechanism of the receiver and mechanically enable the power distribution shafts to operate the printing, punching and tape feeding components of the machine. A further novel feature automatically disables the tape feed-out whenever any line signal is received by the machine.

Many additional novel features such as the specific ink ribbon feed and reversing unit, typewheel register and print hammer blocking mechanism, function operating mechanism and other details have been incorporated in the illustrated embodiment to disclose one form of high-speed, small, compact lightweight and rugged receiver which is made possible by this invention. Our ink ribbon feed and reversing device, as an example, is constructed of a minimum number of parts so arranged to occupy minimum width, height and depth, yet utilizes standard ribbon lengths with dependable feed, reversing and self inking of the ribbon. A novel cooperative relationship between the ribbon mechanism and the other machine functions permits a very high-speed operation of the punching and printing mechanisms while at the same time enabling a relatively slow and hence smoother ribbon feed operation.

Accordingly, a primary object of this invention resides in the provision of a novel compact combined printing and/or perforating machine.

Another object resides in providing a novel combined selecting mechanism and means for perforating a message medium, such as tape or cards.

Still another object is to provide a novel perforator assembly for use in printing telegraph, computing and data storage systems and the like.

A still further object is to provide a novel tape perforating and feeding mechanism.

Another object resides in the provision of a novel unitary code die and punch assembly for use in a code perforating machine.

Still another object resides in the novel provision of specially formed punches arranged in a unitary die block assembly so any selected punches may be simultaneously actuated yet each punch accomplishes its actual punching operation during a different portion of the simultaneous actuating stroke.

A still further object resides in the provision of a tape feed sprocket wheel mechanism in conjunction with a unitary code punch and die assembly.

Another object resides in the provision of mechanism for selecting desired punches from a plurality of punches and positively reciprocating the selected punches by a single operating mechanism.

A still further object resides in the novel arrangement in a tape printing perforator of a reciprocating typewheel and a cantilever die plate to enable a continuous view of the printed message including the last printed character.

Another object resides in the provision of a power actuated code cage locking device inter-related directly with selector mechanism code devices for preventing any inadvertent shifting of the code devices during visual manifestations of the code ring setting on a message tape.

A further object resides in the provision of novel typewheel registering means and cooperating print hammer actuating mechanism.

Another object resides in the provision of a novel combined receiving printer and perforator having a receiving mechanism incorporating a novel polar magnet capable of receiving either polar or neutral electrical signals.

A further object resides in the novel arrangement of individual subcomponents of the receiving tape printer and perforator so they may be easily and readily removed and replaced by interchangeable units.

Further novel features and objects of this invention will become apparent from the following detailed description and the appended claims taken in conjunction with the accompanying drawings showing a preferred embodiment thereof, in which;

FIGURE 1 is a front perspective view of a covered reperforator unit embodying the present invention;

FIGURE 2 is a reduced perspective view of the reperforator of FIGURE 1 with the cover closed;

FIGURE 3 is an exploded perspective view showing the various major sub-assemblies of the reperforator;

FIGURE 4 is a top view of the receiver mechanism removed from the base frame;

FIGURE 5 is a front perspective view of the receiver mechanism shown in FIGURE 4;

FIGURE 6 is a rear perspective view of the receiver mechanism shown in FIGURE 4;

FIGURE 7 is a schematic view of the main shaft and power distribution mechanism;

FIGURES 8 and 9 are partially broken detail views of the camshaft and selector arm shaft friction clutches;

FIGURE 10 is a front perspective view of the two vertical frames and assembled selector mechanism with the polar magnet, motor and printing and punching mechanisms removed;

FIGURE 11 is a schematic diagram disclosing selector lever and Y-lever action for recording a marking signal condition in the selector mechanism;

FIGURE 12 is similar to FIGURE 11 and shows the corresponding action for a spacing signal condition;

FIGURE 13 is a detail diagram of the stop lever and stop plate;

FIGURE 14 is a detail diagram showing the transfer mechanism prior to a transfer operation from the Y-levers to the code rings;

FIGURES 15 and 16 are detail diagrams of the operated transfer mechanism, FIGURE 15 showing a marking signal condition and FIGURE 16 showing a spacing signal condition;

FIGURE 17 is a cross-section view of the code ring cage showing a stop bar selected by the code rings;

FIGURE 18 is a teletypewriter code chart;

FIGURE 19 is a simplified detail view of the code ring locking mechanism;

FIGURE 20 is a functional diagram of the selecting and printing mechanism;

FIGURE 21 is a detail front view of the anti-bounce clutch for the selector stop-arm shaft;

FIGURE 22 is a front perspective view of the printing and punching mechanism;

FIGURE 23 is an exploded perspective view of the die block and tape feed sprocket assembly;

FIGURE 24 is a bottom view of the printing and punching mechanism illustrated in FIGURE 21;

FIGURE 25 is an exploded detail view of the typewheel and driving hub;

FIGURE 26 is a detail view of the punch interference levers partially disassembled;

FIGURE 27 is a functional diagram showing the selecting and punching mechanism;

FIGURE 28 is a detail plan view of the punch lever arm assembly;

FIGURE 29 is a detail diagram of the punch arm and lever connecting to the feed hole punch;

FIGURES 30 and 31 are detail diagrams showing the punch arm assembly actuated to punching position, FIGURE 30 showing the position of the mechanism for a spacing code condition and FIGURE 31 showing a marking code condition;

FIGURE 32 is a plan view of the code die assembly;

FIGURE 33 is a side elevation view of the code die assembly of FIGURE 32;

FIGURE 34 is a diagramatic detail view of the tape feed pawl in inactive position;

FIGURE 35 is similar to FIGURE 34 showing the tape feed pawl after it has been removed from engagement with the feed ratchet wheel;

FIGURE 36 is a diagrammatic detail view of the manual tape feed-out mechanism;

FIGURE 37 is an elevation view of the front vertical frame as seen from the rear showing the cooperative arrangement of the manually actuated feed-out mechanism;

FIGURE 38 is a diagram of the code ring cage and stop bars with characters and functions indicated for each stop bar;

FIGURE 39 is a diagrammatic view showing the function bar sensing levers and their restoring mechanism;

FIGURE 40 is an elevation view of the function bar sensing lever arrangement from the rear of the machine;

FIGURE 41 is a diagrammatic view showing the typewheel reciprocating mechanism;

FIGURE 42 is an elevation view of the typewheel reciprocating and figure shifting mechanism from the rear of the machine;

FIGURE 43 is a top plan view of the ink ribbon supply assembly with the spools removed;

FIGURE 44 is a front elevation view of the ink ribbon supply assembly;

FIGURE 45 is a left hand elevation of the ink ribbon supply assembly;

FIGURE 46 is a right hand perspective of the ink ribbon operating mechanism;

FIGURE 47 is a detail partially broken front view of the polar magnet.

FIGURE 48 is a detail view of the lower side of the magnet shown in FIGURE 47;

FIGURE 49 is a detail partially sectioned view of the upper side of the magnet shown in FIGURE 47;

FIGURE 50 is a schematic circuit diagram of the reperforator;

FIGURE 51 is an enlarged side view of the magnet armature;

FIGURE 52 is an enlarged front view of the armature shown in FIGURE 51; and

FIGURE 53 is a view illustrating a method of grinding a matched set of punches.

*General*

As illustrated in the drawings, this invention embodies a compact, self contained code receiver with provisions for receiving and converting signalling conditions, such as the electrical mark and space signals of either polar or neutral type, to mechanically positioned elements and from them to accomplish a printed and perforated character representation of the received code on a message tape. Although the drawings disclose only a receiver unit, it is to be understood that this unit can be used in conjunction with a keyboard transmitter, in the same manner as disclosed in application Serial No. 241,916, for Printing Telegraph Apparatus filed August 15, 1951 by E. E. Kleinschmidt et al., as a recorder for a computer, a data storage recorder and the like and now Pat. No. 2,773,931 granted Dec. 11, 1956. Accordingly this machine for printing and punching character representations on a message medium can be used for many purposes, e.g., to initially record a perforated message for retransmission or storage, to receive a message initiated by remote keyboard or tape transmission and, besides printing the message, will perforate or reperforate the message on a tape for retransmission if desired.

With particular reference to FIGURE 1, the recorder is embodied in a tape printing and perforating receiver unit 100. The unit is enclosed in a dust cover 102 fabricated in two parts, 103 and 104, hinged along a rear edge at 105. Access to the receiver for various operating controls, replenishing message tape and changing the inked ribbon is enabled by swinging the upper section 103 of the dust cover 102 up and to the rear. The dust cover 102 is positively and removably located relative to the remainder of the receiver unit by cooperation between slots in the lower edge of the cover and rubber grommets 106 fixed on a base frame 110.

In FIGURE 3, the component subassemblies of the receiver unit (excepting the dust cover) are illustrated in exploded perspective. These components include the base frame 110, which supports and positions the dust cover 102, houses and mounts various electric components and terminals and provides support structure, either directly or indirectly, for the other component subassemblies. Mounted directly on the base frame 110 is the message tape supply reel assembly 112 and the power distribution assembly 114. The power distribution assembly includes the various drive shafts and clutches and the two vertical frame members 115 and 116, which support the selector group 118 including the polar magnet 120, the motor 122, the printing and punching assembly 124 and the inked ribbon supply assembly 126.

The receiver in the illustrated embodiment of this invention uses a selector mechanism including a polar magnet. Although the polar magnet, its circuitry and control is new, the selector mechanism in this novel reperforator combination is basically similar to that disclosed in copending application Serial No. 190,359, for Selector Mechanism by Edward F. Kleinschmidt filed October 16, 1950 and now Pat. No. 2,754,361 granted July 10, 1956. Since various function operations in and control of the selector mechanism of this invention constitute novel improvement over that disclosed in the afore-mentioned application, and because a novel interrelated perforating operation is accomplished herein, a detailed description of the selector mechanism is believed desirable and will appear later.

Base frame and cover

As illustrated in FIGURE 3, the base frame 110 provides an inverted channel shaped central portion 130 having integral side lugs 131, on both sides, mounting rubber shock mounts 132 which are used to fasten the base frame to a table top or portable base (not shown). Horizontal integral struts, such as the ones indicated 133, carry the grooved rubber grommets 106 for positioning and supporting the dust cover. Within the inverted channel of central portion 130 is disposed a terminal box 135. Included within the terminal box are various electrical circuits and components which are described toward the end of this specification.

An electric power cord 136 and a message receiving cord 137 connect through the rear of the terminal box 135 to the contained circuits. Passing through one side of the terminal box and base frame is a tape-out alarm power cord 138 which connects to the tape supply reel assembly 112 in a manner to be later described.

The main power switch 139, the two main fuses 140 and the line fuse 141 are located at the front end of terminal box 135 where they are readily accessible to the operator. The top of central frame portion 130 is formed with lightening holes 144 and front and rear openings 145 and 146 respectively. Through the rear lightening hole 144, a screw plug receptacle 150 extends from the top of the terminal box 135 and provides the power source for the electric drive motor 122. The forward opening 145 provides access for the magnet control switches 152 and 153, and a second screw plug receptacle 156 for the polar selector magnet 120. A prong type receptacle 158 is fastened toward the rear of terminal box 135 and projects through rear frame opening 146 to provide a power receptacle for a copy light, to be presently described, mounted within the dust cover 102.

A plurality of mounting screws 160 are provided with their threaded ends extending vertically above the base frame 110. Each mounting screw is rigidly maintained in position by a jam nut 162. The worm and worm wheel gear set 164 and 165 shown at the left rear corner of the base frame is an extra set of motor drive gears used to obtain a different drive ratio between the motor and the receiver power distribution shafts. This extra gear set may be stowed in any convenient location. A plate 166 fixed on the left side of the base frame is used to mount the chad box 168 shown in FIGURE 1.

In FIGURES 1 and 2, the dust cover 102 is disclosed as a box-like container with an open bottom. Slots (not shown) at proper locations along the bottom edge cooperate with the grooved rubber grommets 106 carried by base frame 110 and position the dust cover relative to the frame. The entire cover 102 may be removed by lifting it vertically from cooperative engagement with the grommets 106. Cutouts are also provided in the bottom portion of the dust cover to allow access to the various controls and fuses and to permit the cover to fit over the chad box 168. The term "chad" refers to the small pieces of tape material which are punched from the tape during punch operations. Mating edges of the two sections 103 and 104 of the dust cover have sealing strips 170, engaged when the cover is closed.

When the cover is closed (FIGURE 2), preformed cutouts in the two parts 103 and 104 cooperate to provide a corner opening 171 to permit egression of printed and perforated message tape 172. The opening 171 extends around the front of cover 102 to the printing mechanism and is so formed to permit a continuous view of the printed message including the last printed character. A copy light 173 is disposed in the upper cover section 103, its electric power source derived through the cord 174 and a plug (not shown) which fits into receptacle 158 in the base frame 110. To direct the light on the printed portion of the message tape 172, a curved plastic rod light director 175 is clipped inside the front edge of the cover top 103 extending from the light 173 to a position just above the tape exit 171 when the cover 102 is closed. Conventional support stays 176 are mounted on either side of the two part cover to hold the hinged upper part 103 in open position during machine adjustments and when replenishing the tape supply. A push button spring latch 177 holds the upper cover part 103 in latched arrangement with the lower cover part 104 when the cover is closed.

Motor and power distribution

The illustrated embodiment of this printing and perforating receiver utilizes a synchronous motor 122, designed to operate at a constant speed of 3,600 r.p.m., mounted on the rear of vertical frame 116 (FIGURE 3), which transfers power to the main shaft through a gear set 184 and 185. A motor drive gear set for a standard speed of 368.1 o.p.m. (60 w.p.m.) is normally installed in the unit with the alternate 600 o.p.m. (100 w.p.m.) gear set 164 and 165 mounted on studs at the left end of the base frame 110. Additional alternate gear sets for speeds as desired, such as 404 o.p.m. (British), may be provided. As disclosed in copending application Serial No. 241,916 filed August 14, 1951 (Patent No. 2,773,931) the relative operative positions of the motor shaft axis and the main drive shaft axis remains the same regardless of the gear set used.

The motor is electrically interconnected to the perforator terminal box 135 by the leads 186 and screw type connector 187 which connects to the receptacle 150. A.C. power is provided through the power cord 136. The On-Off switch 139 controls the A.C. power to the two power input fuses 140 which protect both sides of the power input circuit. When the power switch is on the motor is operating and, through motor shaft 188 and gear set 184, 185 continuously drives the main shaft 189.

This receiver contains two friction clutches 190 and 191 (FIGURES 7, 8 and 9) which permit rapid start-and-stop actions for the several machine components. The selector cam shaft friction clutch 190 couples a selector cam shaft 192 to the motor driven main shaft 189 and the function shaft friction clutch 191 couples a selector stop-arm shaft 193 to a function shaft 194.

In the selector cam shaft friction clutch (FIGURE 8), two driven clutch disks 198 and 199 rotatably fixed to the selector shaft 192, press two felt friction plates 200 against a relatively rotatable center disk 201 by spring pressure from spring 202 between axially shiftable disk 199 and a collar 203 fixed to the selector cam shaft 192. A driving fork 205 fixed on the main shaft 189 engages two notches 206 in the center disk 201. The friction against the felt plates 200 is normally sufficient to cause rotation of the selector shaft 192 as the fork 205 rotates. When the stop-cam action, described hereinafter, stops the rotation of the driven selector shaft 192, the friction between the center disk 201 and felt plates 200 is mechanically counteracted and the driving center disk rotates while the felt friction plates and drive shaft 192 are stopped. When stop cam resistance to selector shaft rotation is removed, the friction between the center disk 201 and the felt plates 200 again starts rotating the selector shaft 192. Note, the felt friction plates 200 are interlocked with driven disks 198 and 199 by pins (not shown).

Operation of the friction clutch 191 on the function shaft 194 is similar to the action described above. However, in this case, application of the driving force is reversed (FIGURE 9). The center portion of this clutch 191, a gear 208 is the driven portion while the felt friction plates 209 and driving clutch disks 210 and 211 are mounted to rotate with the rotating function shaft 194. The gear 208 is free to rotate on shaft 194 except for the friction effect. The spring pressure of spring 212 between disk 211 and a collar 213 fixed to shaft 194 provides sufficient friction between the felt plates 209 and the drive gear 208 to cause gear 208 to rotate. When rotating, gear 208 turns the selector stop-arm shaft 193 (FIGURE 7) through gear 215 unless mechanical interference, as later described, counteracts the friction of the clutch 191.

Drive power for all the mechanisms of this printing perforator is provided by the motor 122 through rotation of the main shaft 189. The perforator mechanisms perform their functions during each ½ revolution instead of each full turn, so some intermittently driven shafts must be permitted to rotate only 180° to complete one operating cycle. The starting and stopping of these intermittently driven shafts is accomplished by clutches, cams, and associated latching mechanisms.

The selector cam shaft 192 is mounted coaxial with the main shaft 189, is coupled to it by means of friction clutch 190, and is permitted to rotate ½ revolution for each received code group. Starting and stopping of cam shaft 192 is accomplished by mechanisms described hereinafter. The selector cam shaft 192 transmits power to a stop plate 218, selector cams 219, transfer-lever latch tripping cam 220, and a manual tape feed-out cam 221.

The function shaft 194 is mounted to one side of, and parallel with, main shaft 189. A constantly rotating function shaft driving gear 224 on the main shaft 189 meshes with a function shaft drive gear 225 on function shaft 194. This driven gear 225 is mounted to turn freely on the function shaft and rotates continuously when the motor is running. When clutch teeth 226, cut into one side of gear 225, are engaged by the teeth of a sliding clutch drum 227, the function shaft 194 is forced to rotate with the function shaft driven gear 225. The clutch drum 227 is keyed to the function shaft by a shock coupling 228 composed of two metal disks 229 bonded to a thick, round rubber pad 230. One metal disk has a collar 231 which fastens the coupling 228 to the end of the function shaft 194. The other disk has two studs (not shown) that key the axially shiftable clutch drum 227 to the coupling 228. The function shaft revolves only ½ revolution at a time and is stopped, by unclutching of clutch drum 227, near the end of each selection transfer operation. The sliding clutch drum 227 includes integral diametral stop arms 234 and is pushed out of engagement with the gear clutch teeth 226 when either one of the stop arms 234 strikes a roller 235 pivotally carried on the end of a clutch latch 236 (FIGURES 4 and 6). This action will unclutch and halt rotation of function shaft 194. When the shaft 194 must revolve again the clutch latch 236, by mechanism to be described, is moved away from the stop arm 234 and the pressure of a spring 237 pushes the sliding clutch drum 227 into mesh with the gear clutch teeth 226.

The clutch latch 236 must permit engagement of the clutch drum 227 with teeth 226 to drive the function shaft 194 each time a received group of signalling conditions is converted to mechanical positions and these positions transferred to the code rings. Means for accomplishing the above steps are described hereinafter in connection with the selector mechanism, but the transfer mechanism includes a transfer lever pivot shaft 240, journalled in the two vertical frames 115 and 116, which rotates with the transfer mechanism away from and back to a normal position. As shown in FIGURES 4 and 6 the clutch latch 236 is fixed to one end of the transfer lever shaft 240 at the rear side of vertical frame 116. When the shaft 240 is moved away from its normal position by a transfer operation, the roller 235 on the latch arm 236 moves out of blocking position relative to a clutch drum arm 234 and permits the clutch drum 227 under spring biasing action to engage teeth 226 and drive the function shaft. As will be described, the transfer mechanism and shaft 240 are restored to a normal position just prior to completion of each ½ revolution of the function shaft, causing the clutch latch 236 to move back into the path of a stop arm 234 on the clutch drum 227. The alternate stop arm 234 strikes the latch roller 235, disengaging the clutch and function shaft rotation is halted. Thus, the function shaft 194 can turn only ½ revolution each time the transfer operation takes place.

The function shaft 194 is geared to the selector stop-arm shaft by driving gear 208 which, as stated, is the center disk of the function shaft friction clutch 191. The driving gear 208 meshes with smaller driven gear 215 firmly fixed to the selector stop-arm shaft 193. The friction clutch arrangement permits the function shaft 194 to drive the selector stop-arm shaft 193 and to continue rotating to perform additional operations after rotation of the stop-arm shaft 193 is stopped as hereinafter described. The selector stop-arm shaft drives and positions a typewheel by gearing to be later described.

Eight cams on the function shaft permit the shaft to initiate and supply the necessary power for a number of operations. Seven of the cams are shown in FIGURE 7 and the eighth in FIGURE 9. Starting from the selector stop-arm driving gear 208 and moving forward on the function shaft 194, the eight cams are listed in sequence below. The use of each of the cams is covered in the description of the remaining mechanisms of the reperforator.

(1) Code ring locking lever stud cam 242 (FIGURE 9).
(2) Typewheel reciprocating and detent cam 243.
(3) Sensing levers restoring cam 244.
(4) Transfer lever restoring cam 245.
(5) Print cam 246.
(6) Typewheel register cam 247.
(7) Ribbon feed cam 248.
(8) Punch arm cam 249.

All of the foregoing eight cams are double with the exception of the ribbon feed cam 248, hence for each ½ revolution of the function shaft 194 each of seven cams will accomplish one operation while the ribbon feed cam 248 completes an operation for each full revolution of the function shaft.

Best illustrated in FIGURE 4, a bracket 254 is fitted to the back face of rear vertical frame 116 and contains a bearing 255 aligned with a similar bearing 256 in the vertical frame 116. By suitable means, the main shaft 189 is journalled in an axially fixed relation in bearings 255 and 256 with the clutch fork 205 positioned between the two vertical frames 115 and 116. The selector cam shaft 192, axially aligned with main shaft 189, is rotatably journalled in axially fixed relation in a bearing located in the front vertical frame 115. The stop plate 218, selector cams 219 and transfer lever latch tripping cam 220 are on the end of shaft 192 that projects from the front side of vertical frame 115, while the manual tape feed-out cam 221 and friction clutch 190 are positioned between the two vertical frames 115 and 116.

To the left of and parallel with the main shaft 189, in FIGURE 4, the function shaft 194 is axially fixed, rotatably journalled in and extends beyond the front and rear faces respectively of vertical frames 115 and 116. The end of the function shaft extending behind vertical frame 116 carries the function shaft driven gear 225, the sliding clutch drum 227 and the shock coupling 228. Between the two vertical frames are the function shaft friction clutch 191, the typewheel reciprocating cam 243 and the sensing levers restoring cam 244. Closely adjacent the front face of vertical frame 115, the transfer lever restoring cam 245 (FIGURE 5) is fixed to function shaft 194. The front end of the function shaft extends beyond the front face of vertical frame 115 and through a journal in a punching and printing assembly support frame 258, which is parallel to and fastened by screws on the vertical frame 115 to provide support for the printing and punching group 124. At the forward end of function shaft 194, adjacent the front face of support frame 258, the print cam 246, register cam 247, ribbon feed cam 248 and punch arm cam 249 are fixedly mounted.

*Selector mechanism*

The purpose of the selector mechanism 118 (FIGURES 10-16) is to translate received code signalling conditions or impulses into a mechanical selection which will result in the printing and punching of the proper character or the selection of some other nonprinting operation. A detailed description of how the selector magnet armature 270 is moved to the marking and spacing positions in response to received code signals is presented hereinafter. These armature movements are recorded mechanically in the selector mechanism 118 which provides a sequence of mechanical movements to accept and record the incoming code impulses. The cams 219 on the selector camshaft 192 (FIGURES 5, 7, 11 and 12), five selector levers 271, five Y-levers 272, and the selector magnet armature 270 are used to record the code impulse sequence.

Operation of the selector mechanism begins with reception of the start impulse of a code group. The purpose of the start impulse (spacing signal) is to permit the selector camshaft 192 to begin ½ revolution. When started, the selector mechanism 118 records each of the five code impulses as each is received. Reception of the stop impulse (marking) immediately after the fifth code impulse stops rotation of the selector camshaft.

To synchronize operation of the reperforator with the incoming electrical impulses, the selector cams 219 are started from a stopped position at the beginning of each code group, and stopped at the end of each code group. As previously described, the selector camshaft 192 is driven from the end of the main shaft 189 by a friction clutch 190. When current is flowing in the signal line (normal marking condition in a neutral system when messages are not being transmitted), the camshaft is prevented from turning by the interoperation of the selector-magnet armature 270, a stop lever 273, and stop plate 218 (FIGURES 10 and 13). The stop lever 273 is pivoted on stud 274 and is biased by spring 275 toward the base of fixed comb 276. The armature 270, when lowered by a marking condition, blocks the end of stop lever 273 which, in turn, holds the stop plate 218 and selector camshaft 192 motionless. When the start (no current) spacing impulse for a signal is received, the armature 270 is raised, releasing the end of the stop lever 273, which then permits the stop plate 218 to cam the stop lever 273 out of blocking position, enabling the stop plate 218 and selector camshaft 192, driven by the friction clutch 190, to immediately start to rotate, bringing the first selector cam 219 into engagement with its selector lever 271 by the time the next impulse (first of the five code impulses) is received. Thereafter, each of the remaining five selector cams 219 engages its corresponding lever 271 one after the other because of the staggered angular arrangement of the cams with respect to each other on the shaft (FIGURES 5 and 7). The predetermined speed of rotation of the cams causes each of the five cams 219 to contact its respective selector lever 271 during the time the corresponding code impulse is being received. All five selector levers 271 are operated during ½ revolution of the camshaft 192 as each of the stop plate and selector cams are double. Camshaft 192 is limited to ½ revolution at a time by the stop impulse at the end of each code group. This impulse moves the magnet armature 270 to the marking position where it blocks the stop lever 273 which, in turn, blocks the stop plate 218 on the camshaft 192 as it completes ½ revolution. The camshaft 192 is held in this stopped position until reception of the start impulse of the next code group releases the stop lever 273 as described above.

Each of the five code impulses of a code group is recorded in the form of a clockwise (FIGURE 11) or counterclockwise (FIGURE 12) movement of each of five corresponding Y-levers 272. This is accomplished by the five selector cams 219 operating in conjunction with the five selector levers 271 and the selector-magnet armature 270. The five Y-levers 272 are mounted on a common pivot stud 278 in front vertical frame 115. The five selector levers 271 are mounted on pivot stud 274 also in front vertical frame 115. Each selector cam 219 operates in conjunction with only one selector lever 271 and one Y-lever 272. Thus, there are five trains of parts, one behind the other, each containing a selector cam, a selector lever, and a Y-lever. The latching end of the selector-magnet armature 270 is wide enough to engage all five selector levers 271 and the stop lever 273 when in the marking position. Each of these five trains of parts records one of the code impulses. The first train records the first impulse, the second train, the second impulse, and so on. During the time a marking code impulse is received (FIGURE 11), the selector-magnet armature 270 is positioned downward to engage the selector levers. About the middle of this time period, the selector cam 219 for that code impulse will rotate to the position shown and operate its selector lever. Because the armature 270 is in position to engage the end of the selector lever 271, pivoted movement of the lever about stud 274 is permitted only a limited amount until the end of the selector lever interengages with the latch end of the armature preventing further extended pivotal movement of lever 271 about stud 274. As the cam 219 continues to push against the middle of the selector lever 271, the lower bifurcated end 280 of the selector lever is forced to move, by sliding on the squared pivot bearing 281, against the bias of a spring 282. In so doing, the selector lever 271 pushes against the lower arm 283 of the Y-lever 272, turning the Y-lever clockwise, unless it is already in that position. Further rotation of the cam 219 releases the selector lever and permits the spring 282 to pull the bifurcated end 280 back to normal position, but the Y-lever 272 remains in the clockwise position. Spring-loaded friction plates 284, mounted between the Y-levers 272, cause the lever to remain as positioned until positively repositioned. In this way, a marking code impulse is recorded in the selector mechanism in the form of a clockwise position of a Y-lever. Note, when the selector lever is spring biased back to normal position the latch end of armature 270 is released.

During the time a spacing code impulse is received (FIGURE 12) the selector magnet armature 270 is positioned to the upper position. Near the middle of this time period, the selector cam 219 for that code impulse will rotate to the position shown and operate its selector lever 271. Because the armature is now in the spacing position, it does not latch the upper end of the selector lever 271. As the cam 219 pushes against the middle of the selector lever 271, the bifurcated end 280 of the selector lever with squared bearing 281 is free to rotate around the pivot stud 274 bearing. When thus pivoted, the selector lever pushes against the upper arm 285 of the Y-lever 272, turning it counterclockwise, unless it is already in that position. In this way, a spacing impulse is recorded in the selector mechanism in the form of a counterclockwise position of a Y-lever.

All five code impulses of each code group thus are recorded mechanically in the form of clockwise (marking impulse) or counterclockwise (spacing impulse) positions of five Y-levers 272.

Although the time length of each code impulse is normally 22 milliseconds, only about 5 milliseconds of that time is required for the selector cam to position a Y-lever. Under ideal conditions, maximum reliability is obtained when the Y-lever positioning time occurs during the middle of the 22 milliseconds. A range finder mechanism 290 substantially as described in United States Letters Patent No. 2,689,272 permits sensitive control of the Y-lever positioning time in relation to the total time of each received code impulse. The range finder mechanism 290 (FIGURES 4, 5 and 10) provides this sensitive control by permitting a very fine adjustment of the angular position relationship of the selector cams 219 in respect to the stop plate 218. Increasing the angle between the cams 219 and the stop plate 218 causes the selector cams to position the Y-levers 272 later during each code impulse. Decreasing the angle causes the Y-levers 272 to be positioned earlier during each code impulse. The angular position of the stop plate is controlled by the position of a grooved pin 291 in the end of the cam shaft 192 (FIGURE 7). The angle is increased whenever the pin 291 is moved inward and is decreased whenever the pin is moved outward. The position of the grooved pin 291 is controlled by the range dial 292 and range finder cam 293. Clockwise rotation of the range dial 292 causes the cam 293 to push the pin 291 inward, and the Y-levers 272 are positioned later during each code impulse. Counterclockwise rotation of the range dial has the opposite effect.

*Transfer operation.*—After the five Y-levers 272 have been positioned in accordance with the five code impulses, the Y-lever settings must be transferred to five code rings 300 similar to the one shown in FIGURE 15. The five rings 300 pivot around the selector stop-arm shaft 193. To cause selection of the proper character or non-printing operation, each of the five code rings 300 must be positioned in one of two positions, clockwise or counterclockwise, around the stop-arm shaft 193. Each code ring has a slotted tail 301 which mates with one of five associated T-levers 302 (FIGURES 14–16). The five T-levers 302 are mounted on a common pivot stud 303 at the upper end of a transfer lever 304. A slight rotation of a T-lever 302 on stud 303 causes the mating code ring 300 to turn in the opposite direction. The T-levers 302 are mounted in the same planes as Y-levers 272. A transfer operation occurs when the transfer lever 304 turns slightly clockwise, moving the arms 305 and 306 of the T-levers 302 against arms 307 and 308 of the Y-levers 272. This action transfers the code impulse recorded settings of the Y-levers 272 to the five T-levers 302 and thus to the code rings 300.

The transfer operation occurs immediately after the fifth code impulse is stored in the fifth Y-lever. The latch tripping cam 220 on the selector camshaft 192, which also rotates the selector cams, at this time moves against a transfer-lever latch 310, rotating the latch and the latch pivot shaft 311 a slight amount against the tension of a latch spring 312. The lower arm 313 of the latch 310 moves away from latching engagement with the transfer lever 304. This action permits the transfer-lever spring 314 to turn the transfer lever 304 clockwise, moving the T-levers 302 against the Y-levers 272. At this instant, each Y-lever that is positioned clockwise, engages the upper arm 305 of its associated T-lever turning the T-lever counterclockwise and moving its associated code ring 300 in a clockwise direction (FIGURE 15). The reverse action occurs and the associated code ring is moved counterclockwise for each Y-lever that is positioned counterclockwise (FIGURE 16).

A code ring cage 319, with a back plate 320 and front plate 321 rigidly connected by cross braces (not shown), is fixed to the vertical frame 115. The stop arm shaft 193 passes through each of the cage plates and the code rings 300 are journalled on shaft 193 between the two plates 320 and 321. Radial slots 322 are formed in a circular arc in each plate. The back plate 320 includes forwardly projecting reinforced spaced arms 323 that bracket the tails 301 of the code rings 300 and constitute limit stops for the two positions of the code rings.

A plurality of stop bars 324 (32 in the illustrated embodiment) are arranged in an inner and outer concentric row about a semicircle in the code ring cage slots 322. Each stop bar 324 extends beyond the front face of plate 321 and the rear face of plate 320. A spring 325 is disposed between each set of inner and outer stop bars 324 (FIGURE 17) and cause a biasing force tending to pivot the stop bars on the ends of the slots 322 in the rear plate 320 so the front ends of the outer and inner rows of stop bars 324 are urged inward and outward respectively. All but a selected one of the stop bars are prevented from movement under bias of springs 325 by coaction with the code rings.

A stop arm 326 is fixed on and rotates with the stop arm shaft 193 in front of the code ring cage 319. Diametral arms of the stop arm 326 have, at their ends, inner 327 and outer 328 circumferentially offset projections for engaging a respective inner or outer selected stop bar 324. The inner projections 327 of the stop arm 326 halts the arm halfway between the outer projection positions. Thus the stop arm 326 can be stopped in any of thirty-two positions without rotating more than 180 degrees.

Each code ring 300 has permutatively arranged selecting notches 330 cut into the inner and outer edges of the curved sector portion 331 of the ring. After the transfer operation, the rings 300 are arranged so that a notch 330 in each of the rings is in line with a notch 330 in the other four rings at only one point around the curved sector 329 of the ring. At this point (FIGURE 17), a groove of aligned notches is formed under the stop bar 324 to be selected. The pressure of the stop bar compression spring 325 pivots the selected stop bar into the groove, placing the front end of the bar 324 into the path of rotation of the inner or outer projection 327, 328 of the stop arm, to stop rotation of the stop arm 326 as described hereinafter.

The T-levers 302 must be moved away from the Y-levers 272 before the next code group can be set up in the Y-levers. This action is accomplished when the transfer lever 304 is restored to the latched position (FIGURE 14). The transfer lever 304 must be rotated counterclockwise from its position in FIGURE 15, against the tension of its spring 314 and latched in this counterclockwise position by the transfer-lever latch 310. The transfer-lever restoring cam 245, mounted on the function shaft 194, accomplishes this action as the function shaft completes ½ revolution. The function shaft 194 immediately starts turning when the transfer lever 304 moves the T-levers against the Y-levers because the slight rotation of the transfer lever 304 causes clutch latch 236 to rotate slightly, since both are attached to the same shaft 240. The clutch latch 236 rotates away from the engaged stop arm 234 on the function shaft clutch, drum 227 permitting the clutch teeth to engage. Subsequent rotation of the function shaft 194, through the restoring cam 245, moves the transfer lever 304 to the restored latched position which also moves the clutch latch 236 back into blocking position relative to the next clutch drum stop arm 234.

When the code rings 300 are positioned as described above, an immediate selection of a stop bar 324 is made. Each of the five code rings has notches cut into its inner and outer edges. The notches in the first code ring are arranged so that when the code ring is set in the marking position (clockwise), notches will be in line with the stop bars of those code groups which include a marking impulse as the first code impulse (FIGURE 18). High points will be in line with the stop bars of those code groups which includes a spacing impulse as the first code impulse. The reverse is true when the code ring is set in th spacing position (counterclockwise). The second code ring is notched in accordance with the second signal for each code group, the third code ring for the third signal, and so on. Therefore, when the code rings have been set as a result of the transfer operation, there will be one and only one position along the inner or outer radius of the code rings where there will be a notch in each of the five code rings under a stop bar. The pressure of the stop bar spring 325 then pushes this stop bar 324 into the notches 330 placing it in position to arrest the rotation of the selector stop arm shaft 193. The stop bar 324, previously pushed into an aligned set of notches 330, is pushed out by the sloping surface at the side of a notch 330 in at least one code ring 300. This occurs when the code rings 300 are reset by the transfer operation, unless the same stop bar 324 is selected by repeating a code group. This action releases the selector stop arm shaft 193 making it free to turn until the stop arm 326 strikes the newly selected stop bar 324. The specific portion of the selector mechanism just described is disclosed in the aforementioned application Serial No. 190,359 (Patent No. 2,754,361).

Reception of the letters-shift or figures-shift code group causes that received code group to be punched in the message tape 172 and the typewheel to be positioned for printing letters or figures. No symbol is printed on the tape for these code groups. Reception of the carriage-return, line-feed, and blank code groups do not cause any mechanical operation in the reperforator other than recording the code group in punched and printed form on the message tape. This is also true with the space code group, except that no symbol is printed. Reception of the "S" code group, while the reperforator is in the figures shift position, causes a signal bell to ring. The code group also is punched in the message tape and a bell-like symbol is printed.

During accomplishment of the selected operation in the reperforator, the code rings 300 are locked in position by a code ring locking lever 336 (FIGURES 10 and 19). The code rings 300 remain locked in position for almost ½ revolution of the function shaft 194. As the shaft reaches the end of ½ revolution, the code ring locking lever 336 releases the code rings 300 to permit positioning of the rings by the next transfer operation after receipt of the next code group. The locking lever 336 is fastened adjacent one end of a shaft 337 which is journalled at 335 in the front code ring cage plate 321 (FIGURES 6 and 10) and passes through an ear 338 of a function plate 339 mounted on the back face of the vertical frame 115. Fastened to the rear end of shaft 337 and spaced behind the function plate 339 is a cam follower arm 340. The follower end 341 of arm 340 extends to a position adjacent the front disk 210 of the function shaft friction clutch 191. As previously noted, disk 210 of the friction clutch 191 has two studs 242 mounted 180° apart. While the code impulses are being stored in the selector mechanism, the function shaft 194 is motionless with one stud 242 just under the cam follower end 341. When the function shaft 194 starts rotating, after transfer of a code group to the code rings 300, this stud 242 moves counterclockwise permitting a spring 342 on the cam follower 340 to pull the cam follower downward. As the cam follower 340 and the code ring locking lever 336 are fixed on shaft 337, the locking lever 336 also will move downward against the code rings. Lever 336 has its free end 343 bent to a position transverse to and overlying all of the code rings 300 adjacent one end of the sector arc 331. A small lug 344 projects from the end of the code ring sector 331 and, depending on the associated code ring position, will be positioned on one side or the other of the bent end 343 of lever 336. When cam follower 340 allows lever 336 to be biased against the code rings 300, cooperation between the bent end 343 of lever 336 and all of the lugs 344 prevents any inadvertent shifting of the code rings 300. When the function shaft 194 approaches the end of its half-revolution, the opposite stud 242 on driving disk 210 will move the cam follower 340 and the code ring locking lever 336 upward, releasing engagement between bent lever end 343 and lugs 344 to unlock the code rings, preparing them to be positioned by transfer of the next code group.

Driven by the function shaft 194 through the friction clutch gear arrangement 191, the selector stop arm shaft 193 (FIGURES 4, 5 and 20) drives the typewheel hub driving gear 350 and turns the selector stop arm 326. The driving gear 350 is connected to shaft 193 by a flexible coupling 349 to prevent stresses due to the sudden stopping of shaft 193 by engagement of the stop arm 326 with selected stop bars 324. As will be presently described, the selector stop arm 326 and typewheel are in geared alignment so that the desired character will appear on the typewheel in the printing position when the selected stop bar 324 stops rotation of the selector stop arm 326. Thus, the position of the code rings 300 and stop bars 324 determines the character or symbol to be printed and, by other mechanism, punched. Because the selector stop arm shaft 193 must be positioned accurately in order to select the proper characters and functions, little bouncing can be tolerated when rotation of the stop arm 326 is halted by a stop bar. To prevent excessive bouncing, an antibounce clutch 351 (FIGURE 21) is mounted on the selector shaft 193 between the code ring cage 319 and the selector stop arm 326. The central portion 352 of the clutch 351 is fastened to the selector stop arm shaft 193. The outer part 353 of the clutch is locked in place by engagement of notch 354 with a stud (not shown) on the code ring cage. Four rollers 355 in the clutch 351 are biased by springs 356 in notches 357 cut into the center portion 352 of the clutch at an angle that permits only clockwise rotation of the shaft 193. The rollers 355 roll along the inside surface of the cylindrical housing 353. Any attempt to make the shaft 193 rotate counterclockwise will immediately cause the rollers 355 to jam between the housing 353 and the moving part 352 of the clutch. Thus, any tendency to reverse direction is minimized.

*Printing*

The printing operation in the reperforator is accomplished by the mechanism shown in simplified form in FIGURE 20. Portions of the selector and transfer mechanisms are included in this illustration to show the relationship between all mechanism concerned. Actual details of the mechanism are also shown in FIGURES 22, 24 and 25.

A typewheel 360 has its periphery divided in two rows containing the raised letters of the alphabet, symbols, and figures that may be printed by this perforator and can be made of any suitable material, preferably nylon, and is fastened on a flanged end of a hollow hub shaft 361 by screws 362. Hollow hub shaft 361 is rotatably journalled and axially shiftable on a stud shaft 363 projecting from support frame 258 parallel with the selector arm shaft 193. Integrally fastened to hub shaft 361 is an elongated pinion gear 364 enmeshed with, and axially slidable relative to the driving gear 350.

The typewheel 360, through hub shaft 361 and gear 364, is driven by the typewheel hub driving gear 350 on the selector stop arm shaft 193, and any rotation of the selector stop arm shaft 193 will rotate the typewheel. After a received code group has been set up on the code rings 300, the stop arm 326 rotates until it is stopped by one of the stop bars 324 of the code ring cage 319. The typewheel 360, geared with a 2:1 ratio to the stop arm shaft 193, also rotates and when stopped, the letter on the typewheel corresponding to the stop arm position will appear directly above a print hammer 368. The reperforator can stop the typewheel 360 in any of 32 positions, as the unit includes 32 stop bars 324, each in a different position in the code ring cage 319. Of the 32 possible typewheel positions, 26 are used for letters of the alphabet, 3 are for symbols, and 3 are blank and do not print (FIGURE 18). When the typewheel is in figures shift, the same typewheel angular positions used for the alphabet are used for numerals, punctuation marks, and communication symbols.

The printing operation is controlled by rotation of the print cam 246 and register cam 247 on the function shaft 194 (FIGURES 7 and 20). The function shaft 194 begins ½ revolution immediately after a stop bar 324 is selected. The typewheel register lever 369, pivoted on a shaft 370 held in fixed position by support frame 258, rides against the register cam 247 on function shaft 194 and is pulled sharply upward by spring 371 when a high part 372 of the cam passes the contacting portion 373 of the register lever 369. The bent blade 374 at the left end of the register lever 369 engages a notch in a 32 tooth pitch register wheel 375, fixed to rotate with typewheel shaft 361. The teeth in the periphery of register wheel 375 correspond to and are aligned with type characters on the periphery of the typewheel 360. Engagement of register lever blade 374 with a notch or tooth space in the register wheel 375 locks the typewheel in the desired character position directly above the print hammer 368. At the same time, a print hammer blocking stud 376 attached to a horizontal arm 377 of register lever 369 moves downward, away from blocking engagement with a horizontal arm 381 of a print hammer lever 380. The print hammer lever is also pivoted on shaft 370 and has a cam follower arm 382 and a print arm 383 carrying the hammer 368. As a high portion 384 of the print cam 246 rotates past the follower end 385 of arm 382 of the print hammer lever 380, the lever is pulled sharply upward by a spring 386. The print hammer 368 strikes the paper tape 172 pressing an inking ribbon (to be described) against the desired character on the locked typewheel 360. After the character has been printed, the register lever cam 247 moves the register lever 369 downward, disengaging the register wheel 375 and the typewheel 360 is free to rotate for positioning the next selected character. As previously mentioned printing does not occur when the letters shift, figures shift, or space code group is received. The stop bars for these operations halt rotation of the selector stop arm 326 at a position that causes a high portion 388 (three blank tooth spaces) of the register wheel 375 to stop directly above the register lever blade 374. When the register lever cam 247 permits the register lever 369 to begin moving upward, the blade 374 strikes against the high portion 388 of the register wheel preventing the register lever 369 from moving fully to the upward position, and the print hammer lever blocking stud 376 will block rotation of the print hammer lever 380. With the stud 376 in this position, the print hammer lever 380 cannot follow the surface of print cam 246 and its printing movement is prevented. Eccentric mounting of stud 376 enables adjustment of the blocking cooperation between the register lever 369 and print lever 380.

*Tape punching and feeding operations*

In addition to printing messages on a paper tape, the reperforator records the code impulses of each received code group in the form of punched code holes in the tape. Shown in FIGURES 1 and 2 is a message tape 172 containing information in typed and perforated form. The printing appears along the front edge of the tape, and the code impulses or conditions are recorded as a row of holes across the tape. This perforated portion of a message tape in the illustrated embodiment, is subdivided into six columns; five for the code holes and one for the tape feed hole. The first column along the rear edge of the message tape opposite the printing is reserved for recording the first code condition. When it is a marking condition, a code hole is punched in this column, and when it is a spacing condition, a hole is not punched. The second column is used to record the second code condition in a like manner. The third column consists of a continuous row of smaller holes which are used for feeding the message tape through the reperforator. The remaining three columns are used for the third, fourth, and fifth code conditions. Start and stop impulses or conditions are not recorded in perforated form because tape transmitter mechanisms automatically provide these signals. It is to be understood that this invention may be utilized to punch any number of code perforations and is not limited to the five unit Baudot code.

Punching operation begins when the code conditions of a received code group are stored in the code rings 300 as previously described. Details of the punching mechanism are illustrated in FIGURES 22–24 and 26 and the simplified functional diagram of FIGURE 27. The lower end of each code ring sector 301 is provided with a slot 394. In the simplified FIGURE 27 the slot 394 is cut in the code ring sector 301, however the preferred structure is shown in FIGURE 14 wherein a small plate 395 with the slot 394 formed therein is brazed or otherwise suitable attached to the side face at the end of each code ring sector 301.

The slots 394 in the lower end of each of the five code rings 300 receive operating arms 396 of five corresponding punch interference levers 397 similar to the one shown in FIGURE 27.

These levers 397 transfer the code ring settings to the punching mechanism. All five interference levers 397 (FIGURE 26) are rotatably journalled and axially fixed on a common shaft 398. Shaft 398 is journalled at the rear end on a rearwardly projecting boss 399 of the support frame 258 and at the front end in an adjusting plate 400 bolted to a support plate 401 which is rigidly fastened to the support frame 258. Each lever 397 is formed as an elongate U with the legs journalled adjacent opposite ends of shaft 398. One end of the elongate U shaped member includes the upstanding operating arm 396 while the opposite end includes a depending interference arm 402.

Journalled between the support frame 258 and support plate 401 is a punch arm assembly 404 (detail view FIGURE 28) which includes an operating arm 405 having in one end an eccentrically mounted adjustable cam follower pin 406. Spaced forwardly and rigidly fastened to arm 405 by a journal sleeve 407 is an auxiliary arm 408. The sleeve 407 is pivotally journalled and axially fixed on a shaft 409 fastened between the support frame 258 and support plate 401. Extending between the punch arm 405 and auxiliary arm 408 is a journal post 412 (FIGURE 24) having a head 413 on one end and a lock nut 414 on the other end. Loosely journalled on post 412, between arms 405 and 408, and spaced washers 415, are five code punch levers 416 and one feed punch lever 417. The left end 418 of each of the six punch levers is bifurcated as shown in FIGURE 27. The right end of each code punch lever 416 has an upstanding lug 419 aligned with the interference arm 402 of the corresponding interference lever 397. In addition to lugs 419, the right end of each code punch lever 416 has a downwardly directed extension 420 adapted to abut against an abutment rod 421 extending between the punch arm 405 and auxiliary arm 408 below the journal sleeve 407. FIGURE 29 shows the feed punch lever 417 having a specially formed right hand end 422 bifurcated and engaged around the abutment rod 421. This prevents pivotal movement of the feed punch lever on post 412.

Cam follower pin 406 in the end of punch operating arm 405 journals a roller 427 which engages within the enclosed cam track 428 in punch arm cam 249 on the end of function shaft 194. During each ½ revolution of the function shaft 194 the punch arm assembly 404 will be pivoted counterclockwise away from and clockwise back to its inactive position about the pivot axis of journal sleeve 407. This pivotal movement of the assembly 404 raises the post 412 with all of the punch levers 416 and 417, causing the bifurcated ends 418 of any selected code punch lever 416 to be positively shifted up and down and, because the feed punch lever 417 is never free to pivot on post 412, always positively shifts the bifurcated end 418 of the feed punch lever 417 up and down.

When a code ring 300 is positioned counterclockwise to record a spacing impulse, the mating interference lever 397 is rotated clockwise (FIGURE 30). The interference arm 402 moves away from the raised lug 419 of its corresponding code punch lever 416 permitting the lever 416 to freely pivot about post 412 when a punching operation occurs. When a code ring 300 is positioned clockwise (FIGURES 27 and 31) to record a marking impulse, the mating interference lever 397 rotates counterclockwise. This causes the interference arm 402 of interference lever 397 to move into blocking position directly above the raised lug 419 of its corresponding code punch lever 416. When the punching operation occurs the blocked lever 416 is held against abutment rod 421 and the bifurcated end 418 must shift up and down in a positive manner.

The five code punches 430 and the feed punch 431 are mounted in an integral punch block support 432 (FIGURES 23, 24, 32 and 33) which in turn is bolted to the support frame 258.

Each punch has a shank provided with a side recess 433 extending from adjacent the bottom end 435 to an intermediate portion of the punch. All punches pass through holes in the base of the punch block support 432 and are held in place by a retaining comb 434 cooperating with the punch shank recesses 433 and fastened by suitable means such as small bolts to the bottom of support block 432. Each of the code punches 430 and the feed punch 431 have their end 435 engaged by an associated punch lever 416, 417. It is noted that the feed punch is smaller in diameter than the code punches. Clearly illustrated in FIGURE 33, the upper lug of bifurcated punch lever end 418 is cut away on one side to approximately half the thickness of the lower lug. This enables the bifurcated ends 418 of each punch lever to positively bracket the shouldered end 435 of the corresponding punches. The lower lugs of bifurcated ends 418 are relatively heavy, compared to the upper lugs, as they must exert a greater force against the bottom of the punches 430, 431 when pushing the punches through the tape whereas the thinner upper lugs of the bifurcated ends 418 need only exert the force necessary to pull the punches back down through the tape. The support 432 also carries some of the tape feed mechanism as will be later described and is removable and replaceable as a unit.

The punching operation occurs after the transfer operation positions the code rings 300 and corresponding interference levers 397 in accordance with the received code conditions. One-half revolution of the punch cam 249, mounted on the function shaft 194, provides the power required for the punching operation. The cam starts one-half revolution when the transfer operation occurs. As this cam 249 revolves, it moves the roller 427 and associated end of the punch arm 405 downward causing the opposite end of the punch arm assembly 404, containing the punch levers 416, 417 to move upward toward the punches 430, 431. The code punch levers 416 that are blocked by the intereference arm 402 of the mating interference levers 397, push their respective punches 430 upward through the tape 172 to record marking code conditions. The code punch levers 416 that are not blocked by the interference arm 402 of interference levers 397 will pivot counterclockwise slightly on their shaft 412 because the punches engage the tape and because the interference levers do not block the resultant counterclockwise pivotal movement of the levers. Thus, unblocked levers 416 do not move the punches 430 to perforate the tape thereby indicating a spacing code condition. As the upper leg of the bifurcated lever ends 418 rest in the punch recesses 433, downward movement of the levers 416, 417 will positively move all punches to an inactive position. Fastened to the top of the punch block support 432 by screws 438 is a matched die plate assembly 440. Die plate assembly 440 is in two parts, a die plate 441 and a stripper plate 442 (FIGURES 27 and 33) spaced along part of their extent to provide a tape receiving slot 443. Each plate part 441 and 442 is beveled at the entrance to slot 443 to facilitate feeding the tape into the die plate assembly from the end of a tape guide chute 444 which is fastened to the print and punch support frame 258 by a screw 445. During the inactive position of the punches, their punching ends are below the slot 443 and at the top limit of their punching stroke the punching ends are positioned within the upper die plate 442. Note that the ends of the punches are ground on an angle from the front of the assembly toward the rear and each punch is a different length with the feed punch being shortest. Because of this arrangement only one punch is punching a hole at any given instant in the punching operation. Although all selected punches are operated simultaneously their punching action is not simultaneous.

We produce the matched set of punches by placing all of the punch blanks 430 and 431 in a side by side relationship, (FIGURE 53) either abutting one another or in close proximity, with the ends 435 of their shanks aligned on a line normal to the punch axes. If any assembly would require the shank ends of the various punches to be offset from each other they would be so arranged in this step. With the punches so positioned they are fastened in a suitable jig 436. The punch ends of the complete set of punches are then finished by grinding. During the grinding operation the plane containing the punch axis is maintained perpendicular to the grinder 437 while the punch axes are canted a slight amount from perpendicular, preferably at least 2 degrees. The resultant matched set of punches will have controlled individual lengths, each of which differs from the other and the angle of the punching end of each punch will be identical. By using this method the punch ends may be either flat ground or hollow ground. As seen in FIGURE 33 the feed hole punch 431 is the shortest punch and thus will be the last punch to actually punch through the message medium. In preparing the punches for this embodiment the feed hole punch 431 is placed as the end punch in the jig 436.

A chad tube 446 has one end closely abutting the upper surface of die plate 442 in surrounding relative to the upper openings of the die holes. The tube 446 is mounted to front vertical support 115 by a suitable bracket (not shown) and is formed to curve up and to the rear of the die plate 442 so it will not obstruct the operator's view of the printed message on the front edge of the tape. The chad tube 446 continues to the rear and down with its other end directed into the chad box 168. Thus the chad or perforated particles of tape are collected and prevented from getting into the machine mechanisms.

Tape feeding in this reperforator is accomplished by a slight intermittent rotation of a tape feed sprocket 448 fixed to a shaft 449 which is journalled in the punch block support 432. The feed sprocket is positioned immediately to the left of the die plate 440. Shaft 449 extends beyond both the front and rear sides of the punch block support 432 and has fixed to the end extending toward the front of the reperforator, a counterclockwise ratchet wheel 450 and a clockwise ratchet wheel 451. Tape feeding occurs immediately before the tape is punched and power is provided by the punch arm assembly 404 when it begins the punching operation. With reference to FIGURES 22, 24, 34 and 35, the auxiliary lever arm 408 of the punch arm assembly 404 carries an eccentrically mounted adjustable post 454 parallel to the punch arm assembly pivot axis. A feed pawl 455 has an attached sleeve 456 journalled on the post 454 for pivotal movement. The feed pawl end 457 is normally biased by a spring 459 into engagement with a limit pin 458 fixed in the punch support block 432 and is thereby held just out of contact with the counterclockwise ratchet wheel 450. As the punch arm assembly starts to move upward, it causes the feed pawl 455 to slide over pin 458 to engage and rotate the feed ratchet wheel 450, feeding the tape 172 one step. The feed pawl 455 must not be permitted to continue turning the ratchet wheel 450 during actual punching or the tape will be damaged. Disengagement of the feed pawl 455 from ratchet wheel 450 is accomplished by the feed pawl adjusting screw 462, screw threaded in an extended ear 463 of the punch retaining comb 434. After a predetermined upward travel of pawl 455 a short lever arm 464, integral with the pawl, engages the screw 462 (FIGURE 35) and causes the pawl to pivot against spring bias and lift free of the ratchet wheel 450 immediately before the punches reach the tape. At all times, except during tape feeding, the tape feed sprocket 448 is held motionless by a scalloped tape feed detent wheel 466, tape feed detent lever 467, and a spring 468 (FIGURES 22 and 24). The tape feed detent wheel 466 is fixed to the feed sprocket shaft 449. The detent lever 467, pivotally mounted on an adjustable eccentric post 470 in the punch block support 432, is biased by spring 468 to exert a constant pressure through a roller 469 against the scalloped periphery of detent wheel 466. This pressure also helps to complete the tape feeding step. As the reperforator operation is extremely rapid, the tape feed pawl 445 pushes and almost immediately releases the feed ratchet wheel 450, and the pressure of the detent against the scalloped periphery of the detent wheel 466 is used to rapidly and positively complete the tape feeding operation before punching occurs. The eccentric mounting of adjustable post 470 enables minute adjustments of the ratchet wheel angular position relative to the feed pawl end 457 so the sprocket 448 will be rotated only an annular distance equal to that between adjacent tape feed hole engaging pins 471 fixed in the periphery of the sprocket 448, during each feed step.

Fastened to the punch block support 432 immediately adjacent the sprocket wheel 448 is the tape guide plate assembly 474 (FIGURES 22 and 23). This consists of a stripper plate 475, beveled on its leading edge to enable it to be positioned closely adjacent the periphery of the sprocket wheel 448 used to guide the tape off the feed sprocket pins. A groove (not shown) in the leading edge of the stripper plate bridges the pins 471 in the sprocket wheel 448. Pivotally mounted on the stripper plate 475 is a spring loaded grooved tape roller 476 to hold the tape 172 against the feed sprocket 448 and in engagement with the pins 471. A manual lever 477 is provided to lift the roller away from its tape holding position against the spring bias. Fastened adjacent the stripper plate 475 is a tape guide plate 478 which tends to guide the tape in a horizontal direction as it leaves the stripper plate 475.

A manual tape back-spacer is disclosed in FIGURES 22–24 and is used, if unperforated tape has been fed through the machine, to feed the unused tape back toward the tape supply reel. Best illustrated in FIGURE 23, the back-spacer operating lever 482 is formed with a bridge 483 integrally connecting a front lever arm 484 and a rear lever arm 485. Aligned pivot openings 486 are formed in each of the spaced arms 484 and 485 and journal on a shouldered extended punch block support mounting stud 487. Lever 482 is spaced from the rear wall of punch block support by a spacer sleeve 488. Front lever arm 484 includes a thumb or finger rest 489 on one side of the pivot opening 486 and pivotally carries a spring loaded pawl 490 on the opposite side of the pivot opening 486. Pawl 490 is so arranged to engage and turn the clockwise ratchet 451 on the tape sprocket wheel shaft 449 each time the lever 482 is pivoted in a clockwise direction. The rear lever arm 485 is bifurcated to provide spaced lugs 491 which, in assembly (FIGURE 23), are spaced on either side of a pin 492, which is an extension of the detent lever eccentric post 470, and limit the pivotal movement of the back-space lever. A spring 493 is fixed to punch comb 434 to bias the back-spacer to inactive position out of engagement with the ratchet wheel 451. To prevent back-spacing during any punching operation a stop lug 494, integral with lever arm 484 extends toward but not in front of the feed pawl end 457 and, whenever the feed pawl 455 is moved away from its retracted position a pin 495 in the feed pawl end 457 is positioned in blocking relation to the stop lug 494 and will prevent the required amount of clockwise movement of the back-space lever 482 necessary to engage the back-space pawl 490 with its ratchet wheel 451.

*Manual tape feed-out.*—A manually actuated power operated mechanism is included in this reperforator to permit the feeding of tape out of the unit while a message is not being received. To accomplish this, the operator merely operates the manual tape feed-out lever 500 (FIGURES 1, 4 and 5) at the front of the reperforator, and releases it when sufficient tape has been fed. Manual operation of the tape feed-out lever, through mechanism now to be described, positions the Y-levers 272 for the blank code group (FIGURE 18) and trips the transfer lever 304 by releasing the transfer lever latch 310 and holding it in released position. The printing mechanism prints the blank signal, the perforating mechanism records the blank code group (no code holes) and punches a feed hole in the tape, and the tape feed mechanism feeds the tape. If a code group is received while the tape feed-out lever is operated, the reperforator automatically disables the manual tape feed-out mechanism and proceeds to record the incoming message.

With particular reference to FIGURE 36, the manual tape feed-out lever 500 is clamped on the front end of a control rod 501 journalled in a front bracket 502, which is fastened to the support frame 258 (FIGURE 5), and in a bearing 503 in the front vertical frame 115. A collar 504, fixed on the rod 501 behind vertical frame 115, and a limit stop 505, fixed on the rod in front of support bracket 502, maintain the rod in fixed axially position. A bent ear 506 on the limit stop 505 will engage the support bracket 502 to limit counterclockwise operating movement of the lever 500 and rod 501. Fixed to the rear end of rod 501, which extends back of the vertical frame 115, is a feed-out control lever 508 having a headed stud 509, fixed in the end of the lever, to which is pivotally fastened the lower end of a connecting link 510. The upper end of connecting link 510 is pivotally connected to a feed-out latching lever 513.

With the reference now to FIGURES 36 and 37, the feed-out linkage that coacts with the selector mechanism will be described. A stud post 512 is fixed to and extends rearwardly from the front vertical support 115 above the selector cam shaft 192. Pivotally carried by the post 512 are the feed-out latching lever 513 and a feed out operating arm 514 (shown broken and separated for clarity in FIGURE 36). Springs 515 and 516 are connected respectively from latching lever 513 and operating arm 514 to a common spring post 517 in vertical frame 115 and urge both the lever 513 and arm 514 in a clockwise direction as seen in FIGURE 36 and counterclockwise as seen in FIGURE 37. A lateral ear 518 on latching lever 513 engages an adjustable stop 519 in the vertical frame 115 to limit the pivotal movement due to the bias of spring 515. An extended stop arm 520 on the operating lever 514 engages an adjustable eccentric stud 521 mounted in the vertical frame 115 to limit its pivotal movement due to bias of spring 516. Pivotally carried on a depending arm 522 of the latching lever 513 is a feed-out disabling latch 524 with three extended arms 525, 526 and 527. Spring 528 connects between the latch 524 and a tab 529 on the latching lever 513 and urges the latch 524 in a counterclockwise direction. One of the lower latch arms 525 extends under and is biased by spring 528 into engagement with a lateral ear 532 of the latching lever 513 to limit the spring biased direction of movement of the latch 524. The upper arm 526 of latch 524 is hooked and normally, when in the spring biased limit position, is hooked above a transverse operating bar 533 on the feed-out operating arm 514. Thus, as viewed in FIGURE 37, a clockwise pivotal movement of the latching lever 513 about its pivot post 512 will result in a downward movement of latch 524. The hooked arm 526 of latch 524 engages the transverse bar 533 on the operating arm 514 and causes the operating arm 514 to pivot clockwise against the bias of spring 516. This downward movement of the latch 524 also positions the lower latch arm 527, which is a cam follower arm, adjacent the periphery of the feed-out disabling cam 221 on the selector cam shaft 192, for a purpose to be later described.

The extended portion of the operating arm 514 includes an upper arm 535 and a lower arm 536. Adjustably fixed to and extending forward from the upper arm 535, through a recess in the front vertical frame 115, is a spindle 537. The end of the spindle 537 is formed as an elongate pin 538, whose axis is eccentric to and parallel with the spindle axis, which extends over the upper Y-lever arms 307. Note that operating clearances between the pin 538 and the Y-levers is adjusted by rotating the spindle 537. The lower arm 536 of the operating arm 514 has its end bent in a lateral ear 539, which is positioned above the end of a tripping lever 540 fixed to the end of the transfer lever latch shaft 311.

As seen in FIGURES 4, 5, 6, 36 and 37, the manual tape feed-out lever 500 turns the feed-out control lever 508 counterclockwise (looking from the front end of the reperforator). This action raises the feed-out connecting link 510 which, in moving upward, raises one end of the feed-out latching lever 513 which causes the lever to pivot slightly on post 512, the amount being determined by the adjustment of limit stop 506. As the latching lever 513 pivots, the end 522, moving downward, moves the disabling latch 524 downward, which in turn by hooked arm 526 moves the operating arm 514 downward, which abuts ear 539 against the trip and moves lever 540. Trip lever 540 rotates the transfer-lever latch 310 away from the transfer-lever 304 enabling the transfer-lever spring 314 to operate the transfer-lever 304. The eccentric spindle 537, attached to the upper arm 535 of the feed-out operating arm 514, and extending over the upper arms 307 of all of the Y-levers 272, moves downward and pushes down on all of the Y-levers 272, rotating all five Y-levers counterclockwise to the spacing position (blank code group position). With the release of the transfer lever 304, the transfer operation transfers the blank code group setting of the Y-lever 272 to the code rings 300 and interference levers 397, in the manner previously described, and causes printing of the blank symbol and punching and feeding of the tape. Power for this operation is derived from the function shaft 194 which is clutched to the main shaft 189 by movement of the transfer lever shaft 240 which also controls the clutch latch 236. Note the selector cam shaft 192 does not rotate during this operation. The entire operation is repeated continuously as long as the operator holds the tape feed-out lever 500 in the operated position, unless an incoming code group disables the mechanism, as will now be described.

Feed-out disabling

*Effects of received code group.*—If a code group is received during operation of the manual tape feed-out mechanism, the feed-out mechanism is disabled immediately by the following actions. Receipt of the start impulse, by means previously described, causes the selector camshaft 192 to begin rotating as in normal operation. The feed-out disabling cam 221, mounted on the selector camshaft 192 (FIGURES 7, 36 and 37) immediately engages the arm 527 of and trips the feed-out disabling latch 524, which was held in the latched position by the latch spring 528. When the latch 524 is tripped, the hooked arm 526 releasest the feed-out operating arm 514, permitting the operating arm spring 516 to pull the operating arm 514 upward until stopped by eccentric stud 521. The eccentric spindle 537 on the operating arm 514 is moved upward to release the Y-levers 272. When the operating arm is in the upper position ear 539 on the lower arm 536 is moved away from the trip lever 540, enabling the transfer-lever latch 310 to become operative and engage the transfer lever again. Subsequent operation of the reperforator will be controlled by incoming code groups only. When this occurs, the operator releases the manual tape feed-out lever 500 to reset the feed-out mechanism. Spring 515 of the feed-out latching lever 513 moves the latching lever 513 and manual lever 500 back until the lateral ear 518 of the latching lever hits its limit stop 519. This causes the feed-out latch 524 to re-latch the feed-out operating arm 514. The entire manual feed-out mechanism will now be reset for subsequent operation. Note that receipt of any code group of signals will start the selector shaft rotating and as rotation of the selector shaft disenables the manual feed-out, receipt of any code group is sufficient to disenable the manual feed-out.

Stop bar selection of functions

In addition to recording messages in printed and punched form on tape, the reperforator is capable of performing three mechanical operations called functions.

These are the letters-shift function, the figures-shift function, and the signal bell function.

A stop bar for each function is located in the code ring cage 319, as indicated in FIGURE 38. The signal bell function shares the same stop bar used for selecting the letter "S." Stop bars 324' for these three functions are longer than the other stop bars 324; the additional length extending beyond the other bars at the rear of the code ring cage 319. Three sensing levers 550, 551 and 552 (FIGURE 39), one for each function, are freely journalled on the selector stop-arm shaft 193 directly behind the code ring cage 319. Springs 554 apply tension to the sensing levers 550, 551, and 552, and urge each toward its respective stop bar 324'. A sensing levers restoring lever 555, also freely journalled on the selector stop arm shaft 193 carries, at the end of the lever arm, a cam following roller 556 cooperating with the periphery of the restoring cam 244 on function shaft 194. Each of the sensing levers 550, 551 and 552 include a depending arm 558, 559 and 560, respectively, that are adapted to be engaged by an adjustable eccentric stud 561, carried by the restoring lever 555. Operation of the sensing lever restoring cam 244 and the restoring lever 555 will move the eccentric stud 561 against the three depending arms 558, 559 and 560 to move and hold the sensing levers 550, 551 and 552 away from the stop bars 324' while an incoming code group is being set up in the code ring cage 319.

The function sensing operation begins after the transfer operation positions the code rings 300. As the sensing levers restoring cam 244 on the function shaft 194 begins to rotate, a low portion of the cam permits the restoring lever cam follower roller 556 to move toward the function shaft 194 allowing springs 554 to pull each sensing lever 550, 551 and 552 toward its stop bar. If the code rings 300 have not selected one of the function stop bars 324', the sensing levers rotate under spring bias until each sensing lever strikes its stop bar. The sensing levers 550, 551 and 552 remain in this blocked position until they are again restored by the restoring lever 555 and cam 244. If the code rings 300 select one of the function stop bars 324', the three sensing levers move toward their stop bars until the two which are not selected are halted by their stop bars. The selected stop bar 324' is not in a position to block the sensing lever of the desired function, and the sensing lever rotates past the stop bar, causing operation of the associated function mechanism. When a function stop bar 324' is in the selected position, the front end moves into the notch formed by the code rings in the same manner as the other stop bars 324, which raises the rear extension of the stop bar 324' out of the path of its sensing lever. FIGURE 39 discloses the relationship between the sensing levers at viewed directly from the rear. Note that function plate 339, which is rigidly bolted to the rear face of the front vertical frame 115, includes support abutment faces 564, 565 and 566 behind each function selecting bar 324', giving each bar added support in blocking the sensing levers 550, 551 and 552. The function plate 339 also provides an anchor bar 567 for the sensing lever springs 554.

*Letters shift and figures shift operations.*—The typewheel 360 of the reperforator is moved to a forward position directly above the tape 172 for printing, and moved backward after printing to expose the printed character to view. This forward and rearward action of the typewheel 360, hollow shaft 361, hub gear 364 and register wheel 375 as a unit, is called typewheel reciprocation. The reciprocating mechanism moves the typewheel and the figures and letters shift mechanism control the length of this typewheel reciprocating stroke.

With references to FIGURES 41 and 42, power to move the typewheel forward is supplied by the typewheel reciprocating cam 243 on the function shaft 194, which begins rotating after the transfer operation. As the reciprocating cam 243 rotates, a high portion 570 of the cam (FIGURE 42) pushes one arm 571, carrying a roller 572, of a reciprocating cam follower 573 downward. This action causes the opposite arm 574 of the cam follower 573, coupled to a typewheel drive lever assembly 575, to move upward and rotate the drive lever assembly 575 clockwise, as viewed from the rear, about a pivot post 576 mounted in the function plate 339. The drive lever assembly includes a drive lever 578 and two side plates 579 journalled on the same pivot post 576. Lever arm 574 is coupled to positive shift the plates 579. Drive lever 578 is held against a pin 580 fixed between plate 579, by a spring 581. Thus drive lever 578 will shift with the plates 579 until blocked in its path of movement whereupon the drive lever 578 will remain stationary and the plates will complete the reciprocating movement, the differential movement between the plate and lever resulting from the connecting spring 581. When the typewheel drive lever assembly 575 rotates, the drive lever 578 is moved to abut and shift a typewheel transfer lever arm 584 (FIGURES 41 and 42). The transfer lever 585 is pivotally journalled, between the arm 584 and an oppositely directed arm 586, on an adjustable eccentric stud 587 which is mounted on a lateral extension 588 of function plate 339. Arm 586 has two, spaced, downwardly directed lugs 590 that bridge a pin 591 in the upper arm 592 of a vertically journalled bell crank assembly 593. As shown in FIGURES 4 and 5, the bell crank assembly has a shaft 594 journalled in extensions 595 of the punch and printing support frame 258, and is maintained in axially fixed relation by collars 596. Firmly clamped to the lower end of shaft 594 is a lower bell crank arm 598 extending over the typewheel hollow shaft 361. The end of arm 598 carries a depending stud 599 which projects, with a close free-running fit, into an annular groove 600 in the hollow shaft 361.

Pivotal rotation of the drive lever 578, pivots the transfer lever 585 thereby pivoting the bell crank assembly 593, which moves the typewheel 360 forward above the front edge of the message tape 172 just before printing occurs. The inking ribbon 604, coacting with the typewheel assembly through a ribbon guide 605 mounted on an upper pin extension 607 of the lower bell crank pin 599, reciprocates forward, carrying the ink ribbon with the typewheel 360. As the reciprocating cam 243 continues to rotate after printing occurs, a low portion of the cam 243 permits a spring 608, connected between the cam follower 573 and the function plate anchor bar 567, to return the reciprocating cam follower 573 and the drive lever 578 to their original positions. This action permits a spring 610 (FIGURE 41), connected to the lower bell crank arm 598, to return the typewheel to its normal rear position, determined by engagement of transfer lever arm 584 with the drive lever 578, and exposes the printed character on the tape to the view of the operator.

The raised characters and symbols, which may be printed by this reperforator, are arranged in two parallel rows around the typewheel 360. The letters (outer) row contains the letters of the alphabet and three special symbols (FIGURE 18). The figures (inner) row contains the numerals, punctuation marks, and symbols shown in the figures column of FIGURE 18. When the reperforator is in the letters shift position, the typewheel 360 reciprocates forward just enough to move the letters row of characters to the printing position above the print hammer. When the unit is in the figures shift position, the reciprocating stroke is longer, and the typewheel moves far enough forward to position the figures row above the print hammer. With the unit in the figures shift position, when a letters shift code group is received, the code rings 300 are positioned to select the letters stop bar 324'. The letters shift sensing lever 551, no longer blocked by its stop bar 324' is rotated by its spring 554.

An arm 614 on the sensing lever 551 and opposite the spring 554, will be moved to engage an adjacent arm 615 of and rotate a shift lever 616 counterclockwise against the bias of a spring 617 to the letters shift position, the limit of this counterclockwise movement being determined by abutment of lever arm 615 against a pin 618. This action permits spring 617, connected at its other end to a shift latch 619, to pull the shift latch arm 620 downward, placing the latching arm 620 in a lower notch 621 formed in the end of shift lever 616, and latching the shift lever 616 in the letters shift position. In this position, the shift lever 616 limits travel of the typewheel transfer lever 584 and thereby limits the forward motion of the typewheel 360 during reciprocation. The typewheel is moved forward during reciprocation, as the typewheel drive lever 578 rotates the free end of the typewheel transfer lever 584. When the free end of the transfer lever 584 strikes the shift lever 616, forward motion of the typewheel 360 is halted, and the letters row of characters is positioned directly above the print hammer 368.

Operation of the figures shift mechanism is initiated by reception of the figures code group, causing selection of the figures stop bar 324' in the code ring cage 319. Since the figures shift sensing lever 550 will then not be blocked by its stop bar, the sensing lever spring 554 rotates the sensing lever 550 and causes an intermediate arm 624 of the figures shift sensing lever 550 to strike a depending arm 625 of shift latch 619 to rotate the shift latch counterclockwise. When thus tripped, the shift latch end 620 moves upward and releases the lower notch 621 of the shift lever 616, which is pulled clockwise to the figures shift position by spring 617. In this position, the shift lever engages the latch end 620 of latch 619 by its upper notch 626 extending the distance the typewheel transfer lever 584 can move during reciprocation, thereby increasing the forward motion of the typewheel 360. When the shift lever 616 is in the figures shift position, forward motion of the typewheel is not halted until the figures (inner) row on the typewheel is directly over the print hammer 368. As operation of the reperforator continues, the figures or symbols in this row are printed until a letters shift code group is received to again reposition and relatch the shift lever 616.

*Signal bell operation.*—The reperforator includes a signal bell mechanism which is used by operators for signaling purposes. A signal bell 628 mounted on the front face of rear vertical frame 116, rings each time the "S" code group is received while the shift mechanism is in the figures shift position. The code group also is recorded in punched form on the tape, and the bell symbol (FIGURE 18) is printed. Reception of the same code group causes the letter "S" to be printed when the shift mechanism is in the letters shift position.

The signal bell mechanism (FIGURE 40) rings the bell 628 whenever the sensing lever spring 554 is permitted to rotate the signal bell sensing lever 552 clockwise (as viewed from the rear) causing the bell clapper 629, fastened to the bell sensing lever, to strike the bell. The bell function stop bar 324' (used for the letter "S" also) normally blocks rotation of the bell sensing lever 552 during operations other than ringing the signal bell or printing the letter "S." Reception of the "S" code group causes the stop bar 324' to move out of the path of the bell sensing lever 552 and permits the sensing lever 552 to rotate, when the unit is in the figures shift position, and the clapper 629 strikes against the bell 628. The mechanism is reset when the high part of restoring cam 244 (FIGURE 39) causes cam follower 555 to restore the function sensing levers 550, 551, 552 to the original counterclockwise position.

*Signal bell suppression in letters shift.*—Although the same code group is used both for printing the letter "S" and ringing the signal bell 628, only one of the operations is accomplished when this code group is received. The upper extension 630 of the bell sensing lever 552 is blocked by an upper arm 631 on the shift latch 619 (FIGURE 40) when the "S" code group is received while the unit is in the letters shift position. When this occurs, the reperforator prints the letter "S" and punches the corresponding code in the tape. If the "S" code group is received while the reperforator is in the figures shift position, the upper arm 631 of the shift latch 619 is positioned below the upper extension 630 of the bell sensing lever 552 and does not block bell sensing lever rotation. When this occurs, the signal bell 628 rings, the code is punched in the tape, and the typewheel 360 reciprocates forward far enough to print the bell symbol (figures row on the typewheel).

*Ribbon feed and ribbon reversing*

As clearly shown in FIGURE 3, the ribbon supply mechanism 126 is separable from the reperforator as a unit and includes a support 637 that is bolted to the punching and printing assembly support frame 258. The ribbon mechanism operating lever 638 has one arm 639 formed as a yoke shaped cam follower, which in assembly fits around the periphery of the ribbon feed cam 248 on the function shaft 194 (FIGURE 7). Ribbon feed cam 248 is an eccentric with only one high and one low portion as compared with the two high and two low portions for most other cams in this unit. Thus, as the function shaft 194 only rotates one-half revolution upon reception of one code group, reception of two code groups is required to operate the ribbon mechanism cam follower arm 639 through one cycle. This permits the ribbon feed to operate at a slow speed compared to the printing, punching and tape feeding and eliminates high speed, jumpy ribbon action.

With reference to FIGURES 43–46, operation of the function shaft 194 swings the follower arm 639 of operating lever 638 to left and right. Lever 638 is pivoted on an adjustable eccentric post 640 mounted in support 637 and includes an upper bifurcated arm 641 that moves up and down as the cam follower arm 639 moves left and right. The bifurcated lever end 641 engages the bight or bridge 642 of a U-shaped vertically disposed link 643 through a slot 644 provided in one side leg of the U-shaped link. Fastened to the top of support 637 is a horizontal plate 645 having two vertical ears 646 journaling a shaft 647. Across link 650 is pivotally disposed on shaft 647 between the two ears 646, extends back to and is pivotally connected to the two legs of the U-shaped link 643 by pin 651. The U-shaped link 643 is thus maintained in substantially vertical alignment by cooperation between bifurcated lever end 641 and the slot 644 and by the cross link 650, while also being reciprocated up and down by movement of lever 638.

Feed mechanism 126 includes two ribbon feed pawls 652, two ribbon feed detent levers 653, two feed ratchet wheels 654, and two ribbon sensing levers 655, one of each for each spool 636.

The two feed pawls 652 are pivotally mounted on and extended upward from a shaft 656 carried by the U-shaped link 643 just above the slot 644. Closely adjacent the top of support 637 a ratchet wheel and spool axle 657 passes through and is fixed in the support by a set screw. The right and left hand ratchet wheels 654 are journalled on the axle 657 on either side of the support 637 and maintained in fixed axial relationship by fingers 660 integral with plate 645. Each ratchet wheel 654 includes a fixed hub 661 with a driving key 662 adapted, in assembly, to be engaged by a slotted hub (not shown) in the ribbon spool. Intermediate the length of each feed pawl 652 is an integral horizontal bar 663 extending parallel to the axle 657 and across the periphery of each ratchet wheel 654.

To maintain one of the feed pawls 652 pivoted so the transverse bar 663 engages its respective ratchet wheel 654 and the other pawl pivoted so its transverse bar 663 is out of engagement with its respective ratchet wheel 654, an interconnected toggle arrangement is provided at the upper end of the U-shaped link 643. Journalled, and retained by spring clips 664 on each side of the vertical legs of the U-shaped link 643, on a rod 665 passing through the vertical legs is a toggle lever 666. Depending from each toggle lever 666 is a short arm 667 positioned between two laterally extended spaced lugs 668 on the upper end of the corresponding pawl 652. A small compression spring 670 is retained on arm 667 between the main body of the toggle lever 666 and the two spaced lugs 668 on the pawl, a washer 671 being provided at both ends of the spring. Extending toward the front of each toggle lever is a yoke arm 672. Pivotally mounted between the forward extending yoke arms 672 of the right and left toggle levers, on a vertical lug 673 of one of the legs of the U-shaped link 643, is a rocker 674 with its right and left hand lateral arms positioned within the respective right and left hand yoke arms 672. With this arrangement, pivotal movement of one of the toggle levers will result in opposite pivotal movement of the other toggle lever, thus in FIGURE 46, the near toggle is pivoted counterclockwise which, through rocker 674, causes the far toggle to pivot clockwise, which positions the near pawl 652 clockwise toward its ratchet wheel and the far pawl 652 counterclockwise away from its ratchet wheel.

With the right hand toggle lever 666 positioned as in FIGURE 46, the line of force of its spring 670 passes to the rear of pawl journal 656, biasing and maintaining the right hand pawl 652 into engagement with its corresponding ratchet wheel 654. Since the left hand toggle lever is pivoted opposite to the right hand toggle lever the line of force of its spring 670 passes toward the front of the pawl journal 656, biasing and maintaining the left hand pawl 652 out of engagement with its ratchet wheel. The upper end of each vertical leg of the U-shaped link 643 is formed as a toggle limiting tab 675 disposed above the yoke arm 672 of each toggle lever 666. The left tab 675 provides a limit stop for the left toggle lever 666 and limits the ratchet engagement or clockwise pivoted position of the right hand pawl 652 to prevent the bar 663 from being spring biased into bottoming engagement with the ratchet wheel teeth. Similarly the right tab 675 limits pivoted ratchet engagement movement of the left pawl. By the toggle mechanism just described, one of the pawls is always pivoted away from ratchet engagement when the opposite pawl is in ratchet engaging position. As the toggle mechanism and pawls are mounted on the U-shaped link 643 coupled to the operating lever arm 638, pivotal movement of lever 638 will reciprocate link 643 and both pawls 652 up and down. On the up stroke, one pawl 652 engages its ratchet wheel 654 and rotates the corresponding ribbon spool 636 enough to feed the ribbon 604 one character space. On the down stroke of U-shaped link 643 the driving pawl slides back over the teeth of its ratchet wheel in preparation for the next feed stroke. The other feed pawl also moves up and down but is biased away from engagement with its ratchet wheel by the toggle mechanism just described.

To prevent the driving ratchet wheel from backing freely during the return stroke of the drive pawl, the previously mentioned detent levers 653 are pivotally journalled on a shaft 677 passing through and fixed in the support 637 just below the ratchet wheels 654. Each of the detent levers 653 are biased by a spring 678 in a direction placing a transverse ratchet wheel engaging bar 679 toward engagement with its respective ratchet wheel 654, however a vertical finger 680 extends upward from each detent lever 653 in front of the transverse bar 663 on its corresponding pawl 652. Thus whenever a pawl 652 is in the disengaged position it will also move its detent lever 653 away from engagement with the ratchet wheel 654 to permit ribbon unwinding of the spool carried by that ratchet wheel.

To enable automatic reversal of the direction of ribbon feed a ribbon sensing lever 655 is provided for each spool 636 and is pivoted on the same shaft 677 as the detent levers 653. When a ribbon spool is empty, an opening (not shown) in the spool hub is uncovered by the unwound ribbon, and a curved finger 682 on the sensing lever 655 is enabled to move forward through the opening under bias of a spring 683. As the finger is an integral part of the sensing lever 655 it moves forward and places an upper arm 684 under a rearwardly directly lug 685 on the corresponding toggle lever 666. On the next downward movement of the operating lever 638, the toggle assembly which is spring-coupled to each of the two ribbon feed pawls, 652, is operated by engagement between the empty spool sensing lever 655 and the lug 685 on its corresponding toggle lever 666. This action causes the pawl 652 of the full ribbon spool 636 to move away from its mating ratchet wheel 654, and the other pawl 652 to move toward its mating ratchet wheel 654. As the reperforator continues to operate in response to received messages, the ribbon feed pawl 652 associated with the empty ribbon spool 636 now engages its associated ratchet wheel 654 on each upward movement, and the ribbon 604 begins to wind on the empty spool 636. This reversing action occurs automatically on either side as each ribbon spool in turn becomes empty.

As the ribbon 604 is unwound from either spool 636, it passes over a ribbon inking roller 690, journalled on the ends of shaft 647, then downward around the typewheel 360, and upward over another inking roller 690 to the other spool 636. An ink reservoir 691, mounted below the ribbon inking rollers 690, has two wicks 692 which extend upward to contact the rollers 690. Ink drawn upward by the wicks 692 adheres to the inking rollers 690 and is absorbed by the ribbon 604 as it passes over the rollers. Thus the ink ribbon 604 need not be changed until it becomes worn.

Bolted on the sides of the rear part of support 637 are complementary brackets 695 and 696. Fixed at the top of the brackets 695 and 696 is a rod 697 on which a ribbon retainer 698 for each spool is pivotally mounted. Each retainer 698 is lightly biased by a spring 699 so its lower end 700 rides on and exerts a slight friction against the ribbon wound on each spool. Rear ears 701 on each bracket 695 and 696 are bent laterally and forward and provide a pivotal mount for a U-shaped wire rod 702 which can pivot to retain the spools 636 on the ratchet hubs 661. To maintain the retainer rod 702 in a spool retaining position a spring biased detent pin 703 is disposed in a blind bore 704 in the rear face of the support 637, and engages a flat surface 705 on the rod 702. Ears 706 on each bracket 695, 696 provide anchors for the detent lever and sensing finger springs 678 and 683 while the retainer rod 702 serves as the anchor for the ribbon retainer springs 699. Note the ribbon retainers 698 provide only sufficient friction on the ribbon to prevent a free rotation of the unwinding spool which is otherwise free to rotate.

*Tape supply reel assembly*

As illustrated in FIGURE 3, the tape supply assembly 112 comprises a support frame 708 bolted to the right hand side of the machine base frame 110 and providing a journal (not shown) for a tape reel 709. Pivotally mounted at the upper rear portion of the frame 708 is an outer support arm 710. When a roll of tape 172 is on the tape reel 709, the outer support arm 710 is pivoted down to its roll retaining position and a latch bar 711 is retained in a support frame latch 712. Tape 172 passes off the reel 709 and is guided against vertical rollers 713 and into the tape chute 444. A tape roll sensing arm 714 is pivotally mounted to the support frame 708 and controls a tape out switch 715 in a manner similar to that described in co-pending application Serial No. 417,548, now Patent No. 2,844,674, filed March 22, 1954 by Carl P. Anderson. As the specific switch and follower arm structure are not a part of this invention they will not be further described herein. The tape out switch leads connect to a circuit including a power receptacle 716 and a buzzer 717 (FIGURE 50) mounted on the side of the tape reel support frame 708. Power is furnished to receptacle 716 through a plug 718 on the end of the tape out alarm cord 138.

The tape supply reel assembly 112 is designed to be loaded with a fresh roll of tape without removing the dust cover 102. With the dust cover top 103 in raised position, the reel support latch 712 is released and the outer reel support arm 710 raised straight up. By holding the tape out sensing arm 714 away from the reel hub, a fresh roll of tape may be placed on the reel 709. The sensing arm 714 is then allowed to rest on the roll of tape and the outer support arm 710 is moved down to latched position. The sensing arm 714 closes the alarm circuit switch 715 to sound the buzzer when the tape roll is almost exhausted. By merely removing the frame mounting screws and unplugging the alarm power plug 718 from receptacle 716, the tape supply assembly 112 may be removed from the reperforator.

*Polar selector magnet*

The polar selector magnet 120 (FIGURES 47–49) consists of a permanent bar magnet 720, an armature 270, a potentiometer 722, two line windings 724, 726 and two bias windings 728, 730 (FIGURE 50) mounted on a U-shaped silicon steel core 732. Around each arm 733 of the U-shaped core are wound one line and one bias winding.

All elements of the magnet 120 are carried by a unitary support 734, made of non-magnetic material, that includes mounting pads 735 with bolt holes 736 enabling the magnet to be fastened by bolts 737 to the front face of the front vertical frame 115 (FIGURE 3). The holes 736 are oversize as compared with the bolts 737 for reasons to be described later in this section. With particular reference to FIGURES 48 and 49 it is seen that one side of the bracket 734 has an integral upstanding boss 740 whose end 741 is formed as a lateral extension directed toward the other side of the bracket. On the opposite side of the bracket 734 from boss 740 is a short upstanding pad 742. Substantially midway between the two sides of the bracket 734, an aperture 744 passes from the upper to lower side of the bracket. On the lower side of the bracket 734, extending from aperture 744 to the edge of the bracket containing the upstanding pad 742 is a groove or recess 746 for receiving the bar magnet 720. An aperture 747 is formed through the upstanding boss 740 directed toward the opposite side of the bracket 734, and is used in conjunction with armature adjustment described hereinafter. On the side of bracket 734 that includes the short upstanding pad 742, is an integral offset mounting pad 748, used in some installations to attach the bias potentiometer 722.

A wing shaped angular metallic conductor 750 is disposed in the angle formed between the base of the bracket 734 and the upstanding boss 740 and is rigidly fastened to the bracket 734 by a screw 751 passing through the boss 740. The lower end 752 of conductor 750 is bent downward and projects through aperture 744 in the bracket 734 at the end of recess 746. One end (south) of the permanent magnet 720 is positioned adjacent the lower conductor end 752, with a minute air gap 753 between the magnet and the conductor 750, and is maintained in this relationship by a set screw 754, in the bracket 734. The gap in this installation should be from .020 to .030 of an inch. An angle shaped conductor 756 and the bridge 757 of core 732 abut and are fastened to the top of the short pad 742 by screws 758. The mounting screw holes in the core bridge 757 and the conductor 756 are oversized to enable proper adjustment of the core pole faces 760 relative to the armature 270 and to enable the depending leg 759 of the conductor 756 to be placed in abutting engagement with the end (north) of the bar magnet 720 that projects beyond the end of recess 746. Two leveling screws 762 are provided in the bracket 734 under the core windings and are used to set the core pole faces parallel with the armature faces 764. The line windings and bias windings are enclosed in a non-magnetic casing 766. A thin strip of metal 767 may be bonded on the bottom of the winding case 766 to provide engagement surfaces for the leveling screws 762.

The magnet armature 270, shown in detail in FIGURES 51 and 52, consists of a hub 770 with two opposed side arms 771 and 772 made of magnetic conducting material. A bore 773 extends through the hub 770 and a flanged bearing 774 is inset in each end of the bore. One side of each arm 771 and 772 has a finished face 764 in the same plane and parallel with the axis through bearings 774. On the opposite side of the armature 270 from faces 764 the lower portion of the hub 770 is formed with an extended slotted boss 776. Fitted in the slotted boss 776 and extending away from the hub axis are a pair of divergent leaf springs 778 fixed to the boss 776 by suitable bond such as solder.

Integrally joined to the end of side arm 772 by suitable bonding is a non-magnetic plate 779, such as brass or bronze, which in turn has a tool steel latch plate 780 rigidly bonded to its end. The latching edge of the latch plate 780 has a short length 781 for engagement with the end of stop lever 273 and a long length for engagement with the selector levers 271. Each portion 781 and 782 are finished to provide predetermined angles with the latch plate face, as set forth in the description of copending application Serial No. 190,359, filed October 16, 1950 (Patent No. 2,754,361), for proper cooperation with the stop lever 273 and selector levers 271. The latching edge portions 781 and 782 extend parallel to the hub axis.

With reference to FIGURE 49, the armature 270 is pivotally journalled on a shaft 784 arranged perpendicular to the U-shaped core 732 and midway between the core pole faces 760. Shaft 784 extends with a snug fit through holes in the base of support 734 and the upper lateral extension 741 of boss 740 and is fixed in position by a set screw 785 in the upper extension 741. Hub 770 of the armature is axially maintained on shaft 784 by spring retaining clips 786 clipped in grooves in the shaft. The side arms 771, 772 of the armature 270 extend across respective core pole faces 760 and are disposed between the core pole faces and the wing arms 788 of the conductor 750. Each conductor arm 788 includes an adjusting screw 790 threaded through the arm with a locking nut 791. Screws 790 are initially used to maintain the armature faces 764 parallel with the conductor arm faces while the core 732 and coils are being assembled and leveled with proper parallel clearance between the core pole faces 760 and the armature faces 764. In the preferred illustrated embodiment the clearance is .008 of an inch. After initial adjustment and assembly of the core 732 and armature 270 the adjusting screws 790 are backed off to enable a predetermined limited pivotal movement of the armature 270 toward each core pole face 760, and the locking nuts 791 tightened. In the preferred embodiment there should be a .004 inch clearance between each pole face 760 and its corresponding armature face 764 when the opposite armature arm contacts the adjusting screw 790.

In assembly, the divergent armature leaf springs 778 extend into the aperture 747 in support boss 740. Threaded in each side of boss 740 is a spring tension adjusting screw 792 with a locking nut 793, the inner end of each screw 792 contacting the side of the corresponding armature leaf spring 778. The screws 792 are adjusted against the leaf springs to enable movement of armature arm 771 toward its pole face 760 (marking condition) with zero application of force and, in this embodiment, movement of armature arm 772 toward its pole face 760 under a force of 50–65 grams applied where the latch plate 780 is bonded to the non-magnetic section 779.

As the casing 766 encloses two line windings 724 and 726 and two bias windings 728 and 730, eight lines 801, 802, 803, 804, 805, 806, 807 and 808 lead from the casing. The bias windings 728 and 730 are connected in series, for reasons to be fully described, with the bias potentiometer 722. Thus two of the bias winding leads 806 and 808 (FIGURES 47 and 50) are connected to the bias potentiometer 722 fastened by its face plate 723 by screws 810 to the potentiometer pad 748 on support 734. The potentiometer 722 may also be positioned above the casing 766 and held by extended core mounting screws, but the preferred mounting is on the special pad 748 to enable access by the operator to the adjusting screws.

Remaining lines 801, 802, 803, 804, 805 and 807 are bundled in a cable 812. When the reperforator is used as a separate unit with its own base frame and enclosed terminal box 135 (FIGURES 1-3), the magnet lines in cable 812 extend to and end in a screw plug 813 which is connected with the receptacle 156 on top of the terminal box 135. However if the reperforator is installed as a subcomponent of a larger assembly, the cable 812 leads to, and the enclosed lines are connected to terminals in a terminal block 814 as seen in FIGURE 4. Terminal block 814 may be fastened to any convenient mounting on the assembled reperforator but for most installations that use the terminal block it is mounted on lugs 815 extending from the rear face of front vertical frame 115 immediately behind the magnet mounting. The reperforator circuit, described hereinafter, is the same whether a plug 813 or terminal block 814 is used with the magnet, or whether the bias potentiometer is mounted to one side of or over the magnet coils.

Besides the two mounting screw pads 735, the magnet support 734 includes a third pad 738, and the faces of all three pads are in the same plane perpendicular to the armature shaft axis. The front face of the vertical frame 115 (FIGURE 3) includes three corresponding pads 818 and 819, the faces being parallel and perpendicular to the power distribution shaft axes. When the magnet 120 is mounted on the vertical frame 115, the lower tip of armature shaft 784 projects with a close free fit into a slotted boss 820 on the frame 115 and the lower side of magnet support 734 abuts on a spring biased plunger 821 and bearing against the upper side of magnet support 734 are two adjusting screws 823. Since, as previously stated the support mounting screws 737 pass through oversize holes 736 in pads 735, the magnet 120 can be adjusted by turning the two screws 823 against the force of spring biased plunger 821 until the armature latch plate 780 coacts in a predetermined relationship with the ends of the stop lever 273 and selector levers 271. When proper relationship is obtained the adjusting serrated screw heads of screws 823 are locked by coacting plates 824 fastened to the vertical frame 115, and the mounting screws 737 are tightened.

*Magnet operation*

During operation of the magnet 120, reception of a marking impulse causes the arm 771 of the armature 270 to be pulled toward one pole face 760 of the U-shaped core 732. Reception of a spacing impulse causes the opposite arm 772 of the armature 270 to move toward the other pole face 760 of the core 732. The selector magnet is constructed so that when current is not present in any of the line and bias windings 724, 726, 728 and 730 a balanced magnetic field is present. Under this condition, the permanent bar magnet 720 is the only source of magnetism. Note that the magnetic flux at the north pole end of the magnet 720 passes through conductor 726, at the bridge 757 of the core and returns to the south pole end of magnet 720 through both arms of the core 732, both sides 771 and 772 of the armature, the conductor 750 and air gap 753. The magnetic pull of the core faces 760 on armature arms 733 is equal and, in theory, the armature would occupy the balanced position (FIGURE 47).

However, as previously described, the leaf spring 778 of the armature is acted on by the adjusting screws 792 to establish a force biasing the armature to a "Mark" position.

When operating in polar circuits, the bias windings 728, 730 are not used. The line windings 724 and 726 are connected in series for 15-ma operation and in parallel for 30-ma operation, the circuits and switches being illustrated in FIGURE 50 and described hereinafter.

During a marking impulse, current flows through the line windings. Signal receiving line 830 (FIGURE 50) is positive and signal receiving line 831 is negative. The magnetic field set up by the line winding 726 around the lower core arm 733 opposes the field of the permanent magnet, and little pull is present on the lower arm 772 of the armature 270. The magnetic field set up by the line winding 724 around the upper arm 733 of the core 732 is poled to aid the field of the permanent magnet 720 and, therefore, the upper arm 771 of armature 270 is pulled toward the upper core pole face 760. The lower arm 772 of armature 270 which includes the armature plate 780, moves to the marking position away from the lower pole face 760 of the core 732 and into the path of the stop lever 273 and selector levers 271.

During reception of a polar spacing impulse, current flow in the line windings 724 and 726 is reversed, and the opposite of the above occurs. The magnetic pull on the upper arm 771 of armature 270 is weakened and the pull on the lower arm 772 is increased, causing armature 270 to be drawn toward the lower pole face 760 of the core 732 and out of the path of stop arm 273 and selector levers 271.

When operating in neutral circuits, the bias windings 728 and 730 must be used. They are wired in series in a D.C. circuit, and are energized constantly during neutral operation. The magnetic field set up by the lower core arm bias winding 730 is poled to aid the magnetic field of the permanent magnet 720. The field of the upper core arm bias winding 728 opposes the field of the permanent magnet. During reception of a neutral spacing impulse, current is not present in the line windings 724 and 726. The combined magnetic fields of the energized bias windings 728 and 730 and the permanent magnet 720 cause the plate arm 772 of the armature 270 to be pulled toward the lower core pole face 760, away from the selector levers 271. Current flows in both line windings 724 and 726 during reception of a neutral marking impulse. The current value in a line winding normally is twice the bias current value. The field set up by the energized line winding 726 around the lower arm 733 opposes the combined magnetic fields of the lower arm bias winding 730 and the permanent magnet 720. The energized line winding 724 around the upper core arm 733 aids the field of the permanent magnet 720 and opposes the field of the upper arm bias winding 728. Therefore, a marking impulse in the line windings 724, 726 will cause the upper arm 771 of the armature 270 to be pulled toward the upper core arm 760, and the lower armature arm 772 is moved into the path of the stop lever 273 and selector levers 271 (marking position). Neutral operation of this selector magnet is possible in both 20-and 60-ma neutral operation. Adjustment of the bias current value to obtain optimum machine range is accomplished with the potentiometer 722 connected in series in the bias circuit.

The polar magnet 120, as illustrated and described can thus be used as the receiving magnet in this reperforator, and in other electrical printing and perforating machines using a marking and spacing magnet and armature, whether the receiving signal circuit is polar or neutral.

*Circuit descriptions*

The circuits of the reperforator, are divided into two groups in accordance with the type of power in each circuit. The A.C. group includes the motor circuit, copy light circuit and the tape-out alarm circuit. The D.C. group includes the selector magnet bias circuit and the receive signal circuit.

*A.C. circuits.*—The motor circuit is shown in simplified form in the complete schematic diagram of the reperforator (FIGURE 50). Power is supplied to the motor through the power cord 136 connected through fuses 140, single pole double throw switch 139, terminal block 834. Switch 139 controls the power flowing to the motor windings through fuses 140. Motor capacitor 836 mounted in terminal box 135, is in series with one winding of the motor. Both windings are connected in parallel to the power line. The winding in series with start-and-run capacitor 836 is out of phase with the other winding. The circuit begins at one prong of power input plug 838, is traced to one of the fuses, one side of switch 139, to terminal 4 of terminal block 834 through line 840 to terminals A and B of receptacle 150 and plug 187, through the windings of the motor (in parallel), to terminals C and D of plug 187 and receptacle 150. The circuit from terminal C continues through line 842 to capacitor 836, joins the circuit line 844 from terminal D, and continues to terminal 3 of block 834, through the other side of switch 139, to the other fuse 140 and ends at the other prong of power input plug 838. The copy light 173 is connected in parallel with the motor windings through receptacle 158 and is lighted continuously whenever the power switch 139 is in the On position.

The tape-out alarm circuit causes a buzzer 717 to operate when the tape supply should be replenished. The alarm circuit consists of an A.C. buzzer 717, tape-out switch 715, receptacle 716, plug 718, and transformer 846. The transformer 846 is used as a step-down transformer with the secondary winding supplying 6.8 v. when 115 v. is applied to the primary side. The circuit begins at one side of the secondary winding of transformer 846, and may be traced to terminal 1 of terminal block 834, through line 848 to terminal 3 of plug 718 and receptacle 716, through the buzzer 717, and switch 715, to terminal 2 of receptacle 716 and plug 718 through line 850 to terminal 2 of block 834, and is completed through the secondary winding of transformer 846.

*D.C. circuits.*—When the selector magnet bias circuit is energized, the magnetic fields set up by the bias windings 728 and 730 supply a constant force to move the armature 270 to the spacing position. This circuit is energized only when the reperforator is to be operated with neutral type signals.

Components of the bias circuit include the two magnet bias windings 728 and 730, potentiometer 722 which is a 50,000-ohm variable resistor, plug 813, receptacle 156, polar-neutral switch 152, 100-ohm resistor 852, 4,200-ohm resistor 854, capacitor 856, and rectifier 858. The rectifier is connected across the A.C. input circuit, lines 840 and 844, after fuses 140, On-Off switch 139 and terminal block 834. For neutral operation, switch 152 must be in the neutral position to energize the bias circuit. The bias circuit begins at the positive output side of rectifier 858 and may be traced through line 860 to resistor 854, line 862 to terminal C of receptacle 156 and plug 813, line 807 through the bias winding 730 of the spacing side of the magnet, and line 808 to potentiometer 722. The circuit continues from the potentiometer 722 by line 806 through the bias winding of the marking side to line 805 through terminal D of plug 813 and receptacle 156, to the neutral side of switch 152, through the switch to resistor 852 and ends at the negative side of rectifier 858. Filter capacitor 856 is connected across the output side of rectifier 858 and serves to reduce ripple in the D.C. output.

The receive circuit receives the incoming code groups and controls the translation of these impulses into mechanical selections within the reperforator. Receive plug 862 is used to connect the receive circuit in series in the signal line (not shown). The selector magnet line windings 724 and 726 may be arranged to operate either in parallel or in series with each other, as determined by the position of double pole, double throw switch 153. When this switch is in the 60 MA position, the windings 724 and 726 are in parallel with each other, and the receive circuit is arranged either for 60-ma neutral operation or 30-ma polar operation. With switch 153 in the 20 MA position, the windings 724 and 726 are in series with each other and the receive circuit is arranged either for 20-ma neutral operation or 15-ma polar operation. Operation of the selector magnet 120 in all circuit arrangements has been described previously. The components of the receive circuit include the two magnet line windings 724 and 726, plug 813, receptacle 156, switch 153, fuse 141, the receive cord 137, and plug 862.

*Neutral 60-ma and polar 30-ma operation (switch 153 in 60 MA position).*—In this switch position, the line windings 724 and 726 are arranged in parallel with each other. The receive circuit may be traced from the positive side of plug 862 through line 830 to ⅛-amp. fuse 141. At this point, one side 864 of a parallel circuit continues to terminal E of receptacle 156 and plug 813, through the 802 to line winding in 724 in the marking side of the selector magnet, through line 801 to terminal F of plug 813 and receptacle 156, and through line 866 to one side of switch 153 through terminal 867 to line 831 and the negative side of plug 862. The other side of the parallel circuit continues from fuse 141, through terminal 868 of the other pole of switch 153, through line 870 to terminal B of receptacle 156 and plug 813, through the line 803 to line winding 726 in the spacing side of the magnet, through line 804 to terminal A of plug 813 and receptacle 156, through line 872 to join the other parallel leg 831, and continues to the negative side of plug 862. Switch 152 (polar-neutral), which controls the bias circuit, must be positioned to correspond with the type of signals received.

*Neutral 20-ma and polar 15-ma operation (switch 153 in 20 MA position).*—In this switch position, the line windings 724 and 726 are arranged in series with each other in the receive circuit. The circuit may be traced from the positive side of plug 862, through fuse 141, and line 864 to terminal E of receptacle 156 and plug 813, and through the line 802 to line siding 724, in the marking side of the magnet through line 801 to terminal F of plug 813 and receptacle 156. The circuit continues by line 866 through both throws of switch 153 to line 870 and terminal B of receptacle 156 and plug 813, through the line 803 to line winding 726 in the spacing side, line 804, to terminal A of plug 813 and receptacle 156, through line 872 to line 831 and ends at the negative side of receive plug 862. Switch 152, which controls the bias circuit, must, in this instance, also be positioned to correspond with the type of signals received.

Brief summation of operation

Operation is initiated by: (1) Placing the polar-neutral and 20 MA—60 MA switches 152 and 153, in the position required by the type and current level of the signal circuit. (2) Placing the On-Off switch 139 to On to start the motor. (3) Provision of the manual tape feed-out mechanism enables operation of the punching assembly to determine if the tape feeds through the machine properly.

A change in operating speed to any desired rate within reason is permitted through the use of alternate worm and worm wheel sets. The normal present day operating speed is 368.1 operation per minute (60 words per minute) while alternate gear sets such as shown at 164 and 165 may be used to obtain other speeds such as the 600 o.p.m. (100 w.p.m.) or the 404 o.p.m. (British). The reperforator set, as illustrated in the drawing, utilizing the various features of this invention, has been operated satisfactorily at continuous rates as high as 1800 o.p.m.

(300 w.p.m.). Alternate gear sets may be readily substituted for the drive gear set 184, 185 in the illustrated embodiment without changing the relative positions of the motor shaft axis and the drive shaft axis.

Several adjustments, the bias potentiometer and the range finder, are provided which can be readily made by the machine operator to obtain best operation. The bias potentiometer 722 is normally adjusted while receiving continuous R and Y signals and is made only when the equipment is operating in a neutral circuit as the bias windings are not used during polar operation. The range finder 290 is also adjusted while receiving continuous R and Y signals from a distant transmitter and is locked in the desired position by the range finder dial locks 294. No control for line current is provided in the illustrated receiver as the equipment which transmits signals to the reperforator normally will supply and control line current.

The operation of each of the various components has been described in the foregoing sections devoted to the subcomponents, hence it is seen that receipt of a signal will cause the magnet armature to be positioned in one of two positions. The magnet will thus convert a coded group of electrical signalling conditions to a timed group of successive armature positions which in turn, through the selector mechanism, set up a code positioning of five code rings 300 and corresponding punch interference levers 397. The code rings, through stop bars and a selector arm, position and reciprocate the typewheel forward to print the visible character representation of the received code on the front edge of a tape. By reciprocating the typewheel backward after each printing operation the printed message is always visible along the front edge of the tape. Just prior to the printing of a character, actuation of the punching assembly 404 is started. The initial movement of the punching assembly feeds the tape, while the print hammer 368 and the perforating punches 430 and 431 perform their function immediately following the tape feeding. Movement of the punching assembly will only operate the punches selected by the punch interference levers.

A manually initiated power operated tape feed-out is provided to pass sufficient tape out of the machine to enable the end of a reperforated message tape to pass on into an adjacent tape transmitter, as used in some signal center installations. Essentially the manual feed-out mechanism positions the selector mechanism and punch interference levers to print the blank code symbol and punch only the tape feed hole in the message tape and also clutches the function shaft to the main shaft enabling continual functioning of all components of the reperforator excepting the selector cam shaft. The selector cam shaft is permitted to rotate only if a start impulse of a code group is received by the magnet. As the tape feed-out feature should not operate when there are incoming signals, the feed-out mechanism is provided with disabling means actuated whenever the selector cam shaft starts to rotate.

A small compact ink ribbon feed, reversing and self inking assembly is removably mounted on the machine above the typewheel with a loop of ribbon passing around and shiftable with the typewheel whenever it reciprocates. The feeding and reversing of the ribbon are accomplished by cam follower cooperation with the function shaft. As high-speed ribbon feed is not a necessary factor in high-speed machine operation the feed mechanism is so coupled with the machine operating mechanism to accomplish one feed movement for every two printing and perforating operations.

It is thus seen that a highly compact, rugged and dependable printing and perforating unit is enabled by this invention with novel punching and printing action. All punching operations are positively actuated by power mechanism eliminating previously used punch springs. No parts (excepting the message tape) are moved into and out of the path of movement of the punches. These novel punch features eliminate breakdowns due to broken punch springs and inadvertent breaking of punches by shifting punch interponent levers.

A novel structural cooperation between the code rings and the punch assembly and a novel code ring locking mechanism is incorporated in this invention to assure the rugged dependable action required of these machines and at the same time permitting a more compact and lightweight assembly.

These and many other novel features contribute to the novelty of the combined printer and perforator hereinbefore described.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination: mechanism for receiving and converting coded groups of signalling conditions to coded mechanical positions; a punch and die assembly including a group of code punches; individual shiftable means including means operatively pivotally engaging associated punches of said group of punches adapted to positively move the associated punch into and away from engagement with the die part of the punch and die assembly; individual interference means engaged with said receiving and converting mechanism and positioned in one of two positions by the coded mechanical position of said receiving and converting mechanism, said individual interference means when positioned in one of the two positions being adapted to coact with a corresponding individual shiftable means; and a shiftable punch operating mechanism carrying all of said individual shiftable means, structurally inter-related with said receiving and converting mechanism and adapted to operatively shift all of said individual shiftable means away from a neutral position and back to a neutral position after receipt of a code group of signalling conditions by said receiving and converting mechanism the mounting of said shiftable means on said punch operating mechanism and the connection of said shiftable means to said punches comprising means enabling only the individual shifting means which coact with an individual interference means to be shifted in a manner to actuate an associated code punch.

2. A receiver comprising: selector mechanism, including a plurality of two position permutation code elements, for receiving and converting coded groups of signalling conditions to coded mechanical positions of said code elements; a punch and die assembly including a group of code punches corresponding to the permutation code elements; individual shiftable means operatively engaging each punch of said group of punches adapted to positively move the associated punch into and away from engagement with the die part of the punch and die assembly; individual blocking means engaged with and positioned in selected ones of two positions by said code elements so that only the individual blocking means positioned in one of the two positions will coact with a corresponding individual shiftable means; and a punch operating mechanism structurally inter-related with said selector mechanism and adapted to operatively shift all of said individual shifting means away from a neutral position and back to a neutral position after receipt of a code group of signalling conditions by said selecting mechanism whereby only the individual shifting means which coact with an individual blocking means will actuate an associated code punch.

3. A perforator comprising a selector mechanism, including a plurality of permutation code devices, for receiving and converting coded groups of signalling conditions to coded mechanical positions of said permutation code devices: tape punching means including punches, dies, a plurality of lost motion punch operating members individually connected to associated ones of said punches and elements adapted to engage and prevent lost motion movement of associated ones of said punch operating members and connected to associated ones of said permutation code devices and selectively positioned in accordance with the position of permutation code devices; and power means mechanically coupled between the selector mechanism and said punching means for positioning said code devices and said elements and positively connected with said punch operating members to assure positive punching and retracting movement of the punches relative to said dies according to the selected positioning of said elements.

4. The combination as defined in claim 3, wherein said selector mechanism includes means comprising a polar selector magnet for selective response to any of a plurality of signalling conditions including polar signals and neutral signals.

5. A perforator comprising: a selector mechanism, including a plurality of permutation code elements, for receiving and converting coded groups of signalling conditions to coded mechanical positions of said permutation code elements; printing and tape punching means coacting with and positioned in accordance with the position of said permutation code elements, said punching means including punches and dies; message tape feed means for passing a message tape past said printing and punching means; and power means mechanically coupled between said selector mechanism, said printing and punching means and said message tape feed means for positioning said code elements and said printing means, actuating said printing means and message tape feed means and positively connected with said punches to assure positive movement of the punches relative to said dies.

6. A perforator as set forth in claim 2, wherein the die part of said punch and die assembly is located above the punches and: a chad tube is provided with an inlet end surrounding and closely abutting the die hole portion of the upper surface of said die part.

7. In a perforator including a selector mechanism for receiving and converting coded groups of signalling conditions to coded mechanical positions, a punch and die assembly comprising: individual reciprocable punches; die plate means; pivoted levers directly engaged with and connected to associated punches for positively reciprocating said associated punches; and means structurally co-ordinated with said selector mechanism for shifting the pivots of said levers, and including means for interfering with pivoted movement of selected levers, to thereby bodily shift said selected levers and actuate the punches connected with said selected levers into and away from co-operation with said die plate means each time a coded group of signalling conditions is received and converted by said selector mechanism.

8. In a perforator, a punch and die assembly comprising: individual reciprocable punches; die plate means; levers pivotally mounted intermediate their ends on a common axis, each lever having one end positively engaged with and connected to an associated punch; means for interfering with pivotal movement of operatively selected levers; and means for shifting the pivots of all levers whereby only said selected levers are enabled to actuate associated punches into and away from said die plate means.

9. In a perforator, a punch and die assembly comprising: individual reciprocable punches; a die plate with a separate die hole for each of said punches; a punch operating lever assembly pivotally mounted on an axis fixed relative to said die block; a punch operating lever individual to each of said punches pivotally mounted intermediate their ends in said operating assemby on a common axis parallel to and offset from said assembly pivot axis, each lever having one end adapted to move its associated punch; abutment means fixed to said operating assembly adjacent the other ends of said levers; individual two position elements adapted in one position to coact with associated ones of said levers and maintain said other ends of associated levers in a substantially fixed relation to said fixed abutment means and in the other position to permit pivotal movement of said levers about their pivot axis; and means engaging said two position elements for receiving groups of coded mark and space signalling conditions and converting said signalling conditions to corresponding mechanical positions of said elements.

10. A punch and die assembly comprising: individual reciprocable punches; a die plate with a separate die hole for each of said punches; a punch operating lever assembly pivotally mounted on an axis fixed relative to said die block; a punch operating lever individual to each of said punches; means pivotally mounting all of said punch operating levers intermediate their ends in said operating assembly on a common axis parallel to and offset from said assembly pivot axis, each lever having one end adapted to move its associated punch; abutment means fixed to said operating assembly adjacent the other ends of said levers; and individual two position elements adapted in one position to coact with associated ones of said levers and maintain said other ends of associated levers in a substantially fixed relation to said fixed abutment means and in the other position to permit pivotal movement of said levers about their pivot axis.

11. A punch and die assembly as set forth in claim 10, wherein one of said levers has its said other end fixed relative to said abutment means and individual two position elements are provided for each of the other levers.

12. A punch and die assembly for use in perforating code message tape comprising: individual reciprocable punches; a die plate with a separate die hole for each of said punches; a punch operating lever assembly pivotally mounted on an axis fixed relative to said die block; a punch operating lever individual to each of said punches; means pivotally mounting all of said punch operating levers intermediate their ends in said operating assembly on a common axis parallel to and offset from said assembly pivot axis, each lever having one end adapted to move its associated punch; abutment means fixed to said operating assembly adjacent the other ends of said levers; individual two position elements adapted in one position to coact with associated ones of said levers and maintain said other ends of associated levers in a substantially fixed relation to said fixed abutment means and in the other position to permit pivotal movement of said levers about their pivot axis; means for guiding a tape through said punch and die assembly; and means connected to and operated by said operating assembly for positively feeding a tape through said guide means.

13. A code signal perforator comprising: a punch and die assembly for a perforator wherein means are provided for selecting any arrangement of a selected number of a plurality of punches to be simultaneously actuated toward punching operation on a message medium between the punches and a die plate comprising: a support frame; a die plate; and punches, with shank ends and punch ends, retained in said support frame for reciprocatory movement relative to and adapted to operatively engage with said die plate, the punch ends of said punches being canted relative to a plane transverse of the punch axis and each of said punches being of a sufficiently different length than the other punches whereby during a simultaneous punch actuation of any selected number of punches at least the initiation of actual punching action of each selected punch will occur at different times within the simultaneous punch actuation cycle.

14. A perforator comprising: a selector mechanism for receiving and converting coded groups of electrical signalling conditions to mechanical positions including selectively positioned members; a message tape supply mechanism; means connected to and operatively controlled by said selectively positioned members, for punching a coded row of holes in a message tape corresponding to a coded group of received signalling conditions, and including means for punching a tape feed hole in the message tape each time a coded message is received; means on said punching means adapted to cooperate with and cause said tape supply mechanism to shift the message tape one character space each time the punching means operates; manual means for selectively positioning said members and enabling continuous operation of said punching means for tape feed-out; and mechanism responsive to receiving operation of said selector mechanism and including a connection between said manual means and said selectively positioned members for automatically disabling feed-out operation by said manual means upon receipt of any coded group of electrical signalling conditions by said selector mechanism.

15. The perforator set forth in claim 14 wherein said manual means includes means which positions said code members to a position corresponding to a blank code whereby only the tape feed hole will be punched in the tape during the manually actuated tape feed-out.

16. A perforator comprising: a selector mechanism for receiving and converting coded groups of electrical signalling conditions to mechanical positions including selectively positioned code members and a selectively positioned selector shaft; a message tape supply mechanism; means coupled to said selector shaft for printing a character on a message tape corresponding to a code group of received signalling conditions; means connected to and operatively controlled by said selectively positioned code members for punching a coded row of holes in the message tape corresponding to a coded group of received signalling conditions and including means for punching a tape feed hole in the message tape each time a coded message is received; means on said punching means adapted to cooperate with and cause said tape supply mechanism to shift the message tape one character space each time the punching means operates; manual means, connected to said code members for selectively positioning said code members and enabling continuous operation of said printing and punching means for tape feed-out; and mechanism responsive to signal controlled operation of said selector mechanism connected between said selector mechanism and said manual means for automatically disabling control by said manual means upon receipt of any coded group of electrical signalling conditions by said selector mechanism.

17. The perforator set forth in claim 16 wherein said manual means includes means which positions said code members to a position corresponding to a blank code whereby only the tape feed hole will be punched in the tape during the manually actuated tape feed-out, and the means for printing a character on the tape is positioned and conditioned so that no character is printed.

18. A perforator comprising: a selector mechanism for receiving and converting coded groups of signalling conditions to mechanical positions including selectively positioned code members and a selectively positioned selector shaft; a message tape supply mechanism; means coupled to said selector shaft for printing a character on a message tape corresponding to a code group of received signalling conditions and including a reversible inked ribbon feed device; means connected to and operatively controlled by said selectively positioned code members for punching a coded row of holes in the message tape corresponding to a coded group of received signalling conditions and including means for punching a tape feed hole in the message tape each time a code group of signalling conditions is received; means on said punching means adapted to cooperate with and cause said tape supply mechanism to shift the message tape one character space each time the punching means operates; means structurally associated with said selector mechanism for actuating said inked ribbon feed device; said last two means being coordinated with the printing and punching means to operate during different periods in the machine operating cycle from the periods when printing and punching operations occur.

19. The perforator set forth in claim 18 wherein said inked ribbon feeding means includes means for performing one feeding operation for each two printing and punching operations.

20. A perforator comprising: a typewheel; a punch and die assembly; a selector mechanism for receiving and converting coded groups of signalling conditions to a mechanical position comprising, a group of individual shiftable permutation devices having rows of notches therein, a stop bar associated with each row of said notches, means for simultaneously shifting said permutation devices to align one row of notches, a movable stop arm connected to rotate said typewheel, and means to move the stop bar associated with said aligned row of notches into said notches whereby the stop bar is projected into the path of said movable stop arm to selectively position said arm and typewheel; punch interference means corresponding to and positioned by said shiftable permutation devices and adapted to cooperate with corresponding punches in the punch and die assembly to enable or disenable selected punches in accordance with the received code group; printing means positioned adjacent and adapted to cooperate with said typewheel to print a selected character on a message tape; and intermittently operated power means enabled by said means for shifting said permutation devices to operate for a predetermined period, said power means being coupled to said punches and said printing means to operate the enabled selected punches and the printing means and thereby print a character on and punch a coded perforation in a message tape.

21. A perforator comprising: a typewheel; a punch and die assembly; a selector mechanism for receiving and converting coded groups of signalling conditions to a mechanical position comprising, a group of individual shiftable permutation devices having rows of notches therein, a stop bar associated with each row of said notches, means for simultaneously shifting said permutation devices to align one row of notches, a movable stop arm connected to rotate said typewheel, and means to move the stop bar associated with said aligned row of notches into said notches whereby the stop bar is projected into the path of said movable stop arm to selectively position said arm and typewheel; means corresponding to and positioned by said shiftable permutation devices and adapted to enable or disenable selected punches in accordance with the received code group; printing means positioned adjacent and adapted to cooperate with said typewheel to print a selected character on a message tape; intermittently operated power means enabled by said means for shifting said permutation devices to operate for a predetermined period, said power means being coupled to said punches and said printing means to operate the enabled selected punches and the printing means and thereby print a character on and punch a coded perforation in a message tape; and means actuated by said power means and cooperating with said typewheel and printing means to permit printing only when said typewheel is positioned in predetermined positions.

22. A receiver comprising: a typewheel; a punch and die assembly; a selector mechanism for receiving and converting coded groups of signalling conditions to a mechanical position comprising a group of individual shiftable permutation devices having rows of notches therein, a stop bar associated with each row of said notches, means for simultaneously shifting said permutation devices to align one row of notches, a movable stop arm connected to rotate said typewheel, and means to move the stop bar associated with said aligned row of notches into said notches whereby the stop bar is projected into the path of said movable stop arm to selectively position said arm and typewheel; means corresponding to and positioned by said shiftable permutation devices and adapted to enable or disenable selected punches in accordance with the received code group; printing means positioned adjacent and adapted to cooperate with said typewheel to print a selected character on a message tape; intermittently operated power means enabled by said means for shifting said permutation devices to operate for a predetermined period, said power means being coupled to said punches and said printing means to operate the enabled selected punches and the printing means and thereby print a character on and punch a coded perforation in a message tape; and means cooperating with each permutation device and with said power means for latching said permutation devices in position for printing and punching operation and for unlatching said permutation devices to permit said shifting means to shift the permutation devices.

23. A perforator as set forth in claim 7, said selector mechanism comprising a group of permutation devices each mounted for selective independent arcuate movement about a common axis between limit positions, a plurality of arcuate rows of permutatively arranged elements on each of said devices concentric with said common axis, corresponding arcuate rows on each of said devices being equally radially spaced from said axis, means for sensing the alignment of any axially aligned set of said elements, means for selectively setting said permutation devices to either of their limit positions, and means for engaging a portion of all said devices and locking them as positioned by said selective setting means.

24. A perforator having a selector mechanism including: a plurality of two position sector type pivotally mounted permutation code segments, and an associated punch and die assembly including punch interference levers controlled by the code segments to select punches to be actuated, each code segment including means eccentric of its pivotal axis operatively connecting to a corresponding interference lever.

25. A perforator as claimed in claim 7, said selector mechanism including a plurality of permutation code segments, each permutation code segment, comprising: a flat sector shaped element having a plurality of notches formed on the arcuate portion of the sector and including a portion of said means for interfering with pivoted movement of selected levers.

26. A perforator as defined in claim 25 wherein said portion of said means is a U-shaped plate fastened to the flat side of the sector shaped element.

27. In combination: mechanism for receiving and converting coded groups of signalling conditions to coded mechanical positions; means for printing and punching representations of the received coded groups of signalling conditions on a message tape comprising, a rotatable and axially reciprocable typewheel operatively coupled to and selectively positioned by said mechanism, a print hammer, an inked ribbon feed and reversing assembly disposed with the inked ribbon looped over said typewheel and axially shiftable therewith, a combined punch, die and message tape feed assembly disposed adjacent said typewheel including a plurality of punches and corresponding punch enabling elements structurally cooperating with and positioned by said mechanism, a message tape supply, and power means including a rotatable shaft adapted to be intermittently operated under control of said mechanism and including means structurally coupled to said typewheel, said punch, die and tape feed assembly, said printing hammer and said ribbon feed and reversing assembly to enable positioning of said typewheel by said mechanism, to axially reciprocate said typewheel, to actuate said printing hammer, to actuate said punch, die and tape feed assembly to feed said message tape one step and operate enabled punches to punch said message tape and to operate said ribbon feed and reversing assembly.

28. The combination set forth in claim 21, wherein the means coupling said power means with said ribbon feeding and reversing assembly comprises a linkage actuated to feed said ribbon a single step after a plurality of perforating and printing operations.

29. The combination as defined in claim 21, wherein said mechanism includes means comprising a polar selector magnet, for selective response to any of a plurality of signalling conditions including polar signals and neutral signals.

30. In a perforator: a power source; reciprocable punches; die plate means; levers pivotally mounted intermediate their ends on a common axis, each lever having one end positively connected to an associated punch; means for interfering with pivotal movement of operatively selected levers; and means for shifting the pivots of all levers, including an operating lever carrying said pivotally mounted levers and having a cam follower in one end, and an enclosed track cam operatively receiving said cam follower and rotatably coupled to said power source, whereby upon interference with pivotal movement of selected levers said cam operated operating lever will shift the selected levers to actuate their associated punches into and away from said die plate means.

References Cited in the file of this patent

UNITED STATES PATENTS

| | | |
|---|---|---|
| 484,832 | Van Wagenen | Oct. 25, 1892 |
| 660,250 | Giroud | Oct. 23, 1900 |
| 748,365 | Graham | Dec. 29, 1903 |
| 994,463 | Hartog | June 6, 1911 |
| 1,492,837 | Dierstein | May 6, 1924 |
| 1,980,723 | Hartley | Nov. 13, 1934 |
| 2,024,012 | Potts | Dec. 10, 1935 |
| 2,042,788 | Krum | June 2, 1936 |
| 2,134,005 | Potts | Oct. 25, 1938 |
| 2,174,731 | Dirkes | Oct. 3, 1939 |
| 2,229,397 | Thomas | Jan. 21, 1941 |
| 2,279,161 | D'Humy | Apr. 7, 1942 |
| 2,326,298 | Hewitt | Aug. 10, 1943 |
| 2,343,882 | Carr et al. | Mar. 14, 1944 |
| 2,348,214 | Gubisch | May 9, 1944 |
| 2,360,637 | Anspach | Oct. 17, 1944 |
| 2,406,044 | Spencer | Aug. 20, 1946 |
| 2,432,787 | Nichols | Dec. 16, 1946 |
| 2,436,229 | Reiber | Feb. 17, 1948 |
| 2,436,230 | Reiber | Feb. 17, 1948 |
| 2,543,435 | Buckley | Feb. 27, 1951 |
| 2,555,622 | Zenner | June 5, 1951 |
| 2,605,353 | Salmon | July 29, 1952 |
| 2,675,078 | Zenner | Apr. 13, 1954 |
| 2,754,361 | Kleinschmidt | July 10, 1956 |
| 2,892,031 | Arko | June 23, 1959 |

UNITED STATES PATENT OFFICE
CERTIFICATE OF CORRECTION

Patent No. 3,014,095                            December 19, 1961

Edward F. Kleinschmidt et al.

It is hereby certified that error appears in the above numbered patent requiring correction and that the said Letters Patent should read as corrected below.

Column 37, line 41, after "wherein" insert a colon; line 43, for "and:" read -- and --; column 41, line 25, after "comprising" insert a colon; column 42, lines 14 and 19, for "21", each occurrence, read -- 27 --.

Signed and sealed this 5th day of June 1962.

(SEAL)
Attest:

ERNEST W. SWIDER                                        DAVID L. LADD
Attesting Officer                                             Commissioner of Patents